United States Patent
Satongar et al.

(10) Patent No.: US 12,001,753 B2
(45) Date of Patent: Jun. 4, 2024

(54) DEVICES, METHODS, AND GRAPHICAL USER INTERFACES FOR INTERACTIONS WITH A HEADPHONE CASE

(71) Applicant: Apple Inc., Cupertino, CA (US)

(72) Inventors: Darius A. Satongar, Staffordshire (GB); William D. Lindmeier, San Francisco, CA (US); Per Haakan Linus Persson, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/948,083

(22) Filed: Sep. 19, 2022

(65) Prior Publication Data

US 2023/0095263 A1    Mar. 30, 2023

Related U.S. Application Data

(60) Provisional application No. 63/248,374, filed on Sep. 24, 2021.

(51) Int. Cl.
G06F 3/048 (2013.01)
G06F 3/0488 (2022.01)
G06F 3/16 (2006.01)

(52) U.S. Cl.
CPC ............ *G06F 3/162* (2013.01); *G06F 3/0488* (2013.01)

(58) Field of Classification Search
CPC ............................. G06F 3/162; G06F 3/0488
See application file for complete search history.

(56) References Cited

U.S. PATENT DOCUMENTS

| | | | |
|---|---|---|---|
| 2009/0198359 A1* | 8/2009 | Chaudhri | G06F 16/904 345/173 |
| 2011/0022203 A1* | 1/2011 | Woo | G06F 3/0482 700/94 |
| 2014/0056433 A1* | 2/2014 | Emerson, III | G06F 16/634 381/56 |
| 2017/0013342 A1 | 1/2017 | Watson et al. | |
| 2017/0262253 A1* | 9/2017 | Silva | G09G 5/02 |
| 2018/0091887 A1* | 3/2018 | Minoo | H04R 1/1025 |
| 2018/0181827 A1* | 6/2018 | Kim | H04N 23/635 |
| 2018/0288558 A1* | 10/2018 | Umminger, III | H04S 7/303 |
| 2019/0102458 A1* | 4/2019 | Roblek | G06N 3/08 |
| 2021/0014611 A1 | 1/2021 | Carrigan et al. | |
| 2021/0296915 A1* | 9/2021 | Feng | H04R 1/1016 |
| 2021/0385637 A1* | 12/2021 | Kontopidis | H04M 1/6066 |

FOREIGN PATENT DOCUMENTS

| | | |
|---|---|---|
| CN | 110049394 A | 7/2019 |
| CN | 111225346 A | 6/2020 |
| KR | 20210000686 U | 3/2021 |

* cited by examiner

*Primary Examiner* — Aleksey Olshannikov
(74) *Attorney, Agent, or Firm* — Morgan, Lewis & Bockius LLP

(57) ABSTRACT

An audio output device case that includes one or more input devices and is in communication with at least one or more audio output devices and an audio source, performs a method, while the audio source is in communication with the one or more audio output devices, that includes receiving an input via the one or more input devices of the audio output device case, and in response to receiving the input, causes the one or more audio output devices to perform an operation associated with the received input while maintaining communication of the audio source with the one or more audio output devices.

55 Claims, 44 Drawing Sheets

Frontside 508        Backside 510

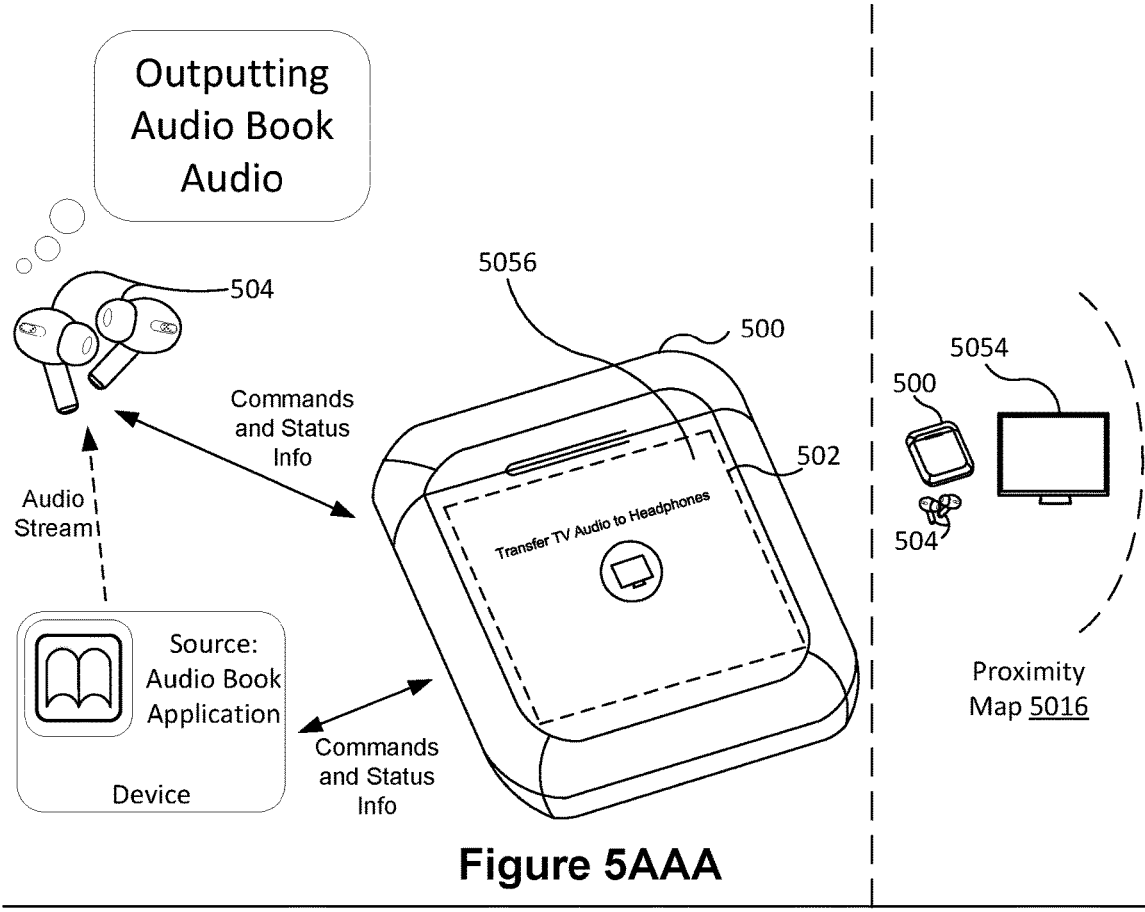
Figure 5AAA

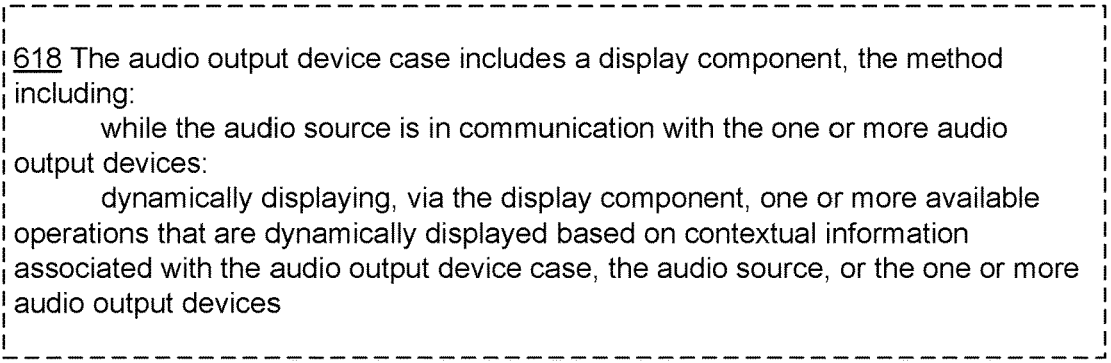

618 The audio output device case includes a display component, the method including:
    while the audio source is in communication with the one or more audio output devices:
        dynamically displaying, via the display component, one or more available operations that are dynamically displayed based on contextual information associated with the audio output device case, the audio source, or the one or more audio output devices

620 The audio output device case includes a display component, the method including:
    while the audio source (e.g., an audio source device) is in communication with the one or more audio output devices:
        displaying a plurality of controls, each at a different predefined control region, of a plurality of control regions, on the audio output device case

622 In accordance with a determination that the input is received for a first duration of time, performing a first operation associated with the received input; and
    in accordance with a determination that the input is received for a second duration of time performing a second operation associated with the received input

624 The one or more input devices are configured to receive inputs at a plurality of locations on the audio output device case, the method including:
    in accordance with a determination that the input is received at a first location of the plurality of locations on the audio output device case, performing a first operation associated with the received input; and
    in accordance with a determination that the input is received at a second location of the plurality of locations on the audio output device case, performing a second operation associated with the received input, wherein the second operation is different from the first operation

626 The one or more input devices are configured to receive different types of inputs, the method including:

in accordance with a determination that the input is of a first type, performing a first operation associated with the received input of the first type; and in accordance with a determination that the input is of a second type distinct from the first type, performing a second operation associated with the received input of the second type, wherein the second operation is different from the first operation

---

628 The one or more input devices are configured to detect directionality of inputs, the method including:

in accordance with a determination that the input includes movement in a first direction, performing a first operation associated with the received input in the first direction; and in accordance with a determination that the input includes movement in a second direction distinct from the first direction , performing a second operation associated with the received input in the second direction, wherein the second operation is different from the first operation

---

630 The audio output device case includes a tactile output generator, the method including:

in accordance with a determination that a state of the audio source changes, providing a tactile output via the tactile output generator that corresponds to the change in state of the audio source

---

632 The audio output device case includes a display component, the method including:

in accordance with a determination that a state of the audio source changes, providing corresponding visual feedback via the display component that corresponds to the change in the state of the audio source.

634 The operation is invoking a digital assistant, the method including:
after causing the one or more audio output devices to perform the operation, receiving, via a microphone of the one or more audio output devices, a verbal request, and receiving at the one or more audio output devices a response from the digital assistant

636 The audio source is a media source for playing media

638 The input is a tap input and the operation associated with the tap input is an operation for playing or pausing the media

640 The input is a swipe input and the operation associated with the swipe input is an operation for skipping to a track in a list of tracks of the media

642 The input is a rotational input and the operation associated with the received input is changing audio volume of the media in accordance with the rotational input

644 The input is a swipe input, and the method includes:
in accordance with a determination that the swipe input is in a first direction, transmitting to the audio source information indicating that the media currently playing is preferred; and
in accordance with a determination that the swipe input is in a second direction distinct from the first direction, transmitting to the audio source information indicating that the media currently playing is not preferred

646 The operation associated with the received input is an operation for switching between modes

648 The audio output device case includes a display component and the input is a press and hold input, the method including:
  displaying an indication of a notification via the display component; and
  while receiving the press and hold input via the one or more input devices:
  causing the one or more audio output devices to play an audio notification corresponding to the indication via the display component.

---

650 The input is a swipe input and the operation associated with the swipe input is an operation for switching from a first audio experience to a second audio experience of a plurality of audio experiences, wherein the second audio experience is different from the first audio experience > 652 Crossfading from the first audio experience to the second audio experience, the crossfading including transitioning from outputting the first audio experience at a first simulated spatial location to outputting the first audio experience at a second simulated spatial location and transitioning from outputting the second audio experience at a third simulated spatial location to outputting the second audio experience at a fourth simulated spatial location

---

654 The audio output device case includes a display component, and each audio experience of the plurality of audio experiences is associated with an indication that is displayed via the display component.

---

656 The audio output device case includes a display component configured to display a distinct graphic for each audio experience of the plurality of audio experiences, the method including:
  in response to the swipe input, comprising a first swipe input, transitioning from displaying a first graphic for the first audio experience of the plurality of audio experiences to displaying a second graphic for the second audio experience; and
  in response to a second swipe input via the one or more input devices, fading out a graphic for a current audio experience of the plurality of audio experiences, and then, in response to detecting an end of the second swipe input, fading in the graphic associated with the current audio experience of the plurality of audio experiences.

718 In accordance with a determination that the audio associated with the functionality is transferred from another device to one or more audio output devices, providing visual feedback via the display component

720 After the functionality is transferred from another device to one or more audio output devices, receiving, via the one or more input devices, another input; and in response to the other input, performing one or more additional operations associated with the other input

722 In conjunction with performing the one or more additional operation, providing haptic, audio, and/or visual feedback

724 The information displayed via the display component is one or more controls for communicating instructions for outputting, via the one or more audio output devices, audio associated with directions from a maps application

726 The information displayed via the display component is one or more controls for communicating instructions to the audio source for causing, via the one or more audio output devices, playing or pausing playback of an audio book, fast forwarding playback of the audio book, and rewinding playback of the audio book

728 In response to receiving the input, communicating instructions for playing, at the one or more audio output devices, audio from another device

730 In accordance with a determination that the one or more audio output devices are playing a first audio before the audio output device case receives the input, mixing the first audio with second audio, wherein the second audio is the audio from the other device

732 In response to receiving an input, communicating instructions for stopping playback of audio from the other device to the one or more audio output devices

734 The information that is displayed via the display component is information indicating availability of the other device

736 The information that is displayed via the display component includes information corresponding to the other device when predefined criteria are satisfied

Figure 7B

DEVICES, METHODS, AND GRAPHICAL USER INTERFACES FOR INTERACTIONS WITH A HEADPHONE CASE

RELATED APPLICATIONS

This application claims priority to U.S. Provisional Application Ser. No. 63/248,374, filed Sep. 24, 2021, which is incorporated herein by reference in its entirety.

TECHNICAL FIELD

This relates generally to a headphone case that is configured to perform operations for controlling operations associated with one or more headphones as well as to charge the headphones, including but not limited to headphone case devices with touch-sensitive surfaces that allow for inputs/gestures to be received.

BACKGROUND

Headphone cases for wireless headphones have typically been exclusively configured to charge and store wireless headphones. While some headphones include input mechanisms (e.g., a touch sensitive surface, or accelerometer) for operations such as playback control and selecting an audio output mode, headphone cases have traditionally not included input mechanisms for controlling operations of the headphones. Instead, controls have traditionally resided in other devices, such as a smart phone, tablet or computer paired or wirelessly connected with the headphones.

As demonstrated below, the utility of a headphone case can be enhanced, and user control over a user's wireless headphones can be improved, by configuring a headphone case with an interactive user interface to enable user control of operations associated with the wireless headphones.

SUMMARY

Accordingly, there is a need for a headphone case device that can control operations that are traditionally associated with headphones (e.g., playback controls, changing audio sources, changing audio output modes, etc.). There is a further need for a headphone case that can also convey information to a user, through haptics and/or display devices. Such methods and interfaces optionally complement conventional methods for controlling wireless headphones. Such methods and interfaces reduce the number, extent, and/or nature of the inputs from a user and produce a more efficient human-machine interface. For battery-operated devices, such methods and interfaces conserve power and increase the time between battery charges.

Accordingly, there is also a need for headphone case device configured to provide haptic feedback, optionally in conjunction with visual and/or audio feedback, that make manipulation of user interfaces more efficient and intuitive for a user. Such interfaces optionally complement conventional mechanisms for providing haptic feedback. Such interfaces reduce the number, extent, and/or nature of the inputs from a user by helping the user to understand the connection between provided inputs and device responses to the inputs, thereby creating a more efficient human-machine interface and improving the operability of electronic devices.

Deficiencies associated with user control of wireless headphones are reduced or eliminated by the disclosed devices. In some embodiments, the headphone case, sometimes herein called an audio output device case or wireless headphone case, has a touch sensitive surface. In some embodiments, the headphone case has a touch-sensitive display (also known as a "touch screen" or "touch-screen display"). In some embodiments, the headphone case has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface.

In accordance with some embodiments, a method is performed at, or at least in part at, an audio output device case (e.g., a headphone case) that includes one or more input devices and is in communication with at least one or more audio output devices (e.g., wireless headphones) and an audio source (e.g., a cloud streaming service, or an external device), for controlling operations associated with the one or more audio output devices. In some embodiments, while the audio source is in communication with the one or more audio output devices, the audio output device case receives an input via the one or more input devices, and in response to receiving the input, the audio output device case causes the one or more audio output devices to perform an operation associated with the received input while maintaining communication of the audio source with the one or more audio output devices.

In accordance with some embodiments, a method is performed at, or at least in part at, an audio output device case (e.g., a headphone case) that includes one or more input devices, a display component, and is in communication with at least one or more audio output devices (e.g., wireless headphones) and an audio source, for controlling a functionality associated with outputting audio at the one or more audio output devices. In some embodiments, the audio output device case displays, via the display component, information corresponding to a functionality associated with outputting audio at the one or more audio output device. While displaying the information via the display component, the audio output device case receives, via the one or more input devices, an input, and in response to receiving the input, the audio output device case communicates instructions for outputting, via the one or more audio output devices, audio associated with the functionality.

In accordance with some embodiments, an audio output device case includes a communication component for communicating with at least one or more audio output devices (e.g., wireless headphones) and an audio source, one or more input devices (e.g., optionally including a touch-sensitive surface, one or more processors, and memory storing one or more programs. The audio output device case optionally includes a display (e.g., a touch-sensitive display), and optionally includes one or more tactile output generators. The one or more programs are configured to be executed by the one or more processors and the one or more programs include instructions for performing or causing performance of the operations of any of the methods described herein.

In accordance with some embodiments, a computer readable storage medium has stored therein instructions, which, when executed by an electronic device (e.g., a headphone case) with one or more input devices (e.g., optionally including a touch-sensitive surface, optionally a display, and optionally one or more tactile output generators, cause the electronic device to perform or cause performance of the operations of any of the methods described herein.

In accordance with some embodiments, a graphical user interface on an electronic device (e.g., a headphone case)

with a display, a touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device (e.g., a headphone case) includes: a display, a touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, and optionally one or more tactile output generators, includes means for performing or causing performance of the operations of any of the methods described herein.

Thus, electronic devices (e.g., a headphone case) with displays, touch-sensitive surfaces, optionally one or more tactile output generators, optionally one or more device orientation sensors, and optionally an audio system, are provided with improved methods and interfaces for providing tactile outputs, thereby increasing the effectiveness, efficiency, and user satisfaction with such devices. Such methods and interfaces may complement or replace conventional methods for providing tactile outputs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6F are flow diagrams illustrating method 600 of interacting with an audio output device case to control one or more audio output devices, in accordance with some embodiments.

FIGS. 7A-7B are flow diagrams illustrating method 700 of interacting with an audio output device case to control one or more audio output devices, in accordance with some embodiments.

DESCRIPTION OF EMBODIMENTS

As noted above, audio output device cases are commonly passive devices used to charge audio output devices. Commands provided by a distinct external electronic device, such as a smart phone, tablet or computer, typically control most functions of the audio output devices. The methods, systems, and user interfaces/interactions described herein improve the functionality of an audio output device case. For example, embodiments disclosed herein describe improved ways of performing different operations at the audio output device case for controlling the audio output devices.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or tactile feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Figure 7A:
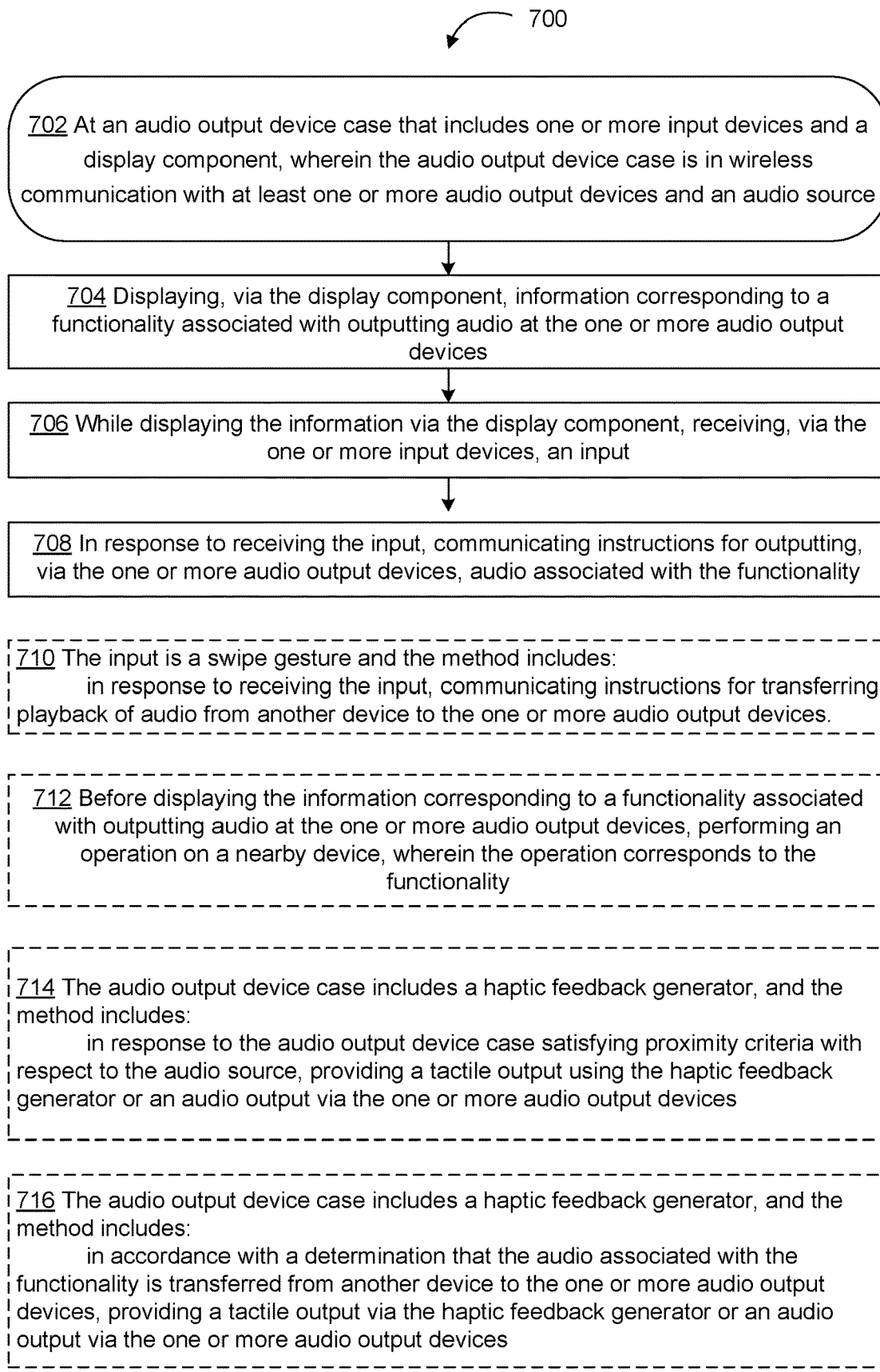

Below, FIGS. 1A-1B, 2, 3A-3D, 4A-4B illustrate example devices. FIG. 4C illustrates physical features of an example of an audio output device case. FIGS. 5A-5AAA illustrate example user interfaces and device interactions associated with an audio output device case that is configured to perform operations associated with audio output devices, as well as charge and store the audio output devices. FIGS. 6A-6F illustrate a flow diagram of a method of interacting with an audio output device case to control one or more audio output devices. FIGS. 7A-7B illustrate a flow diagram of a method of interacting with an audio output device case to control one or more audio output devices. The user interfaces in FIGS. 5A-5AAA are used to illustrate the processes in FIGS. 6A-6F and 7A-7B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
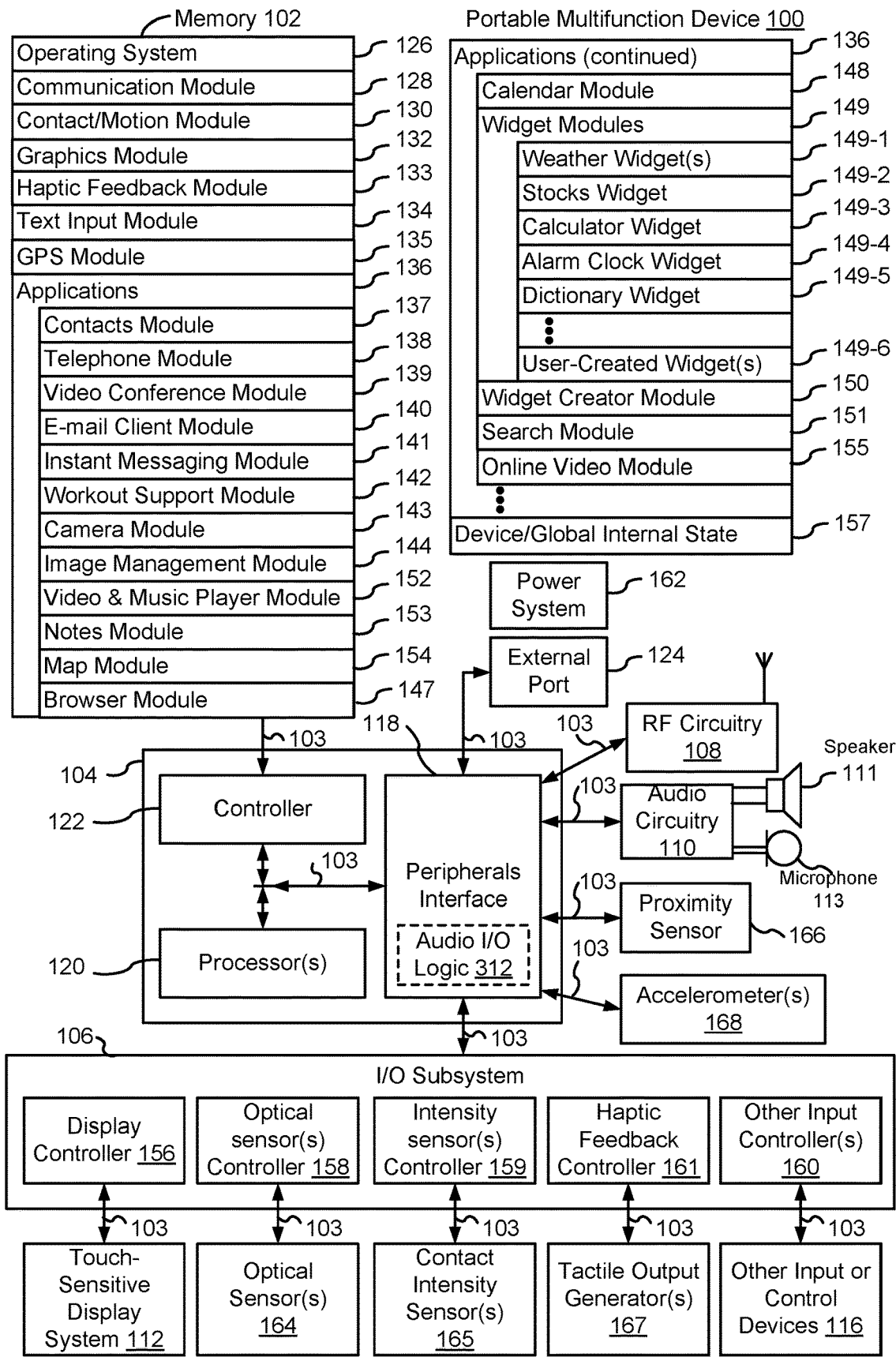
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click,"

"roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example., a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture— which do not require that the intensity of the contact(s) meet a respective intensity threshold in order for the first gesture recognition criteria to be met— are in competition with second gesture recognition criteria for a second gesture— which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
 contacts module 137 (sometimes called an address book or contact list);
 telephone module 138;
 video conferencing module 139;
 e-mail client module 140;
 instant messaging (IM) module 141;
 workout support module 142;
 camera module 143 for still and/or video images;
 image management module 144;
 browser module 147;
 calendar module 148;
 widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 widget creator module 150 for making user-created widgets 149-6;
 search module 151;
 video and music player module 152, which is, optionally, made up of a video player module and a music player module;
 notes module 153;
 map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
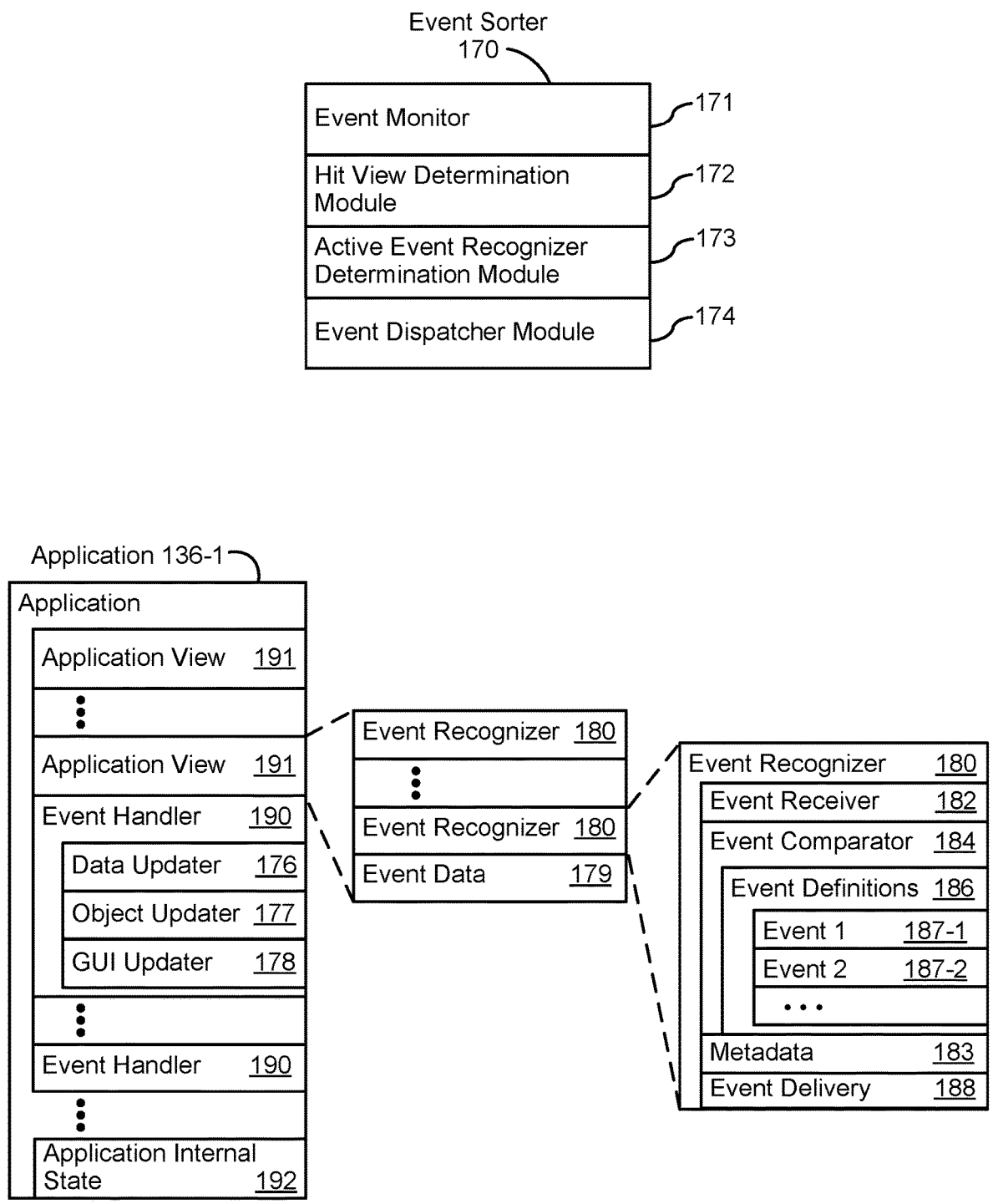
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
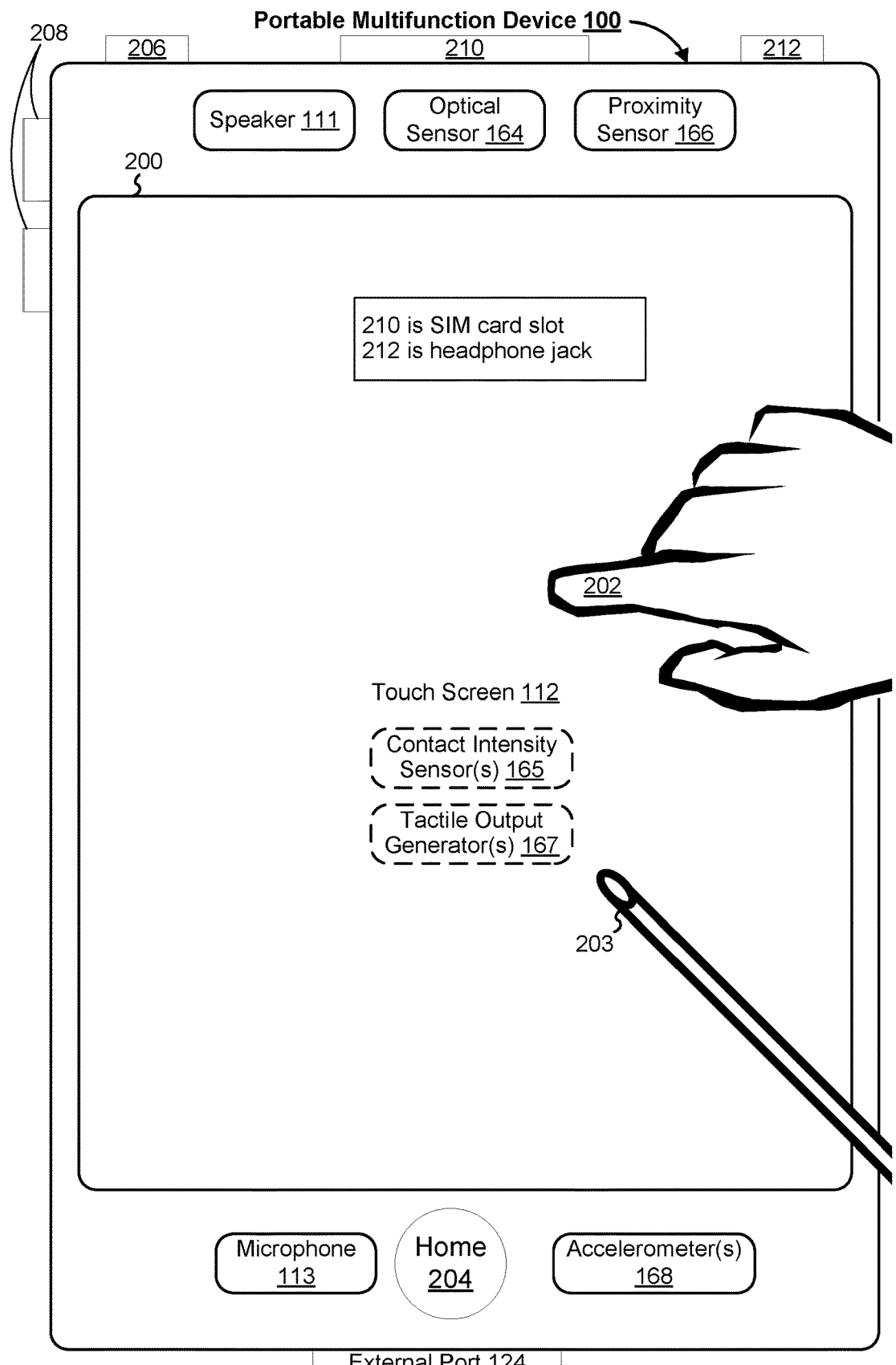
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

Figure 3A:
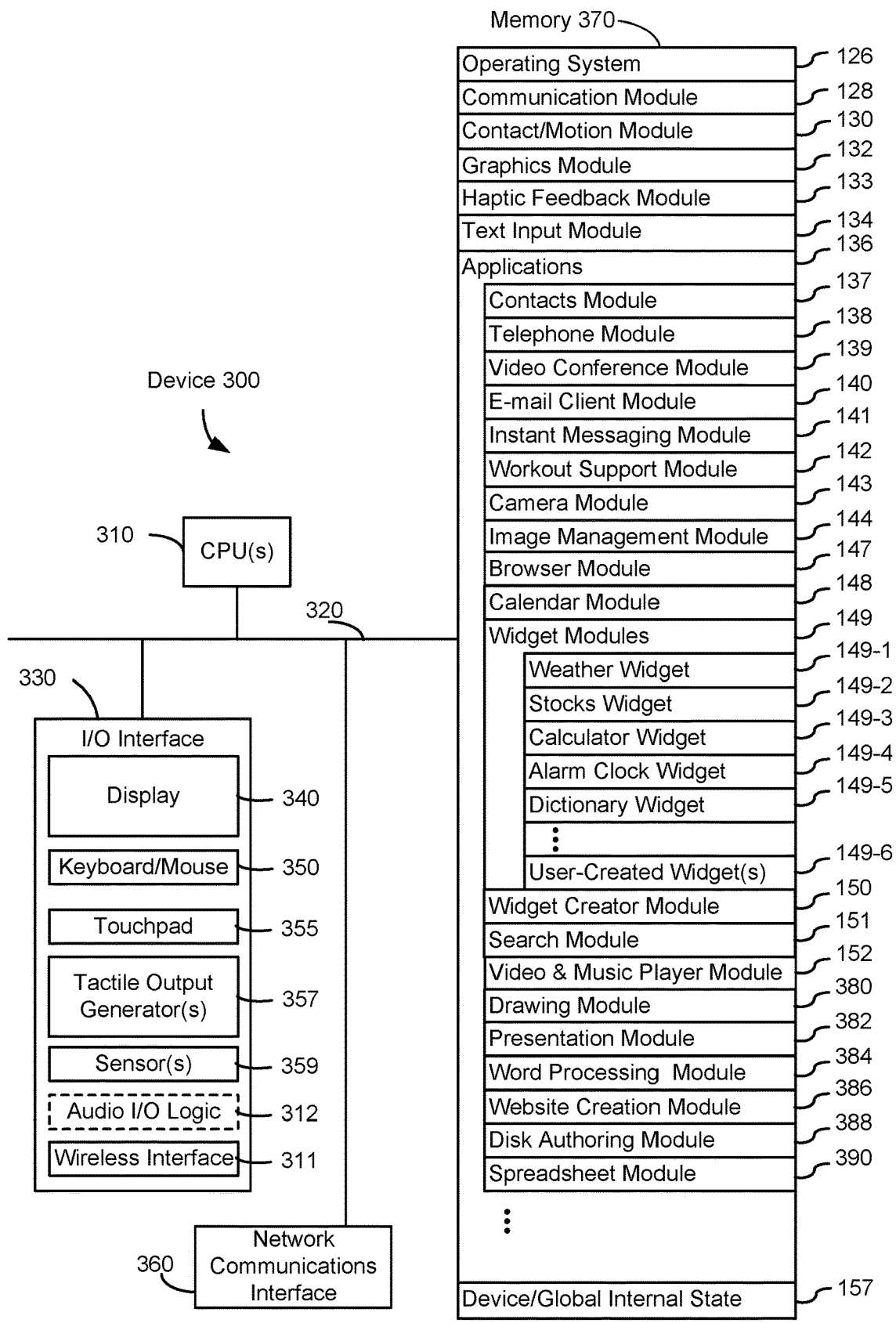
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). In some embodiments, device 300 includes a wireless interface 311 for communication with one or more wearable audio output devices 301 and an audio output device case 342 (see FIG. 3D).

Memory 370 includes high-speed random access memory, such as DRAM, SRAM, DDR RAM or other random access solid-state memory devices; and optionally includes non-volatile memory, such as one or more magnetic disk storage devices, optical disk storage devices, flash memory devices, or other non-volatile solid-state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
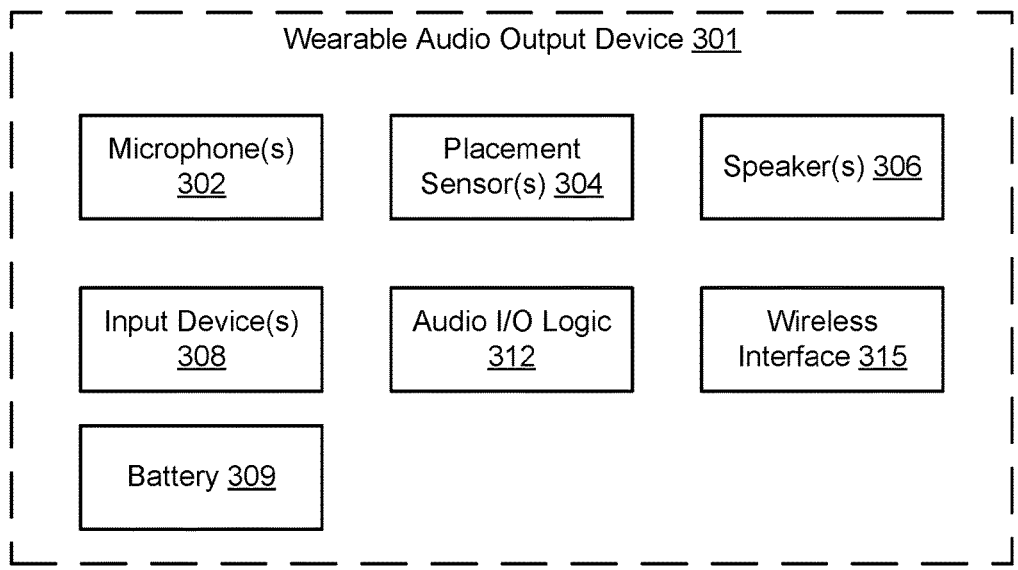
FIG. 3B is a block diagram of an example wearable audio output device in accordance with some embodiments.

FIG. 3B is a block diagram of an example wearable audio output device 301 in accordance with some embodiments. In some embodiments, wearable audio output device 301 is one or more in-ear earphone(s), earbud(s), over-ear headphone(s), or the like. In some examples, wearable audio output device 301 includes a pair of earphones or earbuds (e.g., one for each of a user's ears). In some examples, wearable audio output device 301 includes over-ear headphones (e.g., headphones with two over-ear earcups to be placed over a user's ears and optionally connected by a headband). In some embodiments, wearable audio output device 301 includes one or more audio speakers 306 for providing audio output (e.g., to a user's ear). In some embodiments, wearable audio output device 301 includes one or more placement sensors 304 to detect positioning or placement of wearable audio output device 301 relative to a user's ear, such as to detect placement of wearable audio output device 301 in a user's ear. In some embodiments, wearable audio output device 301 conditionally outputs audio based on whether wearable audio output device 301 is in or near a user's ear (e.g., wearable audio output device 301 forgoes outputting audio when not in a user's ear, to reduce power usage). In some embodiments where wearable audio output device 301 includes multiple (e.g., a pair) of wearable audio output components (e.g., earphones, earbuds, or earcups), each component includes one or more respective placement sensors, and wearable audio output device 301 conditionally outputs audio based on whether one or both components is in or near a user's ear, as described herein. In some embodiments, wearable audio output device 301 furthermore includes an internal rechargeable battery 309 for providing power to the various components of wearable audio output device 301.

In some embodiments, wearable audio output device 301 includes audio I/O logic 312, which determines the positioning or placement of wearable audio output device 301 relative to a user's ear based on information received from placement sensor(s) 304, and, in some embodiments, audio I/O logic 312 controls the resulting conditional outputting of audio. In some embodiments, wearable audio output device 301 includes a wireless interface 315 for communication with one or more multifunction devices, such as device 100 (FIG. 1A) or device 300 (FIG. 3A), and an audio output device case 342 (see FIG. 3D). In some embodiments, interface 315 includes a wired interface for connection with a multifunction device, such as device 100 (FIG. 1A) or device 300 (FIG. 3A) (e.g., via a headphone jack or other audio port). In some embodiments, a user can interact with and provide inputs (e.g., remotely) to wearable audio output device 301 via interface 315. In some embodiments, wearable audio output device 301 is in communication with multiple devices (e.g., multiple multifunction devices, and/or an audio output device case), and audio I/O logic 312 determines, which of the multifunction devices from which to accept instructions for outputting audio.

In some embodiments, wearable audio output device 301 includes one or more microphones 302 for receiving audio input. In some embodiments, microphone(s) 302 detect speech from a user wearing wearable audio output device 301 and/or ambient noise around wearable audio output device 301. In some embodiments, as described in more detail herein with reference to FIG. 3C, multiple microphones of microphones 302 are positioned at different locations on wearable audio output device 301 to measure speech and/or ambient noise at different locations around wearable audio output device 301. In some embodiments where wearable audio output device 301 includes multiple (e.g., a pair) of wearable audio output components (e.g., earphones or earbuds), each component includes one or more respective microphones. In some embodiments, audio I/O logic 312 detects or recognizes speech or ambient noise based on information received from microphone(s) 302.

In some embodiments, wearable audio output device 301 includes one or more input devices 308. In some embodiments where wearable audio output device 301 includes multiple (e.g., a pair) of wearable audio output components (e.g., earphones, earbuds, or earcups), each component includes one or more respective input devices. In some embodiments, input device(s) 308 includes a pressure-sensitive (e.g., intensity-sensitive) input device, which in some embodiments is located within a portion of wearable audio output device 301, sometimes called a "stem," that physically extends from a portion of wearable audio output device 301 that is configured to be inserted in a user's ear (e.g., stem 305 as shown in FIG. 3C). In some embodiments, the pressure-sensitive input device detects inputs from a user in response to the user squeezing the input device (e.g., by pinching the stem of wearable audio output device 301 between two fingers). In some embodiments, input device(s) 308 include a touch-sensitive surface (for detecting touch inputs), accelerometer(s) and/or attitude sensor(s) (for determining an attitude of wearable audio output device 301 relative to a physical environment and/or changes in attitude of the device, and/or other input device by which a user can interact with and provide inputs to wearable audio output device 301. In some embodiments, input device(s) 308 include one or more volume control hardware elements (e.g., an up/down button for volume control, or an up button and a separate down button, as described herein with reference to FIG. 1A) for volume control (e.g., locally) of wearable audio output device 301. In some embodiments, inputs provided via input device(s) 308 are processed by audio I/O logic 312. In some embodiments, audio I/O logic 312 is in communication with a separate device (e.g., device 100, FIG. 1A, or device 300, FIG. 3A) that provides instructions or content for audio output, and that optionally receives and processes inputs (or information about inputs) provided via microphone(s) 302, placement sensor(s) 304, and/or input device(s) 308, or via one or more input devices of the separate device. In some embodiments, audio I/O logic 312 is located in device 100 (e.g., as part of peripherals interface 118, FIG. 1A) or device 300 (e.g., as part of I/O interface 330, FIG. 3A), instead of device 301, or alternatively is located in part in device 100 and in part in device 301, or in part in device 300 and in part in device 301.

Figure 3D:
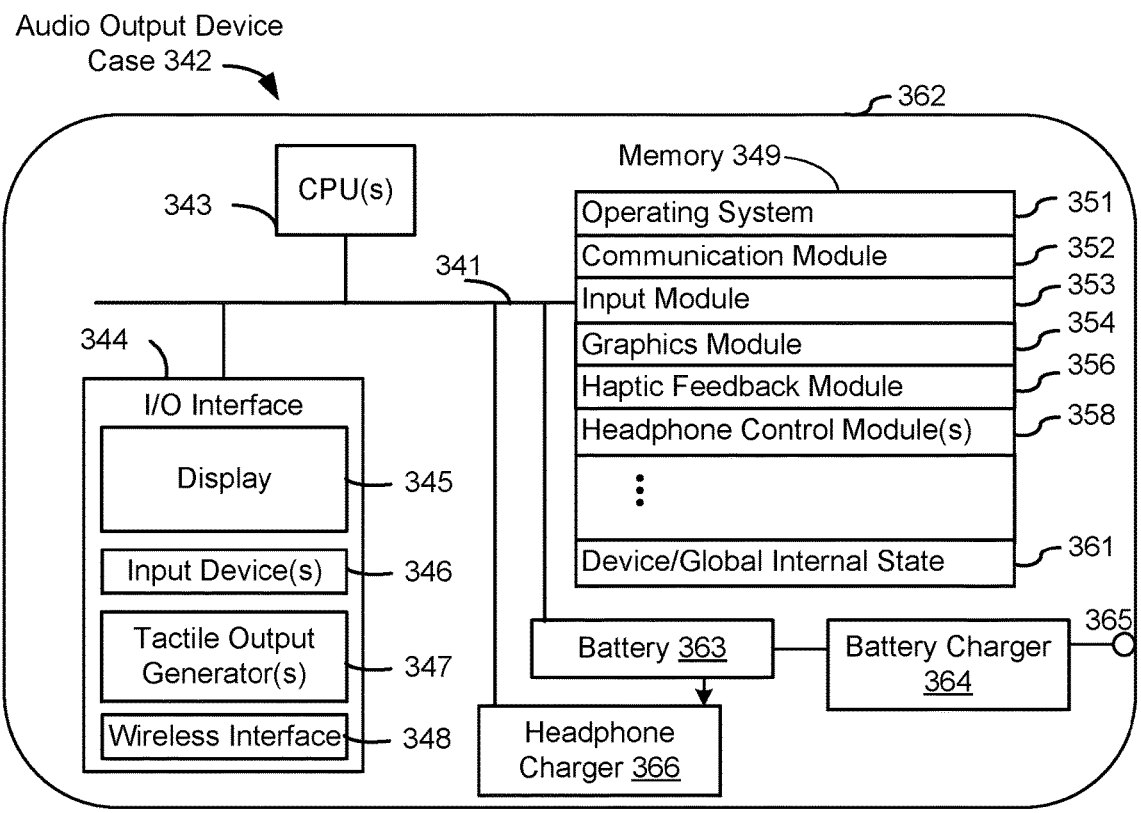
FIG. 3D is a block diagram of an example audio output device case in accordance with some embodiments.
Figure 3C:
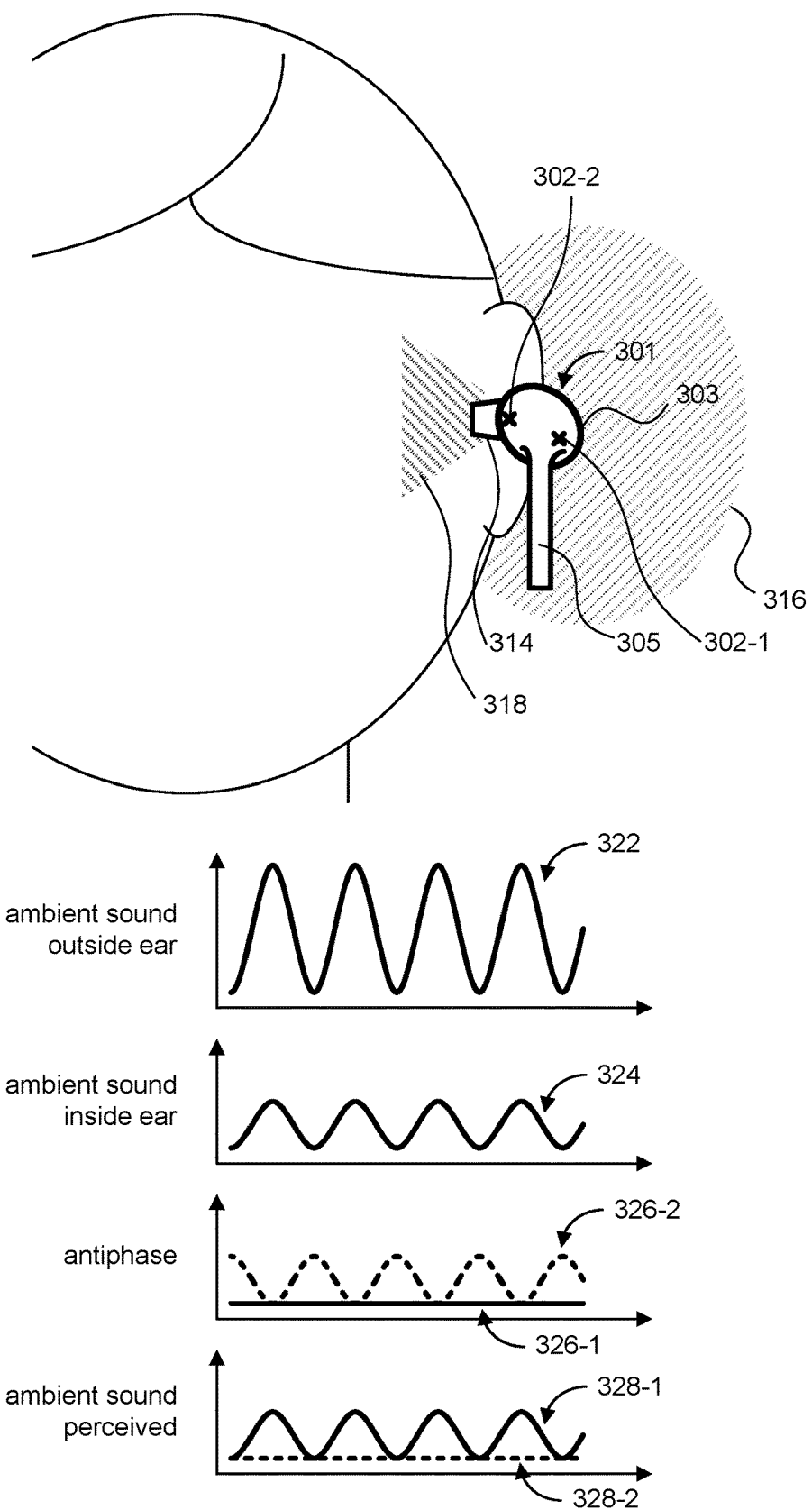
FIG. 3C illustrates example audio control by a wearable audio output device in accordance with some embodiments.

FIG. 3D is a block diagram illustrating an audio output device case 342 in accordance with some embodiments. Audio output device case is sometimes called a "headphone case" or "wireless headphone case" for convenience. Headphone case 342 includes memory 349 (which optionally includes one or more computer readable storage mediums), one or more processing units (CPUs) 343, and peripherals interface 344. In some embodiments, peripherals interface 344 includes a display 345 (e.g., a touch-sensitive display, sometimes called a touch-screen, or alternatively a display or one or more display elements that are not touch sensitive), one or more input devices (e.g., a touch-sensitive surface of display 345, and/or one or more buttons, and/or one or more touch-sensitive surfaces distinct from display 345), and one or more communication components 348 (e.g., a wireless interface) for communicating with devices such as one or more audio output devices 301, and one or more electronic devices such as a smart phone, tablet, computer or the like. However, in some embodiments, peripherals interface 344 includes a set of LEDs or other display elements instead of a display 345, capable of displaying icons and/or other visual information. In some embodiments, peripherals interface 344 includes one or more tactile output generators 347 for generating tactile outputs (also called haptic feedback), e.g., via display 345 or an external case 362 (also called the housing) of the headphone case 342.

In accordance with some embodiments, audio output device case 342 furthermore includes an internal rechargeable battery 363 for providing power to the various components of audio output device case 342, as well as for charging the internal battery 309 (FIG. 3B) of one or more wearable audio output devices 301. In some embodiments, audio output device case 342 includes a battery charger 364 for charging internal battery 363 when battery charger 364 is connected to an external power source via a power connect port 365. The internal battery 363 and/or battery charger 364 furthermore charge the internal battery 309 (FIG. 3B) of an audio output device (e.g., headphone or earbud) when the audio output device is connected to (e.g., properly positioned in) headphone charger 366, which is located within the external case 362 of the headphone case 342. These components optionally communicate over one or more communication buses or signal lines 341.

In some embodiments, external case, when closed (e.g., see FIG. 4C), has an extent (e.g., width or height) in a first dimension of between 1.5 and 3 inches, an extent (e.g., height or width) in a second dimension of between 1 and 2.5 inches, and an extent in a third dimension (e.g., depth) of between 0.5 and 1 inch. In some embodiments, display 345 has a width of between 1.5 and 3 inches and a height of between 1 and 2.5 inches (e.g., approximately 2 inches in width, plus or minus 20%, and approximately 1.5 inch in height, plus or minus 40%.

In some embodiments, the software components stored in memory 349 include operating system 351 (or a BIOS), communication module (or set of instructions) 352, an input module (or set of instructions) 353, graphics module (or set of instructions) 354, haptic feedback module (or set of instructions) 356, and headphone control module(s) 358. Furthermore, in some embodiments, memory 351 stores a device/global internal state 361, which includes one or more of: active application state, indicating which applications, if any, are currently active; display state, indicating what applications, views or other information occupy various regions of display 345; sensor state, including information obtained from the device's various sensors and other input devices 346, etc.

FIG. 3C illustrates example audio control by a wearable audio output device in accordance with some embodiments. While the following example is explained with respect to implementations that include a wearable audio output device having earbuds to which interchangeable eartips (sometimes called silicon eartips or silicon seals) are attached, the methods, devices and user interfaces described herein are equally applicable to implementations in which the wearable audio output devices do not have eartips, and instead each have a portion of the main body shaped for insertion in the user's ears. In some embodiments, when a wearable audio output device having earbuds to which interchangeable eartips may be attached are worn in a user's ears, the earbuds and eartips together act as physical barriers that block at least some ambient sound from the surrounding physical environment from reaching the user's ear. For example, in FIG. 3C, wearable audio output device 301 is worn by a user such that earbud 303 and eartip 314 are in the user's left ear. Eartip 314 extends at least partially into the user's ear canal. Preferably, when earbud 303 and eartip 314 are inserted into the user's ear, a seal is formed between eartip 314 and the user's ear so as to isolate the user's ear canal from the surrounding physical environment. However, in some circumstances, earbud 303 and eartip 314 together block some, but not necessarily all, of the ambient sound in the surrounding physical environment from reaching the user's ear. Accordingly, in some embodiments, a first microphone (or, in some embodiments, a first set of one or more microphones) 302-1 (e.g., of microphones 302, FIG. 3B) is located on wearable audio output device 301 so as to detect ambient sound, represented by waveform 322, in region 316 of a physical environment surrounding (e.g., outside of) earbud 303. In some embodiments, a second microphone (or, in some embodiments, a second set of one or more microphones) 302-2 (e.g., of microphones 302, FIG. 3B) is located on wearable audio output device 301 so as to detect any ambient sound, represented by waveform 324, that is not completely blocked by earbud 303 and eartip 314 and that can be heard in region 318 inside the user's ear canal. Accordingly, in some circumstances in which wearable audio output device 301 is not producing a noise-cancelling (also called "antiphase") audio signal to cancel (e.g., attenuate) ambient sound from the surrounding physical environment, as indicated by waveform 326-1, ambient sound waveform 324 is perceivable by the user, as indicated by waveform 328-1. In some circumstances in which wearable audio output device 301 is producing an antiphase audio signal to cancel ambient sound, as indicated by waveform 326-2, ambient sound waveform 324 is not perceivable by the user, as indicated by waveform 328-2.

In some embodiments, ambient sound waveform 322 is compared to attenuated ambient sound waveform 324 (e.g., by wearable audio output device 301 or a component of wearable audio output device 301, such as audio I/O logic 312, or by an electronic device that is in communication with wearable audio output device 301) to determine the passive attenuation provided by wearable audio output device 301. In some embodiments, the amount of passive attenuation provided by wearable audio output device 301 is taken into account when providing the antiphase audio signal to cancel ambient sound from the surrounding physical environment. For example, antiphase audio signal waveform 326-2 is configured to cancel attenuated ambient sound waveform 324 rather than unattenuated ambient sound waveform 322.

In some embodiments, wearable audio output device 301 is configured to operate in one of a plurality of available audio output modes, such as an active noise control audio output mode, an active pass-through audio output mode, and a bypass audio output mode (also sometimes called a noise control off audio output mode). In the active noise control mode (also called "ANC"), wearable audio output device 301 outputs one or more audio-cancelling audio components (e.g., one or more antiphase audio signals, also called "audio-cancellation audio components") to at least partially cancel ambient sound from the surrounding physical environment that would otherwise be perceivable to the user. In the active pass-through audio output mode, wearable audio output device 301 outputs one or more pass-through audio components (e.g., plays at least a portion of the ambient sound from outside the user's ear, received by microphone 302-1, for example) so that the user can hear a greater amount of ambient sound from the surrounding physical environment than would otherwise be perceivable to the user (e.g., a greater amount of ambient sound than would be audible with the passive attenuation of wearable audio output device 301 placed in the user's ear). In the bypass mode, active noise management is turned off, such that wearable audio output device 301 outputs neither any audio-cancelling audio components nor any pass-through audio components (e.g., such that any amount of ambient sound that the user perceives is due to physical attenuation by wearable audio output device 301).

In some embodiments, wearable audio output device 301b represents a set of headphones with on-ear earcups to be worn on a user's ears, or over-ear earcups to be worn over a user's ears, rather than one or more earbuds to be worn in the user's ears, and in such embodiments the audio output device case for holding and charging the wearable audio output device will be larger than the audio output device case shown in FIG. 4C, as the case will typically need to be large enough to also hold a headband portion of the wearable audio output device to which the earcups are attached. In some such embodiments, the earcups act as the physical barriers that block at least some ambient sound from the surrounding physical environment from reaching the user's ear. At least one of the earcups includes microphones 302-1 and 302-2 to detect, respectively, ambient sound in the physical environment (corresponding to ambient sound in region 316, represented by waveform 322 in FIG. 3C) and ambient sound that is not completely blocked by the earcup (corresponding to ambient sound that can be heard in region 318, represented by waveform 324 in FIG. 3C). In some embodiments, both earcups include respective pairs of microphones 302 for detecting ambient sound with respect to each earcup.

Attention is now directed towards embodiments of user interfaces ("UI") that are, optionally, implemented on portable multifunction device 100.

Figure 4A:
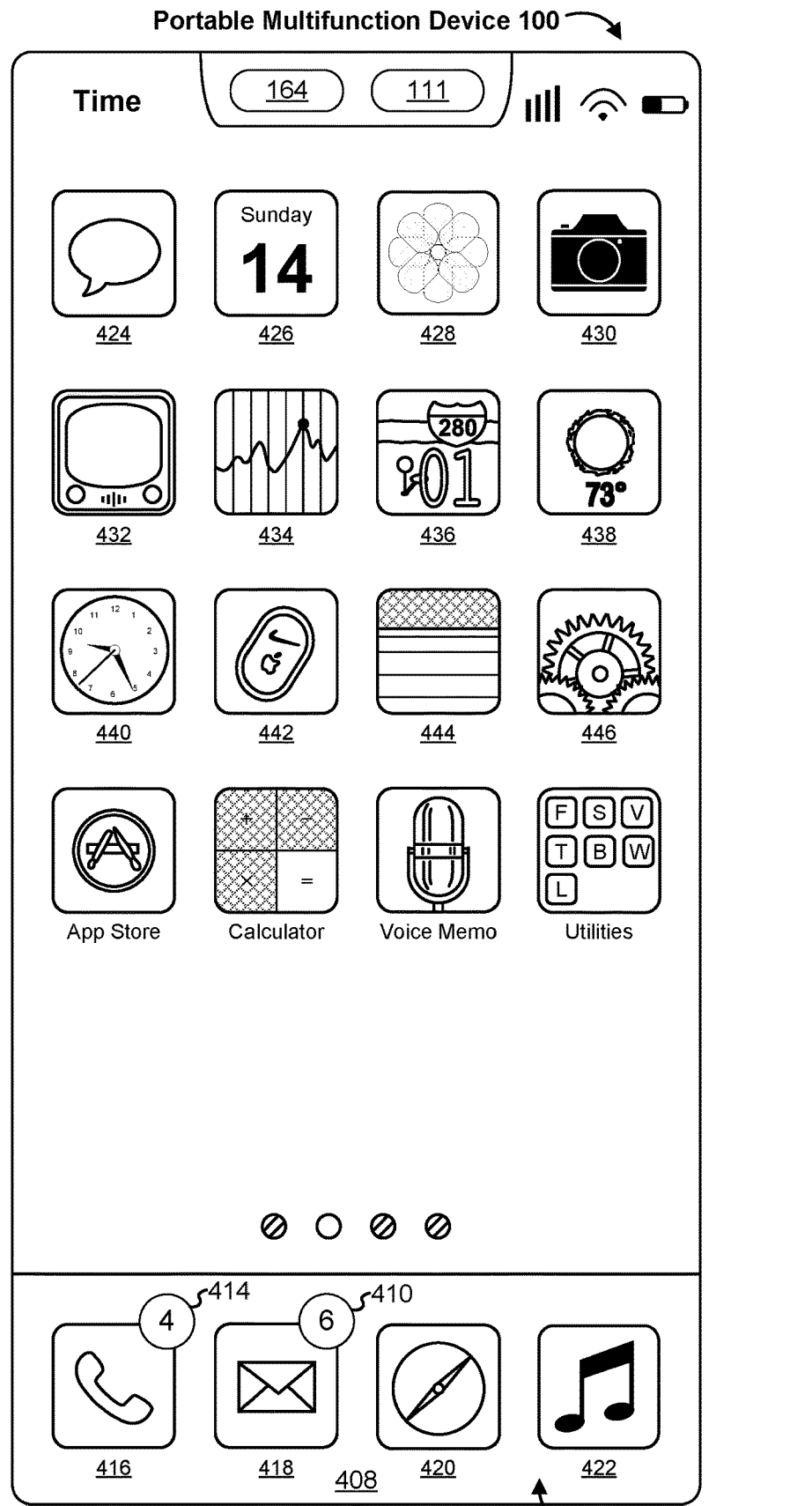
FIG. 4A illustrates an example user interface for a menu of applications on a portable multifunction device in accordance with some embodiments.
Figure 5A:
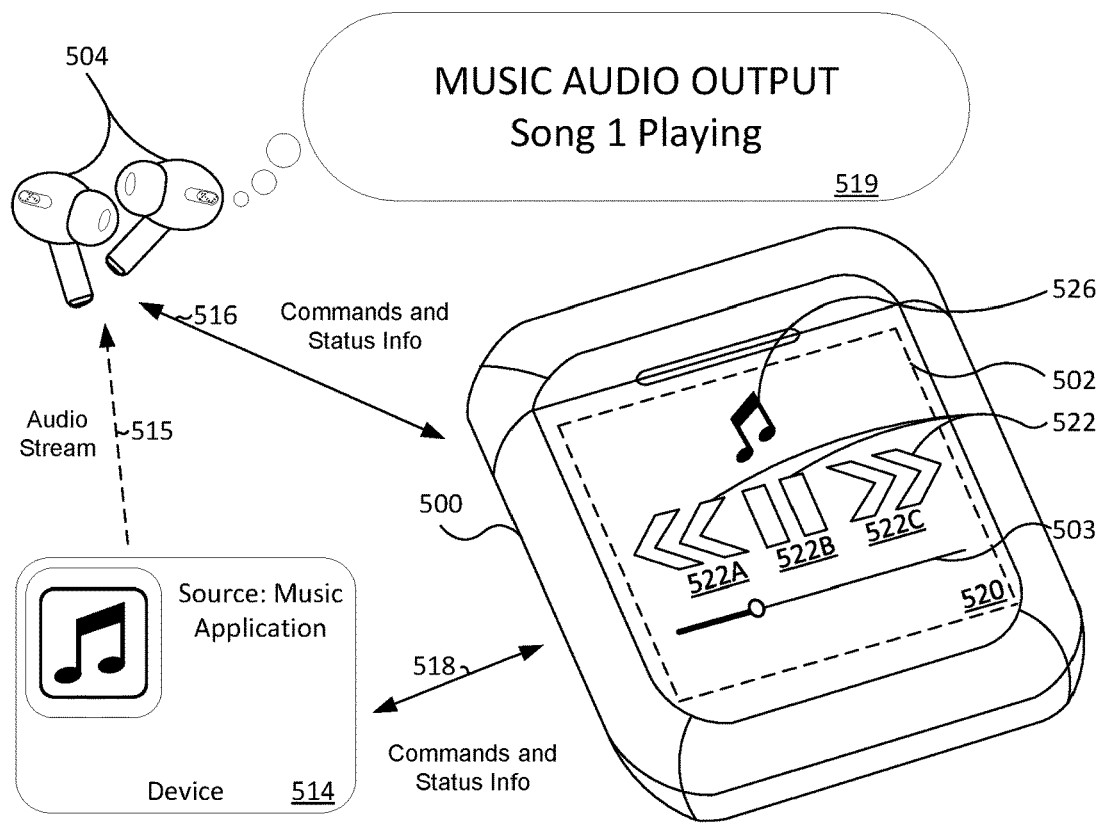
FIGS. 5A-5AAA illustrate example user interfaces and device interactions associated with an audio output device case that is configured to perform operations associated with audio output devices, as well as charge and store the audio output devices, in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, labeled "Music;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
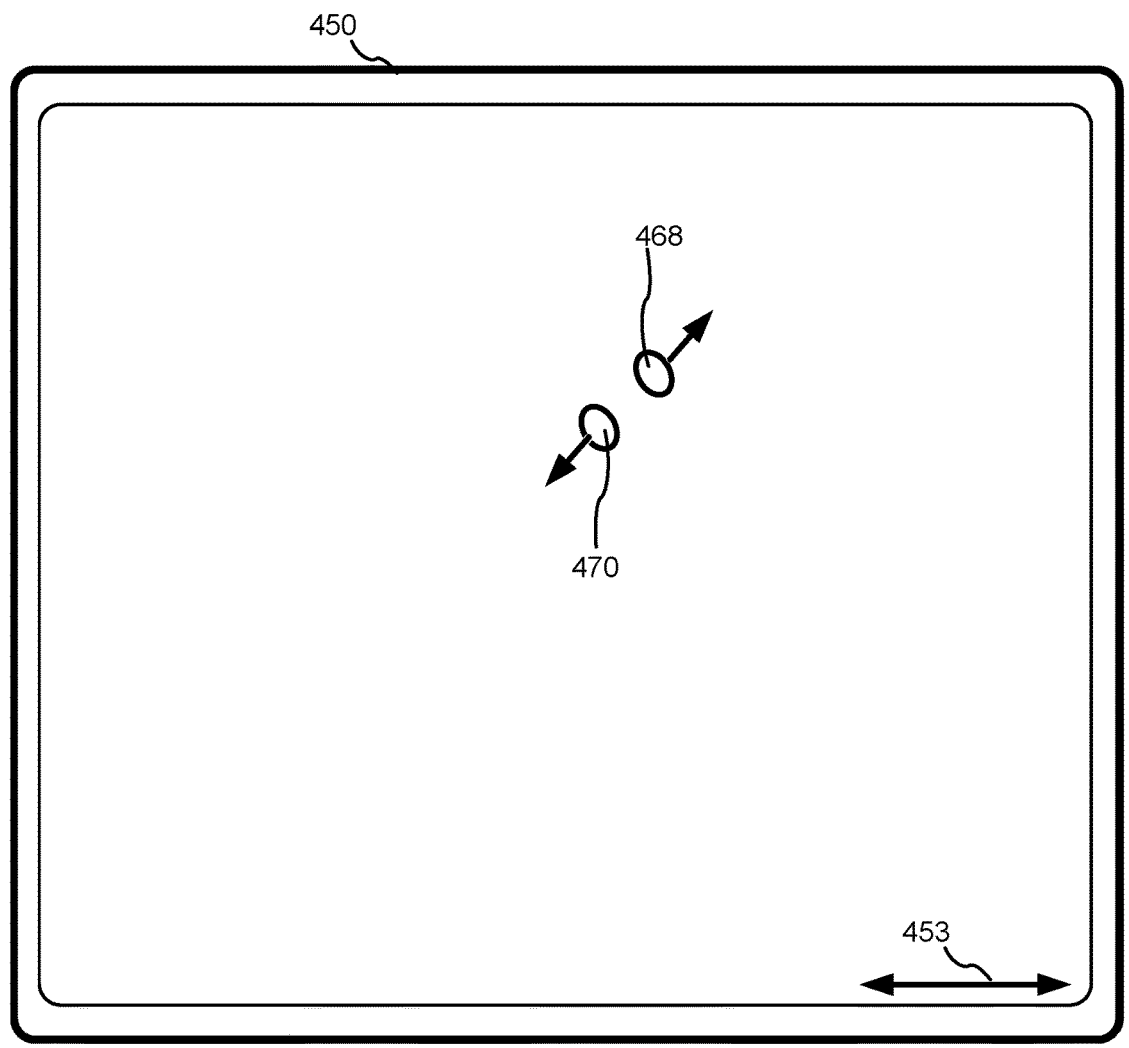
FIG. 4B illustrates an example user interface for a multifunction device with a touch-sensitive surface that is separate from the display in accordance with some embodiments.
Figure 4B:
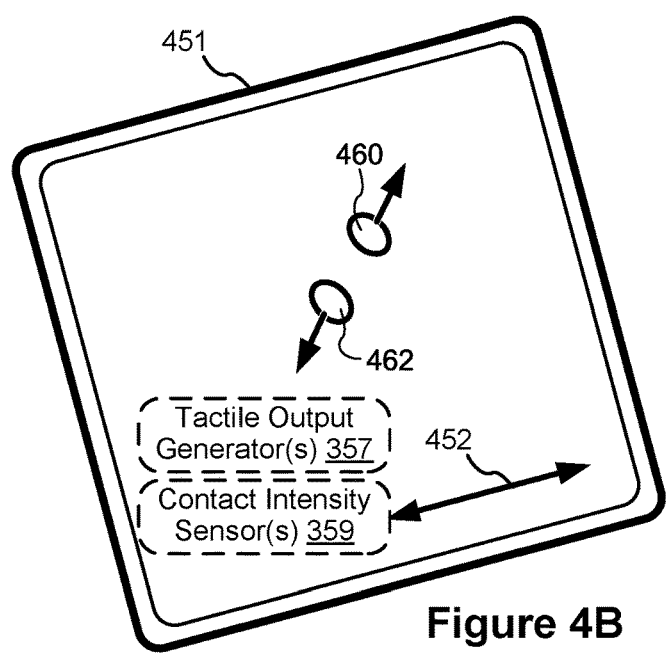
Figure 4C:
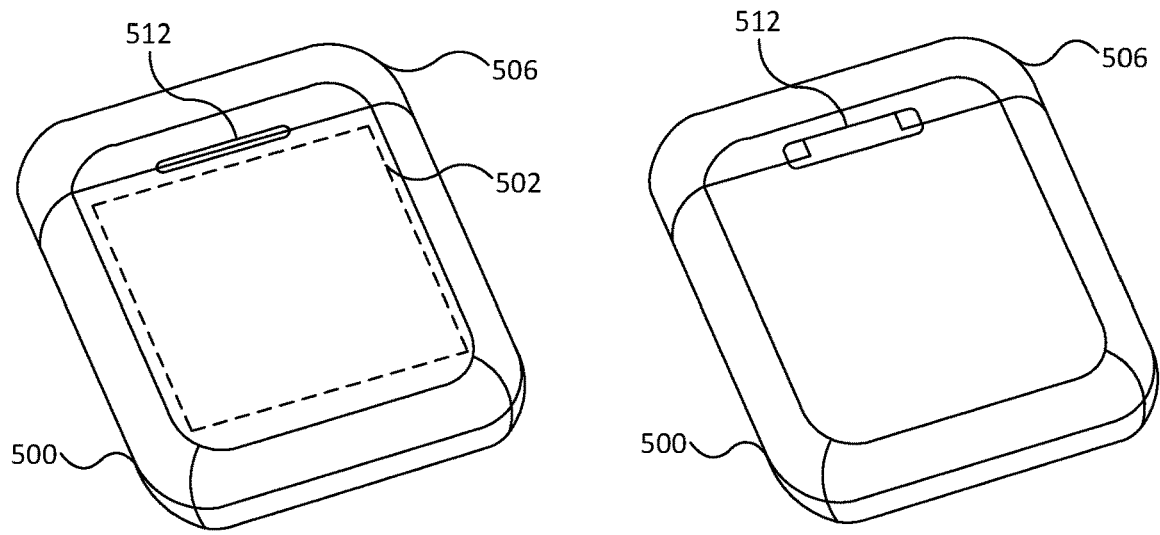
FIG. 4C illustrates physical features of an example of an audio output device case (e.g., wireless headphone case) that includes a touch-sensitive display, in accordance with some embodiments.
Figure 4C:
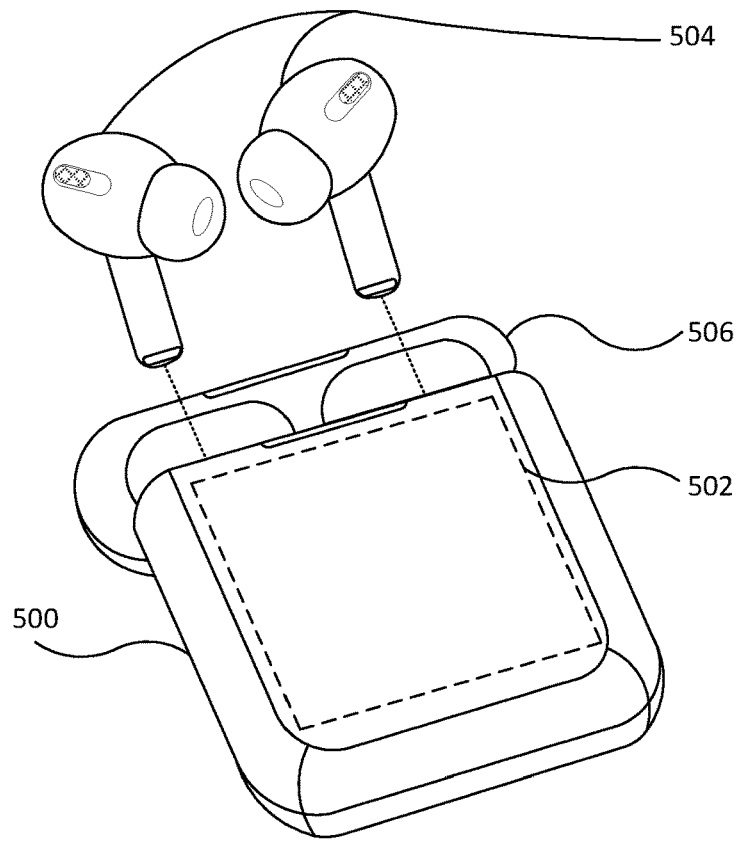

FIG. 4B illustrates an example user interface on a device (e.g., audio output device case 342, FIG. 3D, or headphone case 500, FIG. 4C) with a touch-sensitive surface (e.g., a touch sensitive surface of touch-sensitive display 502, FIG. 4C) that is optionally separate from the display. Although many of the examples that follow will be given with reference to inputs on touch-sensitive display 502 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), touch input position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

FIG. 4C illustrates physical features of an exemplary wireless headphone case 500 (e.g., an audio output device case, such as an audio output device case 342, FIG. 3D) that includes a touch-sensitive display 502 (e.g., one or more input devices and a display). The descriptions provided with respect FIG. 3D are applicable to exemplary wireless headphone case 500 described herein. The exemplary wireless headphone case 500 is in wireless communication with (e.g., paired with) wireless headphones 504 (e.g., one or more audio output) and/or an audio source. In some embodiments, the wireless headphone case 500 is configured to charge (e.g., charge internal batteries of) the wireless headphones 504 when the wireless headphones are positioned inside the wireless headphone case 500. In some embodiments, the wireless headphone case 500 includes a battery (e.g., battery 363, FIG. 3D) for charging internal batteries (e.g., battery 309, FIG. 3B) of the headphones 504 and for powering functions of the wireless headphone case 500 while the wireless headphone case 500 is not connected to an external power source. In some embodiments, as illustrated in FIG. 4C, the wireless headphone case 500 has a hinged cap 506 to encase the wireless headphones 504 while they are inside the wireless headphone case 500 and/or charging. FIG. 4C also illustrates the frontside 508 and the backside 510 of the headphone case 500. The frontside 508 of the headphone case 500 includes a touch-sensitive display 502, and a divot 512 for easing opening and closing of the hinged cap 506. In some embodiments, an input device of the wireless headphone case 500 is divorced from the display of the wireless headphone case 500; for example the frontside of the headphone case 500 may include the display while the backside of the headphone case includes the input device (e.g., a touch-sensitive surface).

User Interfaces and Associated Processes

Attention is now directed towards embodiments of user interfaces ("UI") and associated processes that may be implemented on an electronic device, such as headphone case 500, with (optionally) a display, one or more input devices (e.g., a touch-sensitive surface), (optionally) one or more tactile output generators for generating tactile outputs.

FIGS. 5A-5AAA illustrate example user interfaces and device interactions (e.g., interactions between the audio output devices 504, the audio output device case 500, and an audio source such as a network connected device 514) associated with an audio output device case that is configured to perform operations associated with one or more audio output devices, as well as to charge the audio output devices, in accordance with some embodiments. The user interfaces and device interactions illustrated in these figures are used to illustrate the processes described below, including the processes illustrated by the flowcharts in FIGS. 6A-6F and 7A-7B. For convenience of explanation, some of the embodiments will be discussed with reference to operations performed on a device with a touch-sensitive display 502. In such embodiments, a user input is, optionally: a respective finger or stylus contact, a representative point corresponding to a finger or stylus contact (e.g., a centroid of a respective contact or a point associated with a respective contact), or a centroid of two or more contacts detected on the touch-sensitive display system 502. However, analogous operations are, optionally, performed on a device with a display and one or more separate input devices in response to detecting user inputs on the one or more input devices while displaying the user interfaces shown in the figures on the display 450.

FIG. 5A illustrates wireless headphone case 500 in communication (e.g., wireless communication) with wireless headphones 504 (e.g., indicated by bi-directional arrow 516) and/or an audio source 514 (e.g., indicated by bi-directional arrow 518). In some embodiments, the audio source is a device such as a mobile device, or a connection to a service (e.g., a music streaming service or a cloud service) that provides content (e.g., audio content, or audio and video content). In embodiments in which an audio source is a service, the service is typically implemented on one or more servers (e.g., computers) and accessed via an internet address, interconnection service, or the like. FIG. 5A further illustrates communication (e.g., indicated by arrow 515) between the headphones 504 the source 514. The communication between headphone case 500, headphones 504, and source 514 can include audio streams, commands, and status information. In some embodiments, and typically, the headphones 504 receive direct communications (e.g., indicated by arrow 515) from the source 514 and are able to stream content directly from the source 514 without passing through the headphone case 500. In some embodiments, the headphones 504 are also configured to receive an audio stream from the headphone case 500. In some embodiments, the audio stream transmitted from the headphone case 500 to the headphones 504 can be locally stored on the headphone case or received from the audio source (via wireless communication) and retransmitted by the headphone case 500.

Figure 5B:
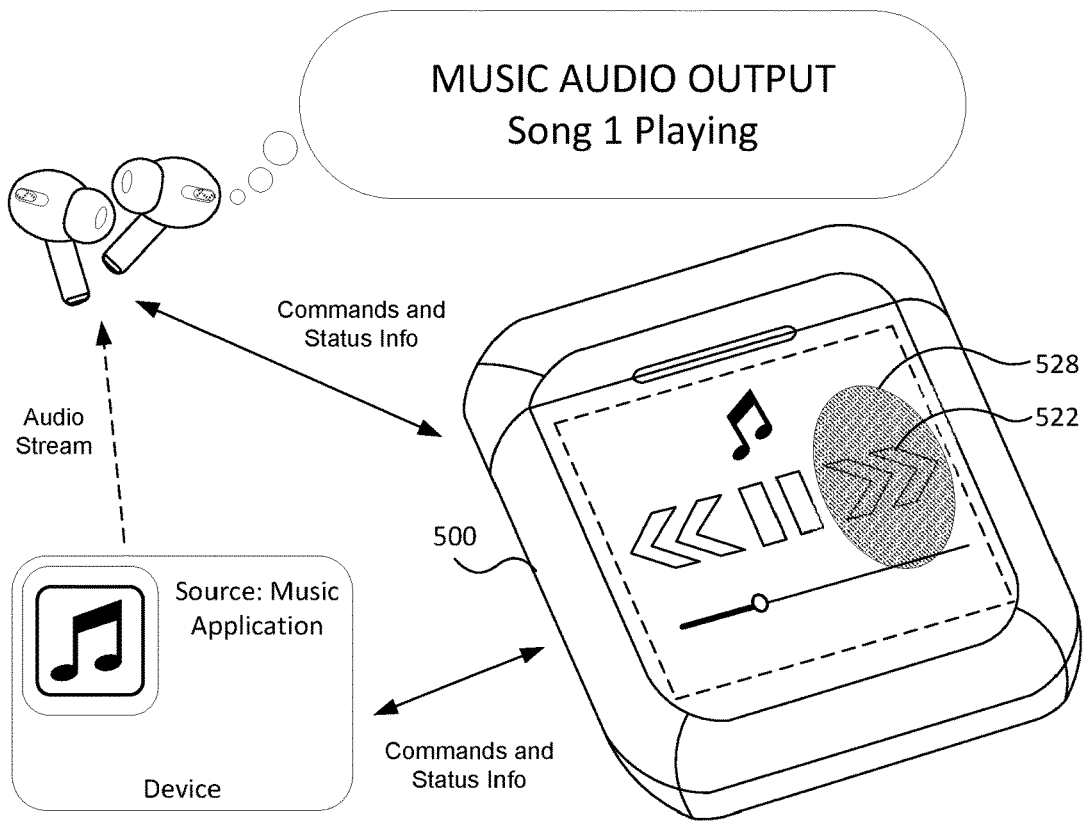

In particular, FIG. 5A shows the headphones 504 outputting a song, as indicated by audio information bubble 519. Touch-sensitive display 502 of the headphone case 500 illustrates an example user interface 520 for displaying information corresponding to the song being output by the headphones 504. Example user interface 520 also includes selectable playback controls 522 (e.g., rewind button 522A, pause button 522B, fast-forward button 522C), a song scrubber 503, and a music icon 526, which represents or indicates the application/source providing the audio stream. Controls 522 and other controls displayed in other use contexts (e.g., examples of which are shown in FIGS. 5B-5AAA) are sometimes called virtual buttons or affordances. In some embodiments, one or more such controls indicate or corresponds to a location, or set of locations, on the audio output device case to which an input or gesture should be directed in order to invoke a corresponding function or functionality.

Figure 5C:
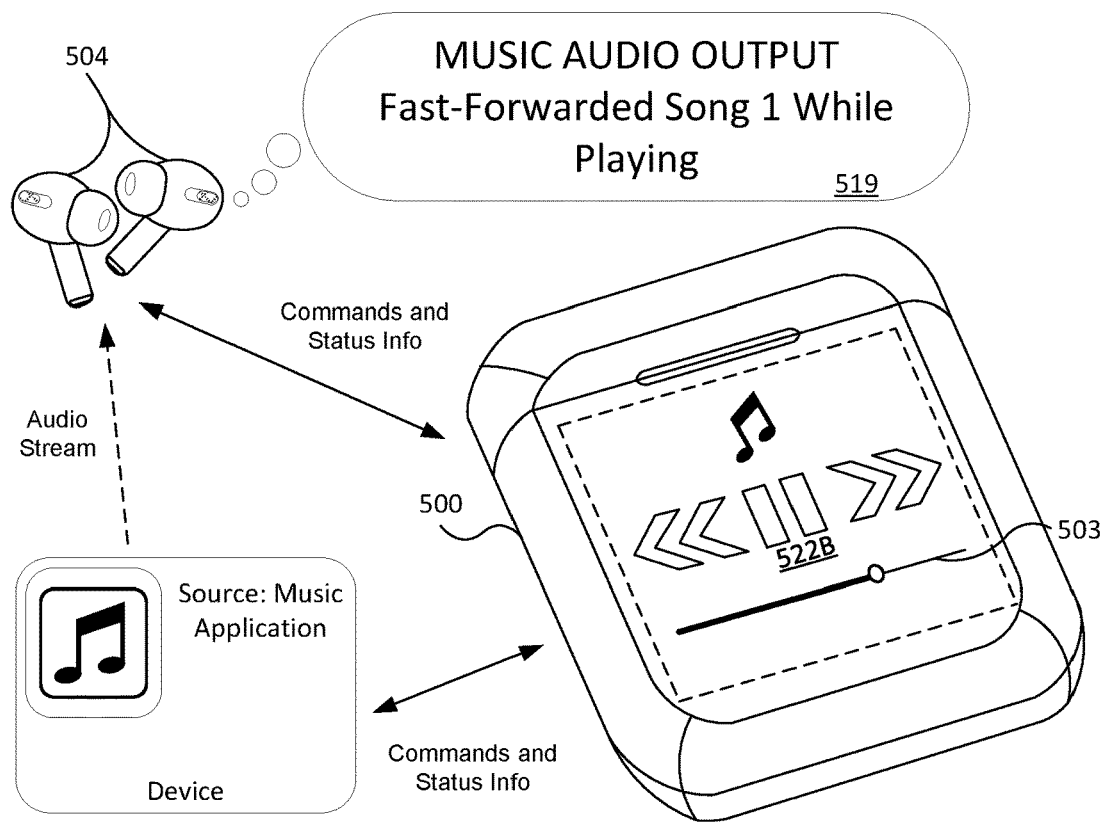

FIG. 5B illustrates an input 528 being received, via the touch-sensitive display, at or over fast-forward button 522C while the song continues to be played. FIG. 5C shows scrubber 503 progressing in comparison to the scrubber 503 shown in FIG. 5B, and thereby indirectly indicates that the headphone case has transmitted one or more commands to fast forward the song being played in response to input 528 (shown in FIG. 5B). Information bubble 519 is also updated to indicate that in response to the input 528 the headphones 504 are now outputting the fast-forwarded audio. FIG. 5C also shows that the communication channels discussed in reference to FIG. 5A are all maintained.

Figure 5D:
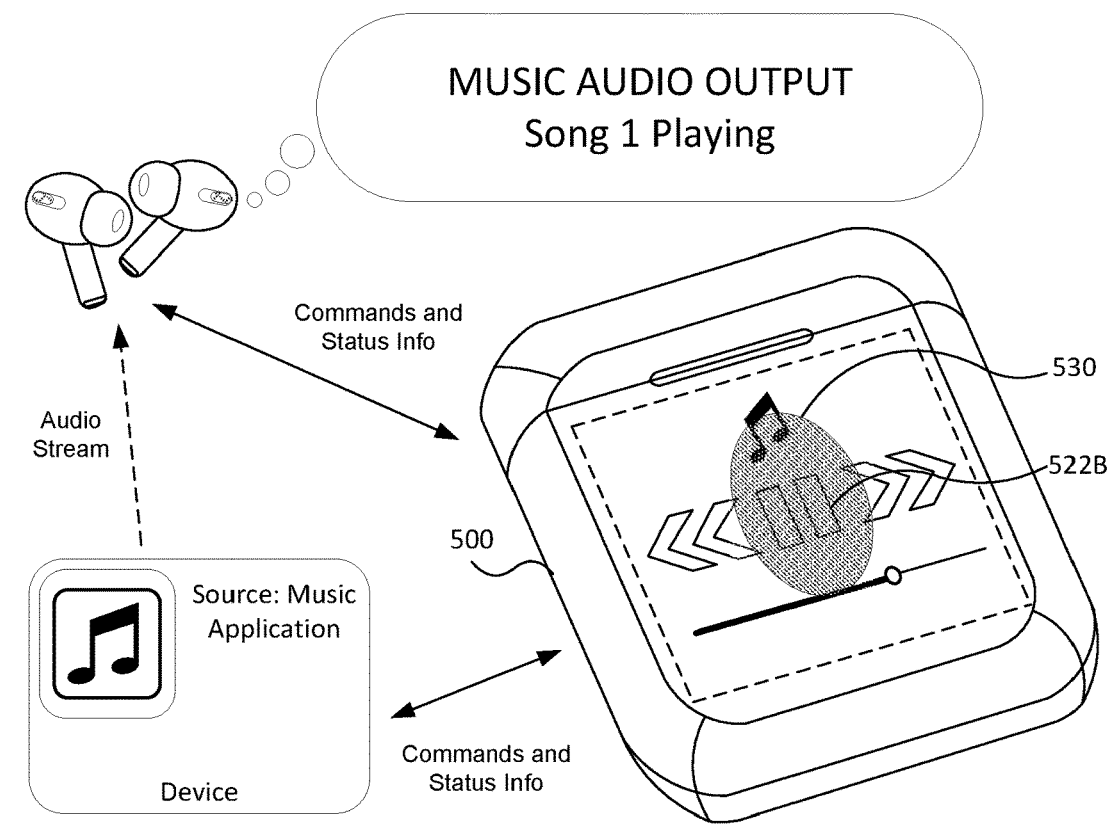
Figure 5E:
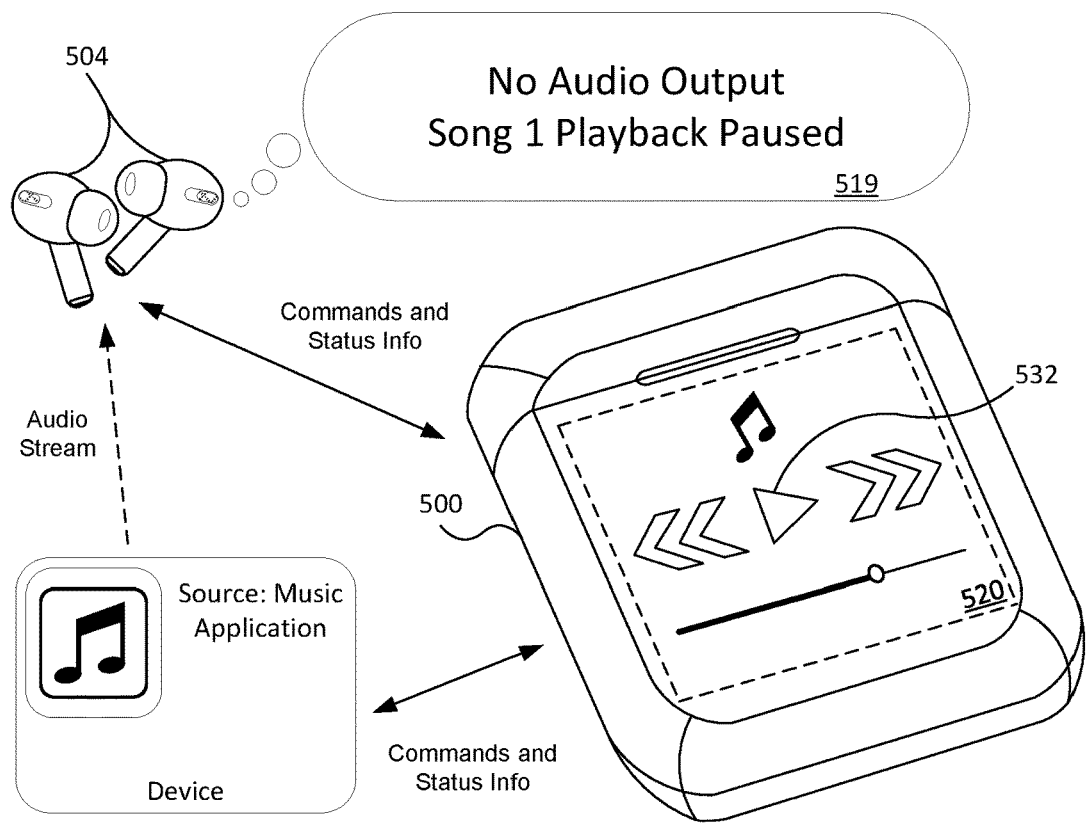

FIG. 5D illustrates an input 530 (e.g., a tap input, or other input) being received, via the touch-sensitive display, at or over pause button 522B while the song is being played. FIG. 5E illustrates that in response input 530 at or over pause button 522B, playback of the song is paused, and thus audio output of the song is stopped. This is indicated by the play button 532 replacing display of the pause button 522B in the example user interface 520. Information bubble 519 is also updated to indicate that in response to the input the headphones 504 are now not outputting audio.

Figure 5F:
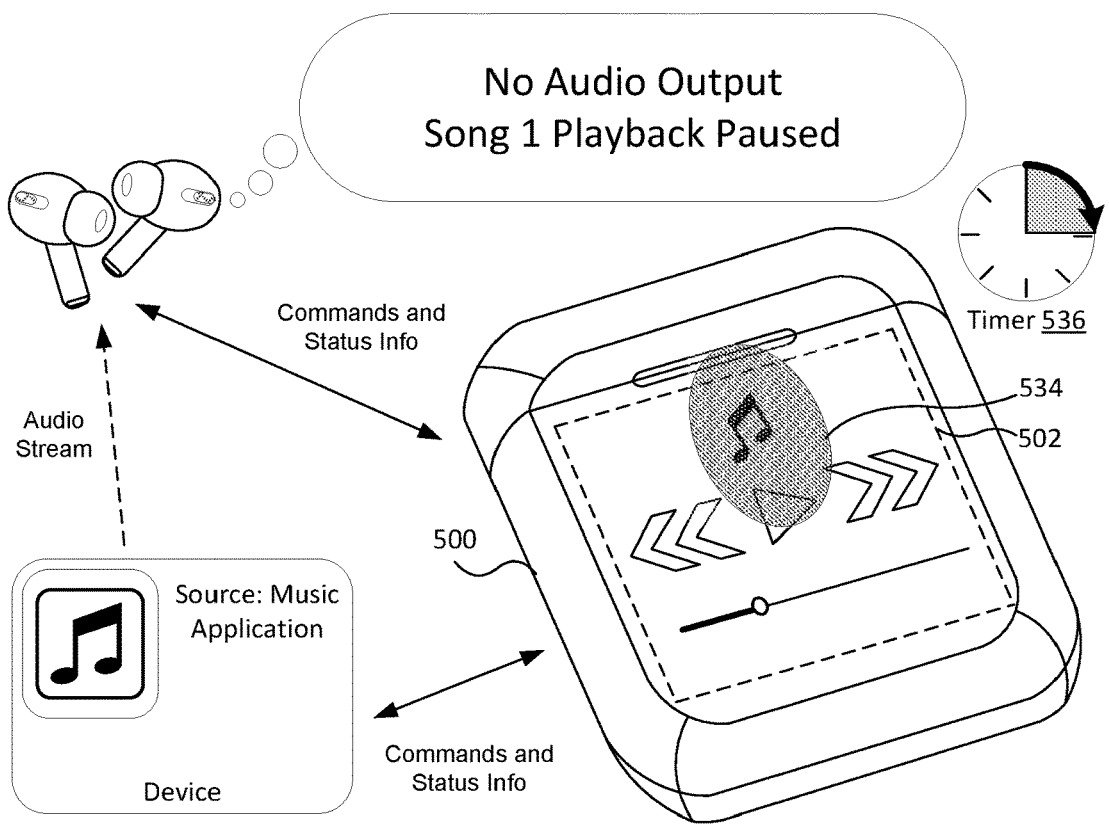

FIG. 5F shows a long-press input 534 being received via the touch-sensitive display 502. The long-press input 534 need not overlap with a specific user interface element and in some embodiments can be received at any location on the touch-sensitive display. To illustrate the long press, timer 536 displays a period of time that takes place prior to the headphone case 500 providing a response.

Figure 5G:
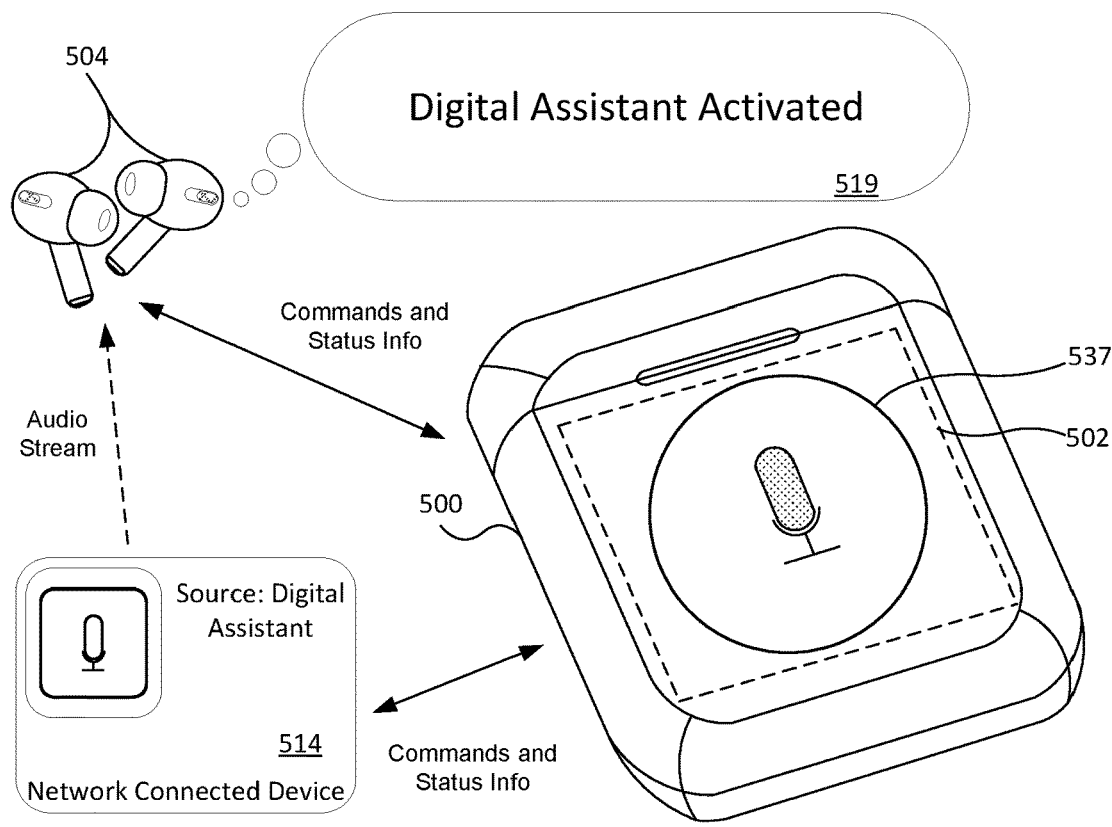

FIG. 5G shows that in response to the long-press input 534 being received via the touch-sensitive display 502, a digital assistant is invoked. To illustrate that the digital assistant is activated and awaiting a response (or a further input) from a user of the headphones 504, example user interface 520 has been updated to display a digital assistant graphic/animation 537. Information bubble 519 is also updated to indicate that in response to the long-press input 534 the headphones 504 are now either awaiting a response from the user and/or outputting audio associated with the invoked digital assistant. In some embodiments, the long-press input 534 sends a digital assistant invocation command to a network connected device 514, and the network connected device 514 invokes the digital assistant and provides corresponding audio to the headphones 504.

Figure 5H:
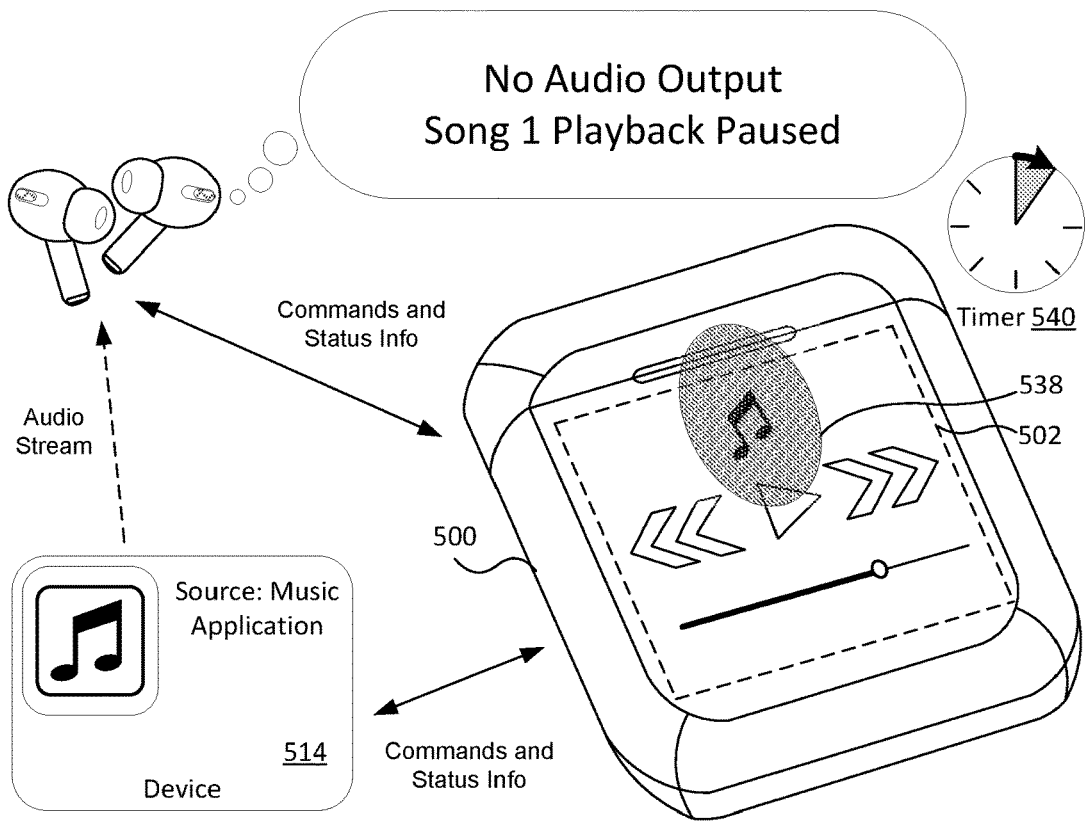

FIG. 5H shows a short-press input 538 being received via the touch-sensitive display 502. The short-press input 538 need not overlap with a specific user interface element and in some embodiments can be received at any location on the touch-sensitive display. To illustrate the short-press input, timer 540 displays a period of time that takes place prior to the headphone case 500 providing a response.

Figure 5I:
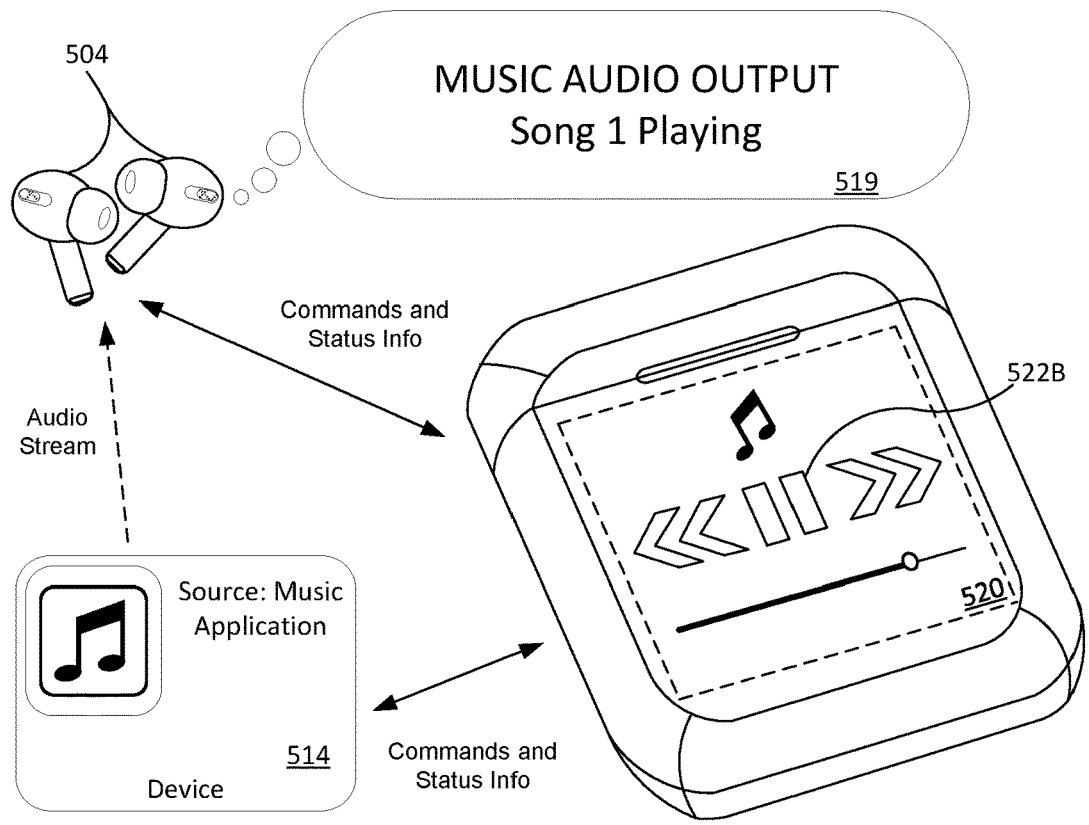

FIG. 5I shows that in response to a short-press input 538 being received via the touch-sensitive display 502, audio playback is resumed (e.g., un-paused). Alternatively, if audio is playing, in response to short-press input 538 being received via the touch-sensitive display 502, audio playback is paused. To illustrate that the music is playing from headphones 504, example user interface 520 has been updated to display a pause button 522B to indicate audio is playing. Information bubble 519 is also updated to indicate that in response to the short-press input 538 the headphones 504 are now outputting song 1.

Figure 5J:
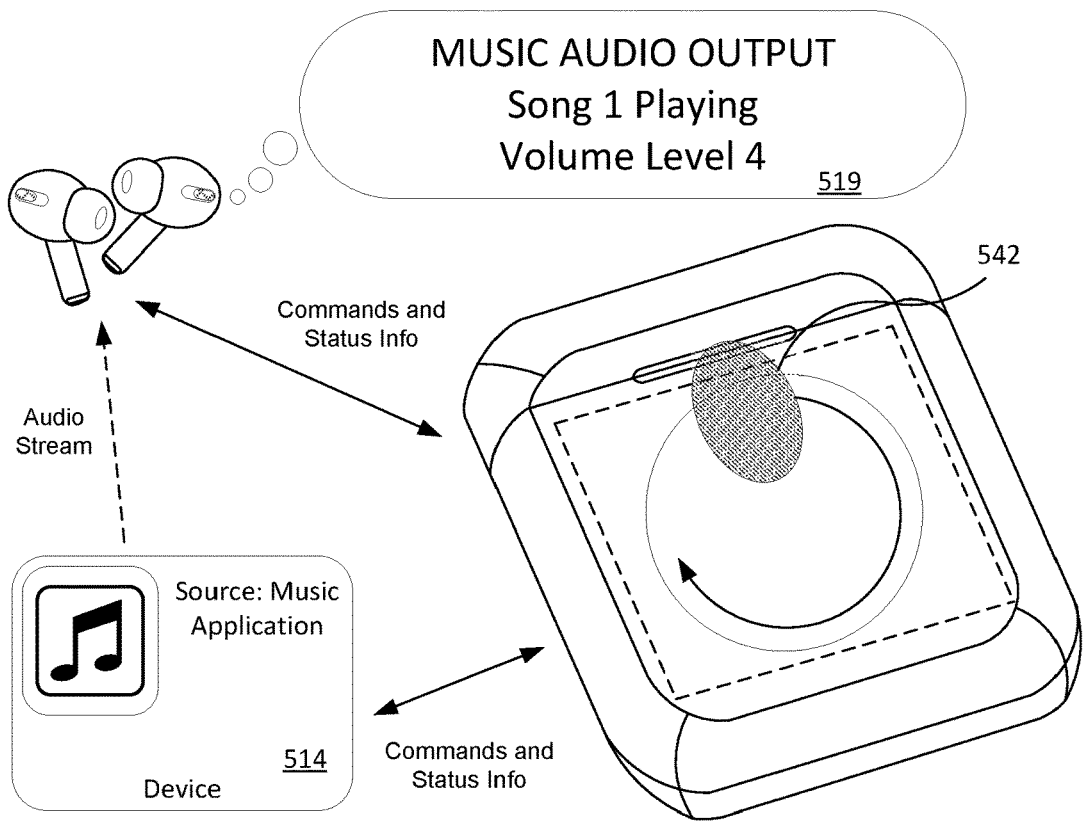
Figure 5K:
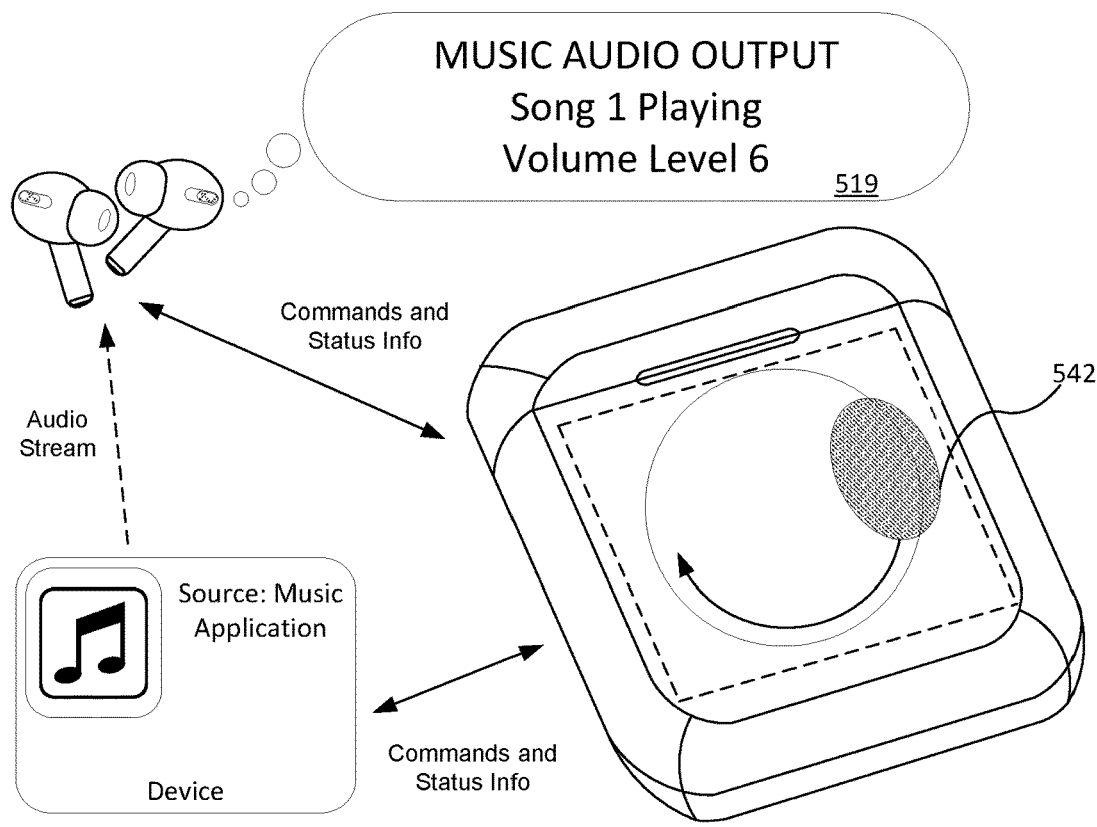
Figure 5L:
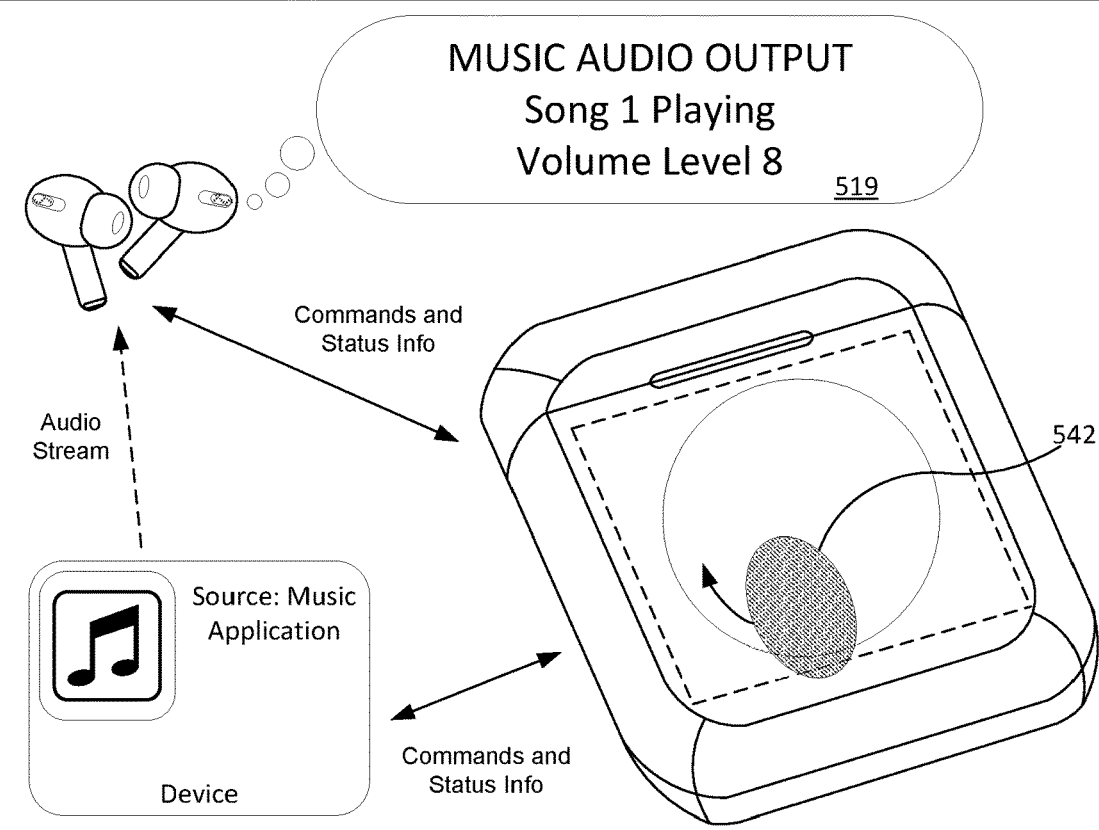

FIGS. 5J-5L illustrate a clockwise rotational input (e.g., an input that moves in a clockwise direction along a substantially circular or elliptical path) that causes the output volume of headphones 504 to be increased (e.g., in response to a rotational input, the headphone case 500 sends one or more commands to the audio source to increase the volume of the audio being sent to headphones 504, in accordance with the direction and amount of the rotational input). Similarly, in this example, a counterclockwise rotational input causes output volume of headphones 504 to be decreased (e.g., in response to a counterclockwise rotational input, the headphone case 500 sends one or more commands to the audio source to decrease the volume of the audio being sent to headphones 504, in accordance with the direction and amount of the rotational input). FIG. 5J, shows clockwise swipe input 542 being received via the touch-sensitive display 502. FIG. 5J also shows that information bubble 519 shows that song one is playing at a volume level of four. FIG. 5K shows clockwise swipe input 542 continuing to move in a clockwise direction, and the volume level increases as the input moves. To illustrate this, information bubble 519 in FIG. 5K is updated to show that song one is playing at a volume level of six. FIG. 5L shows clockwise swipe input 542 continuing to move in a clockwise direction, and the volume level increases as the input moves. To illustrate this, information bubble 519 in FIG. 5L is updated to show that song one is playing at a volume level of eight.

Figure 5M:
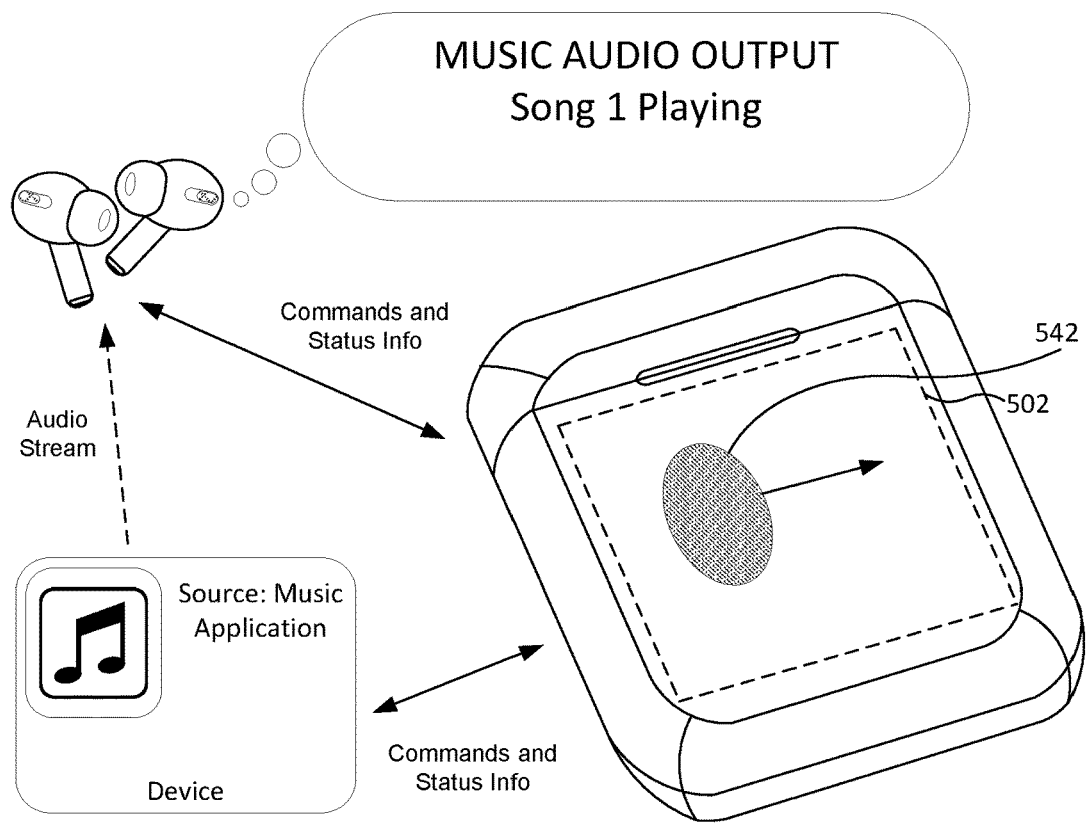
Figure 5N:
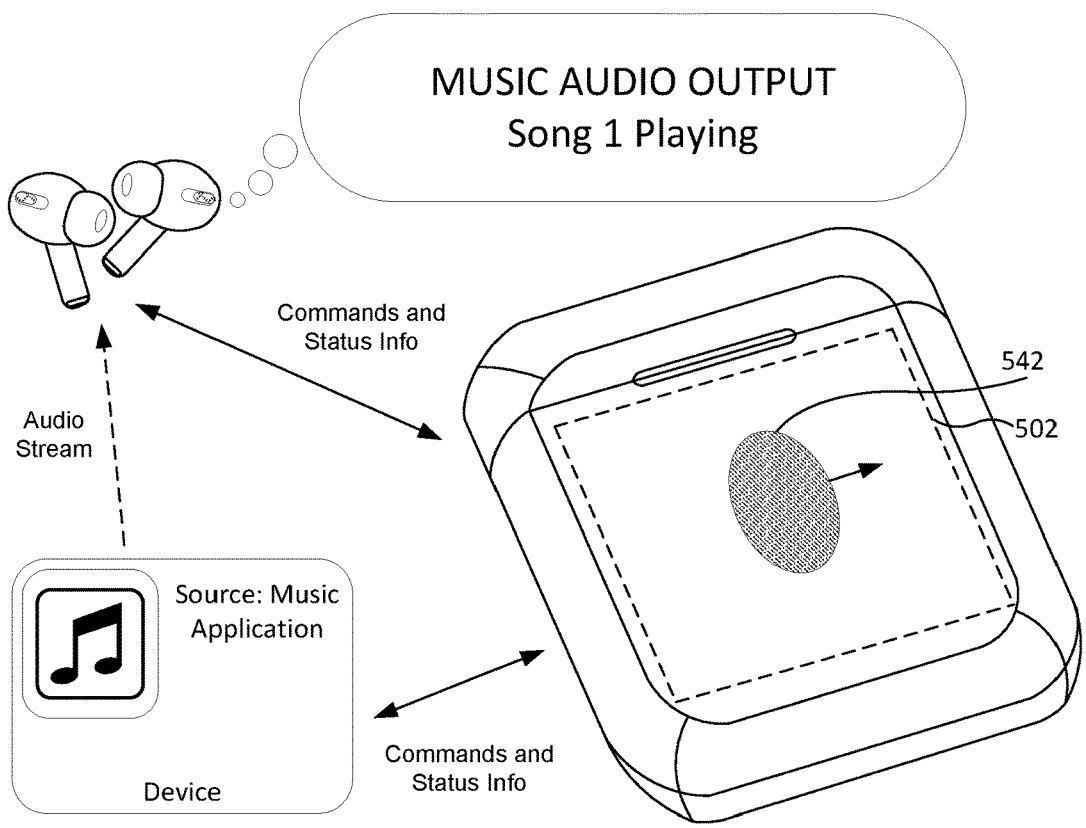
Figure 5O:
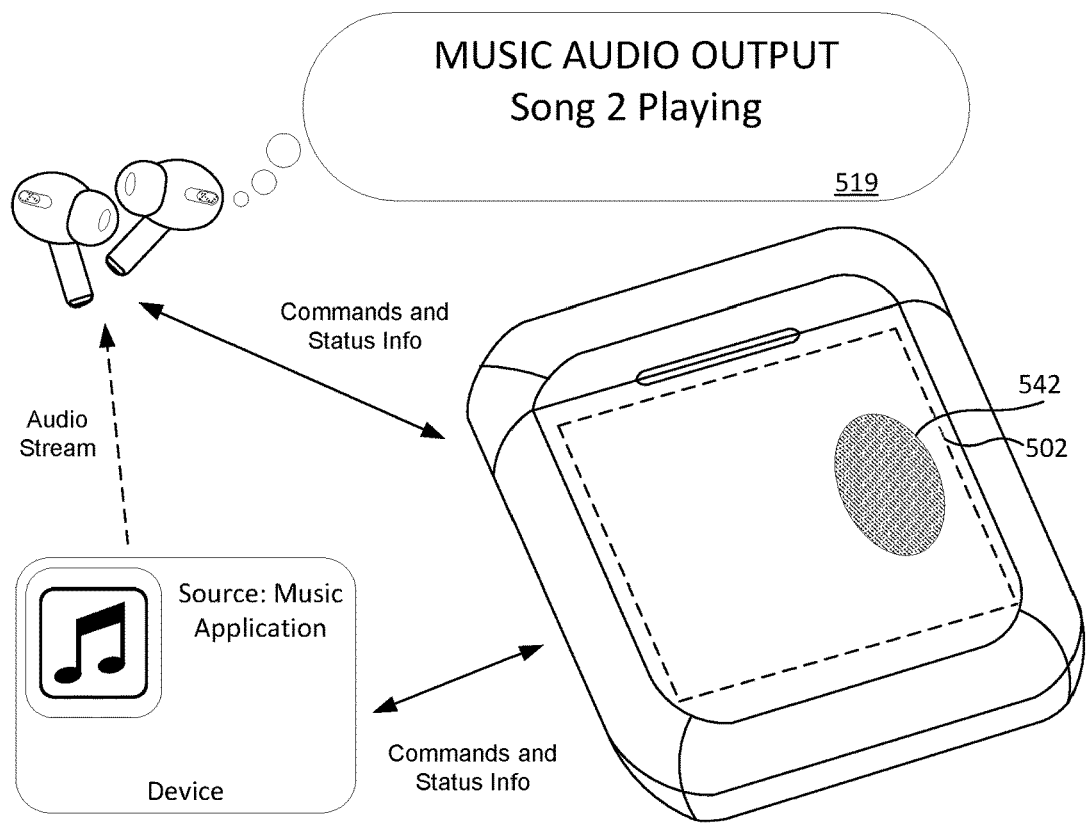

FIGS. 5M-5O illustrate a substantially horizontal swipe gesture received via the touch-sensitive display 502, that causes the headphone case 500 to provide an instruction to the source to play a next song/track of the media being received from the audio source. FIG. 5M illustrates substantially horizontal swipe gesture 542 moving across touch-sensitive display 502. FIG. 5N illustrates substantially horizontal swipe gesture 542 continuing across touch-sensitive display 502. FIG. 5Q illustrates substantially horizontal swipe gesture 542 completing. In response horizontal swipe gesture 542 completing, the next song in a list of songs is selected (e.g., skipping to the next song). This is illustrated by information bubble 519 indicating that song 2 is being played back on headphones 504.

Figure 5P:
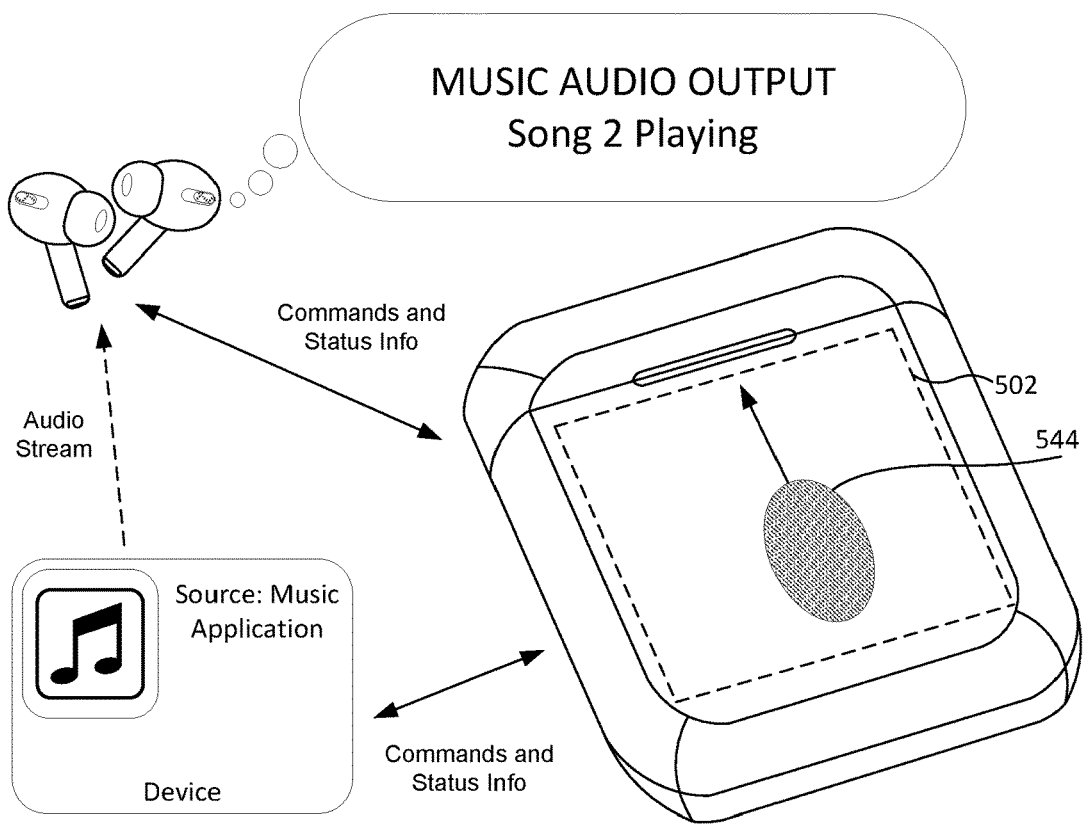
Figure 5Q:
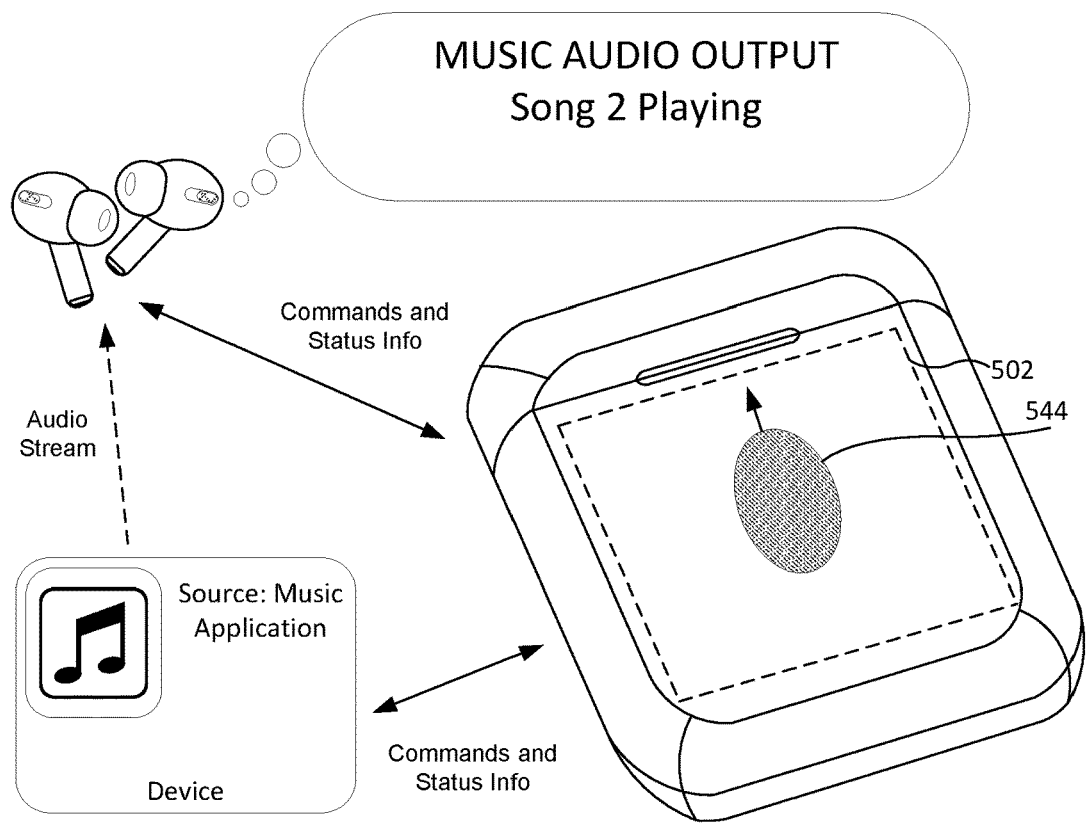
Figure 5R:
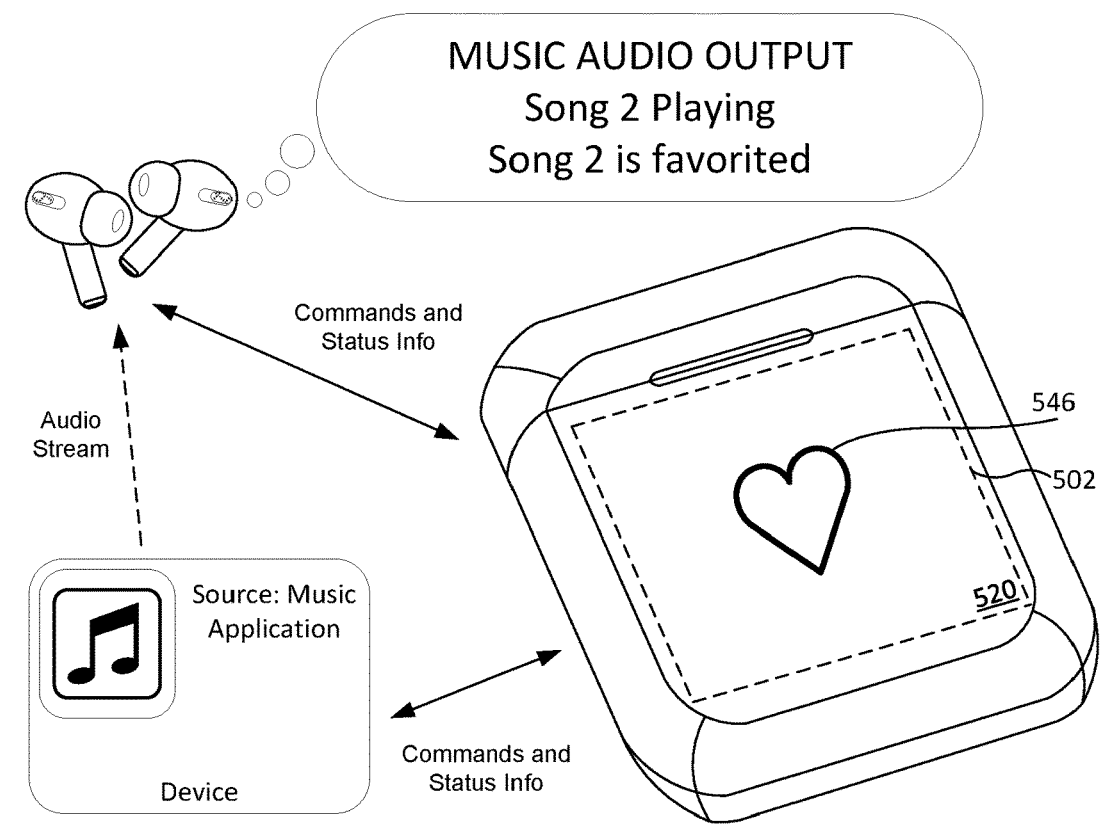

FIGS. 5P-5R illustrate a substantially vertical swipe gesture being received via the touch-sensitive display 502. In this example, when substantially vertical swipe gesture is received and audio is being played back that can have a user preference saved (e.g., liking a song or disliking a song) the gesture will cause the audio being played back to have a user preference saved. FIG. 5P illustrates a substantially vertical swipe gesture 544 moving in an upward direction on the touch-sensitive display 502. FIG. 5Q illustrates substantially vertical swipe gesture 544 continuing in an upward direction on the touch-sensitive display 502. FIG. 5R shows that in response to substantially vertical swipe gesture 544 that moved in an upward direction is complete, the song "is favorited" (e.g., metadata indicating that the user has marked the song as a favorite is stored, e.g., at the source of the media, on another device, such as a device associated with the user, or in an account of the user maintained by a server system). This is illustrated by user interface 520 showing a heart icon/animation 546 to illustrate that the song was liked/favorited. Alternatively, in response to a substantially vertical swipe gesture that moves in a downward direction, the song is unfavorited, e.g., revising or removing metadata associated with the song and/or user). In some embodiments, when a song is unfavorited a different icon/animation is shown, such as a broken heart.

Figure 5S:
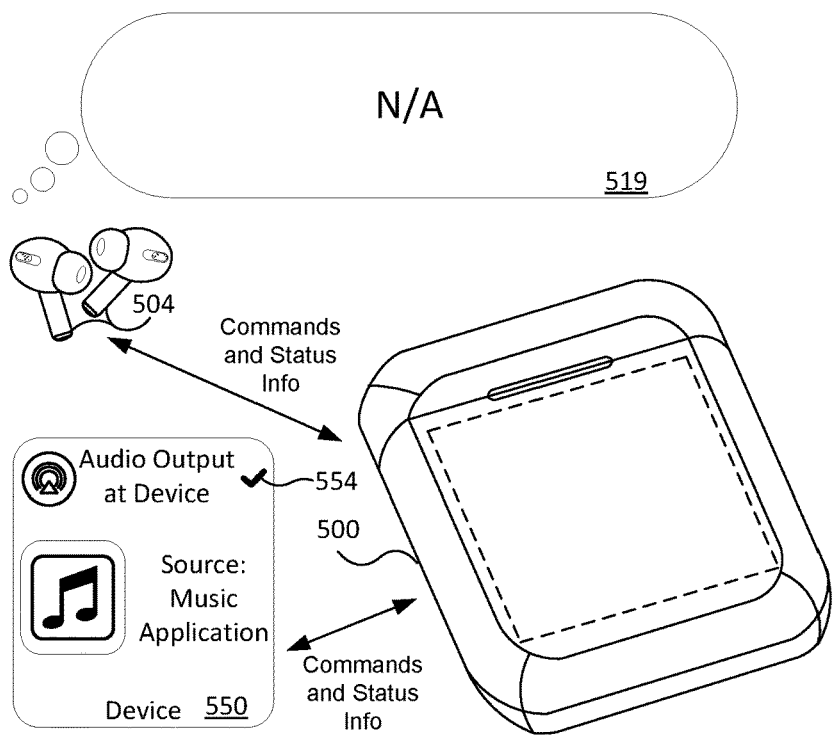
Figure 5S:
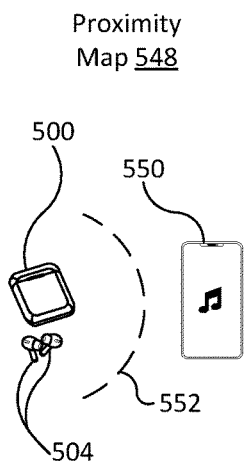

FIG. 5S illustrates a proximity map 548, which shows indicates whether headphone case 500 and the headphones 504 are in-range or out-of-range of an external device 550, or at a distance closer than or further than a threshold distance. In some embodiments, external device 550 is source 514 (e.g., a network connected device, as shown in FIG. 5G). Proximity map 548 illustrates in FIG. 5S that the headphone case 500 and the headphones 504 are out of range (e.g., illustrated by dashed line 552). FIG. 5S also illustrates that the device 550 is currently outputting audio from the music application at the device 550, e.g., using speakers integrated in device 550 and not the headphones 504. This playback of audio at device 550 is illustrated by a checkmark 554. Lastly, FIG. 5S illustrates, via information bubble 519, that the headphones 504 are currently not outputting any audio.

Figure 5T:
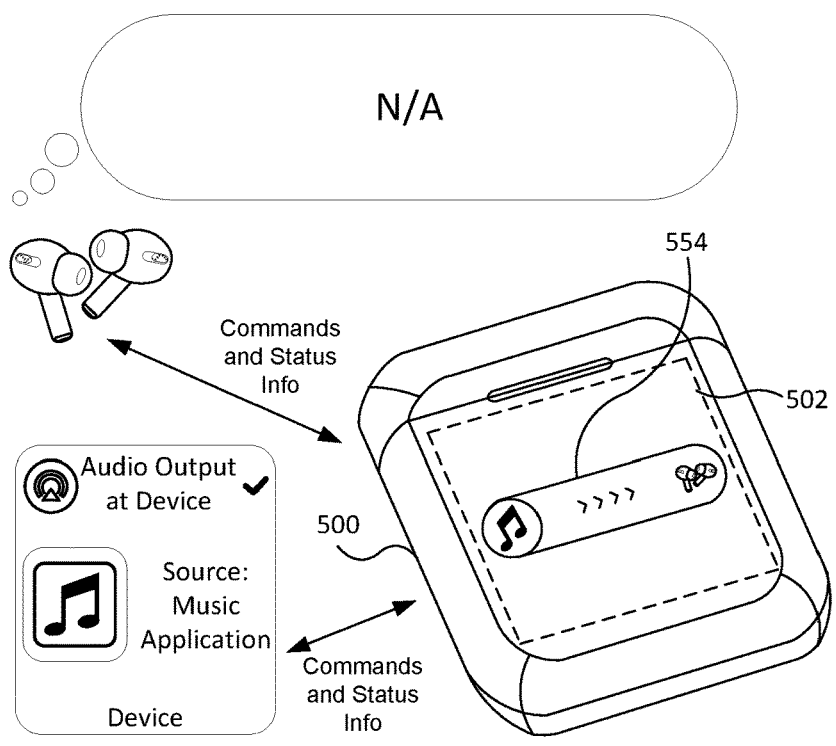
Figure 5T:
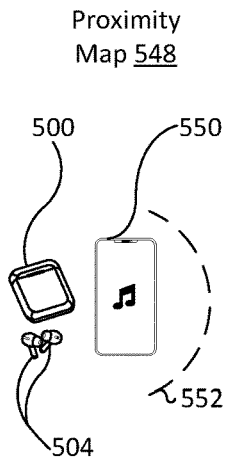

In FIG. 5T, proximity map 548 has been updated to show that the headphone case 500 and headphones 504 are in-range of the external device 550 or at a distance closer than a threshold distance, as indicated by dashed line 552. In this example, while the headphone case 500 and headphones 504 are in communication with the external device 550, the headphone case 500 dynamically displays, on touch-sensitive display 502, a sliding control 554 for transferring audio of the external device 550 to the headphones 504. In this example, sliding control 554 illustrates a draggable icon that visually represents transferring audio from the external device 550 to the headphones 504.

Figure 5U:
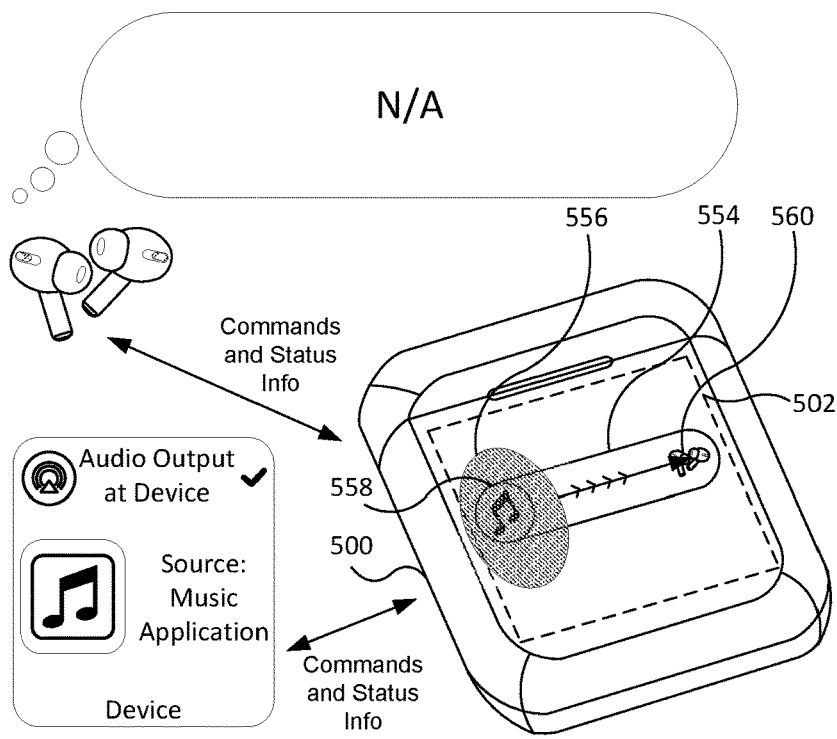
Figure 5V:
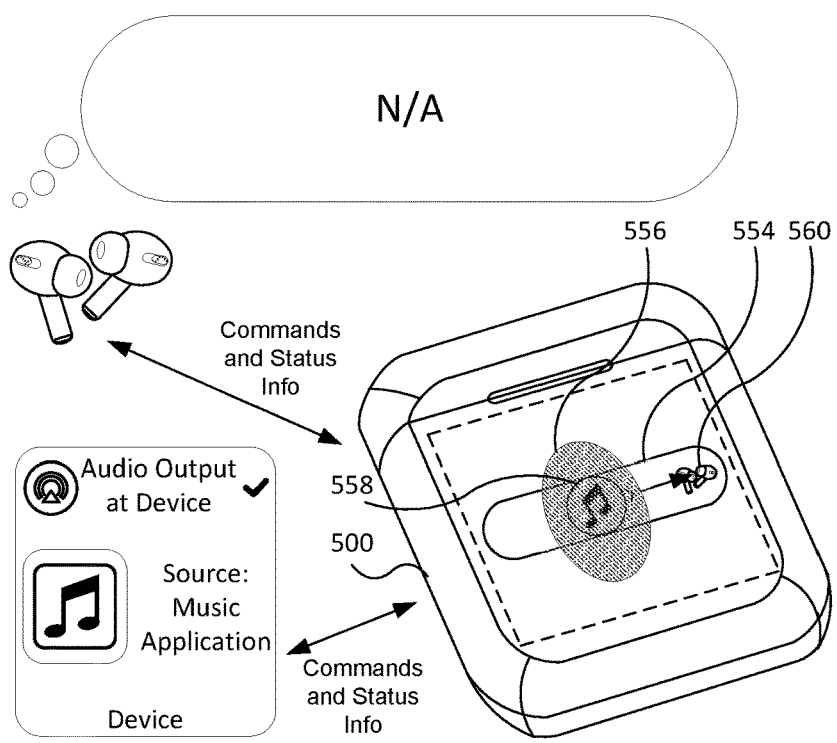
Figure 5W:
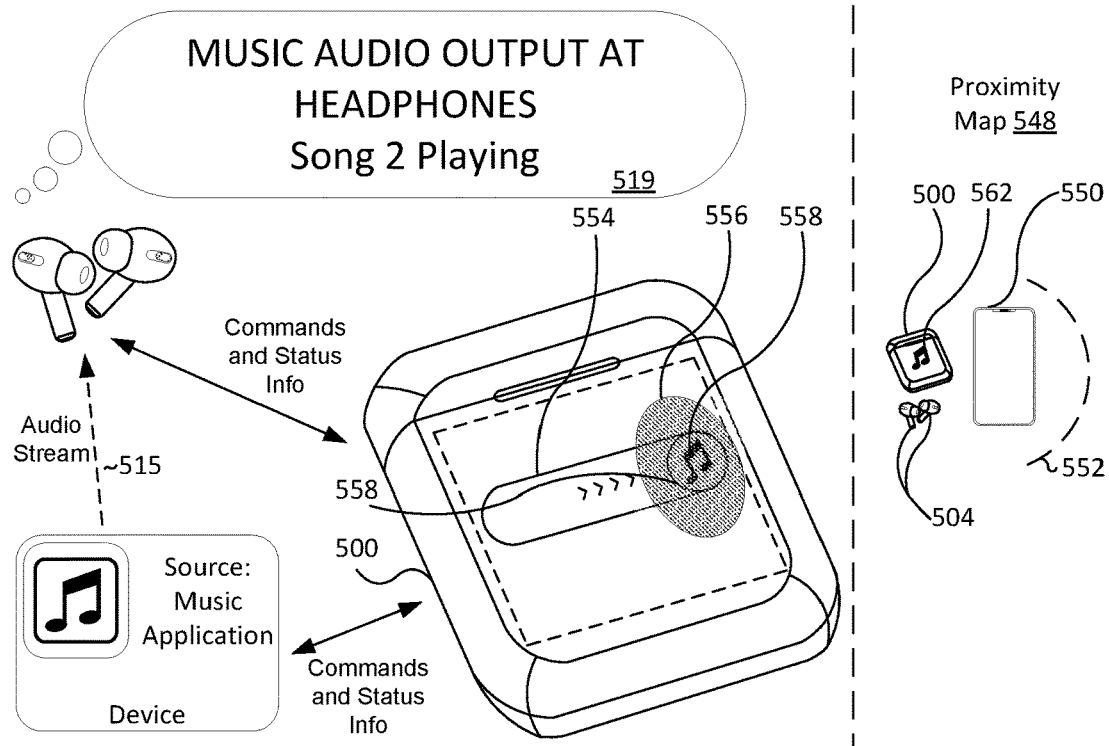

FIGS. 5U-5W shows a dragging gesture that when completed causes the audio that was previously being played on the external device 550 to be output by the headphones 504. FIG. 5U shows dragging (e.g., swipe) input 556 beginning on the draggable music icon 558. FIG. 5V shows the dragging input 556 continuing to drag the draggable music icon 558 towards the headphone icon 560. FIG. 5W illustrates the dragging input 556 being dragged to a point where the draggable music icon 558 overlaps with headphone icon 560 (obscured by icon 558 due to the overlap). FIG. 5W also illustrates that in response to draggable music icon 558 overlapping with headphone icon 560 (and in some embodiments, also in accordance with a determination that a lift off of the dragging input 556 occurs), audio output from external device 550 has been switched to output on the headphones 504. This switching of audio is illustrated in FIG. 5W by the information bubble 519 now stating that song 2 is playing on the headphones, the audio stream arrow 515 being displayed again, and music icon 562 being displayed on the headphone case in proximity map 548.

Figure 5X:
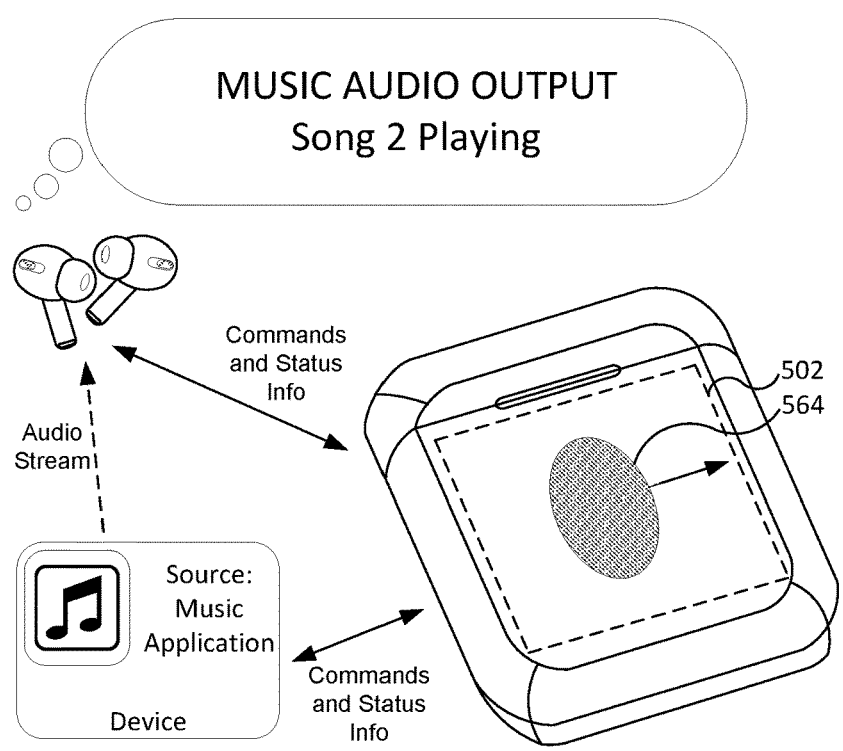
Figure 5Y:
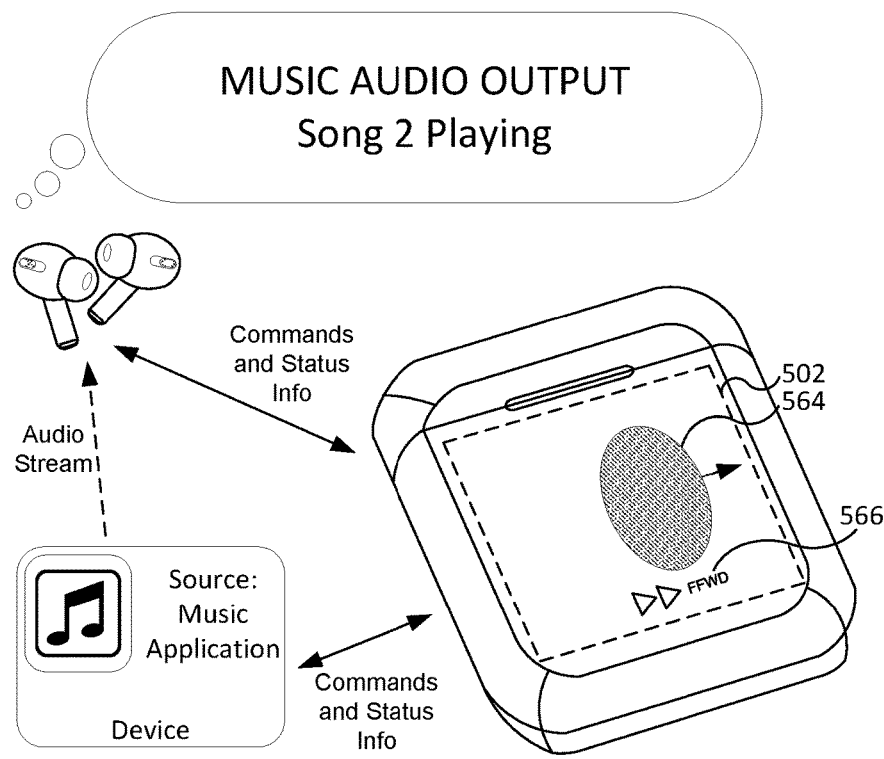
Figure 5Z:
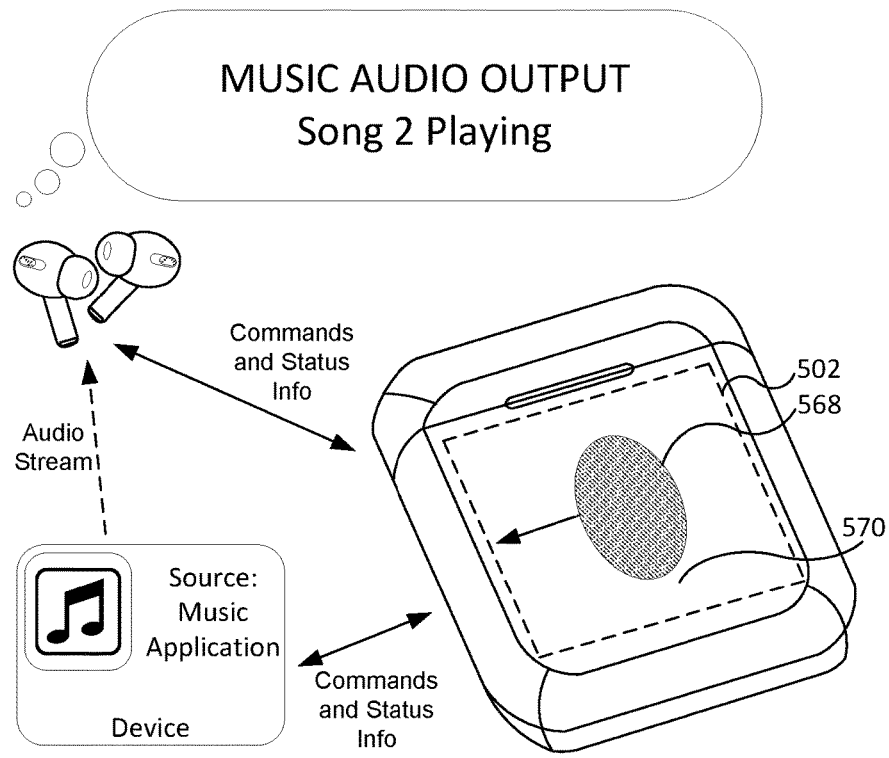
Figure 5A:
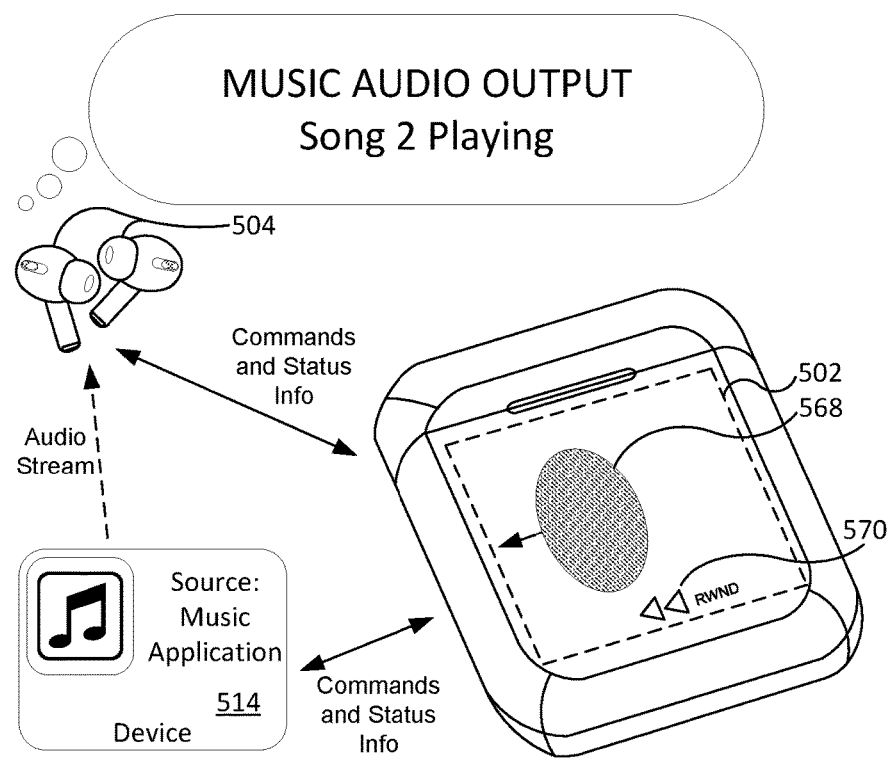
Figure 5A:
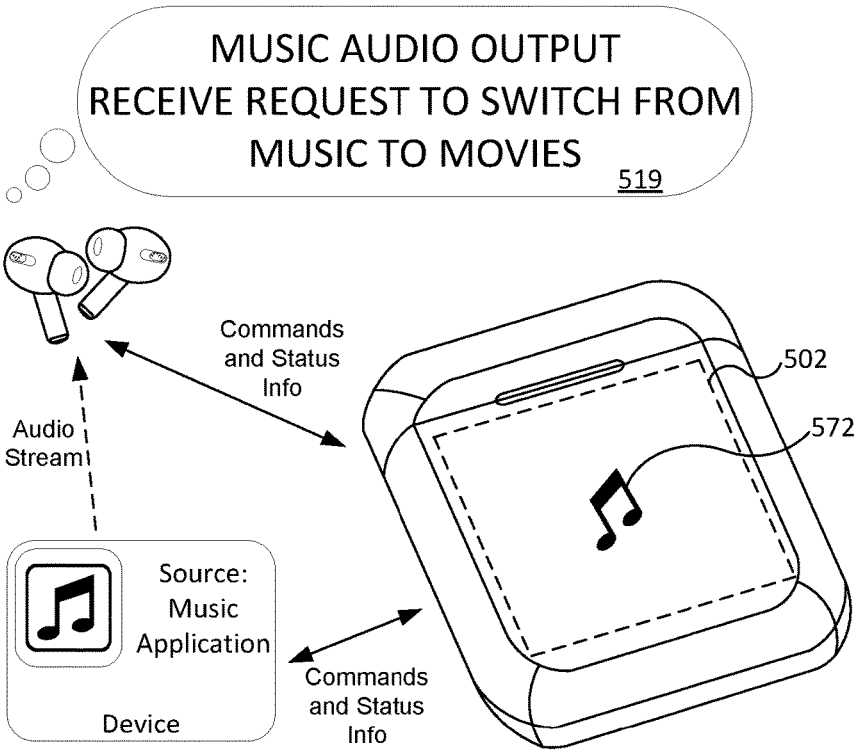
Figure 5A:
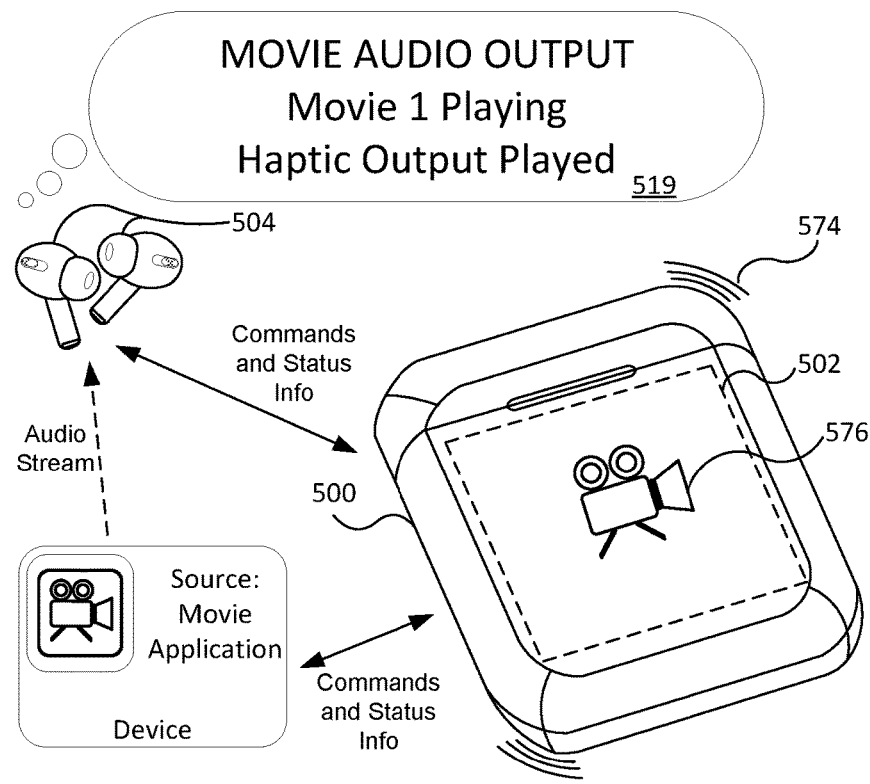
Figure 5A:
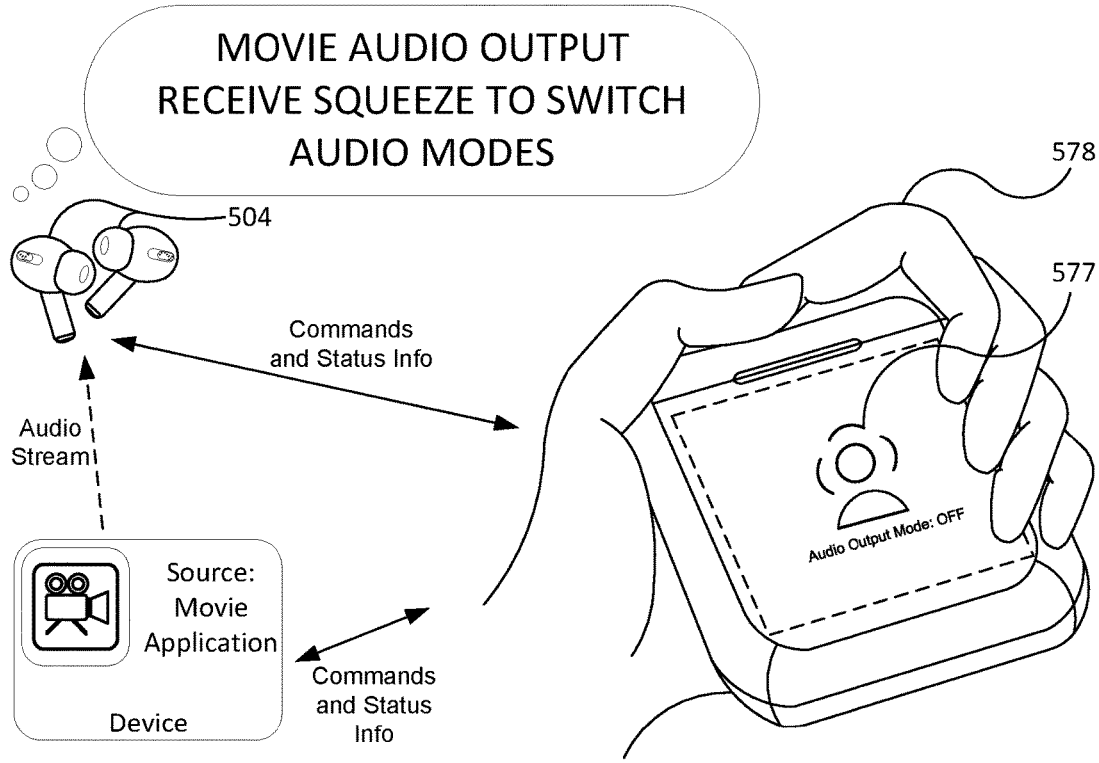
Figure 5A:
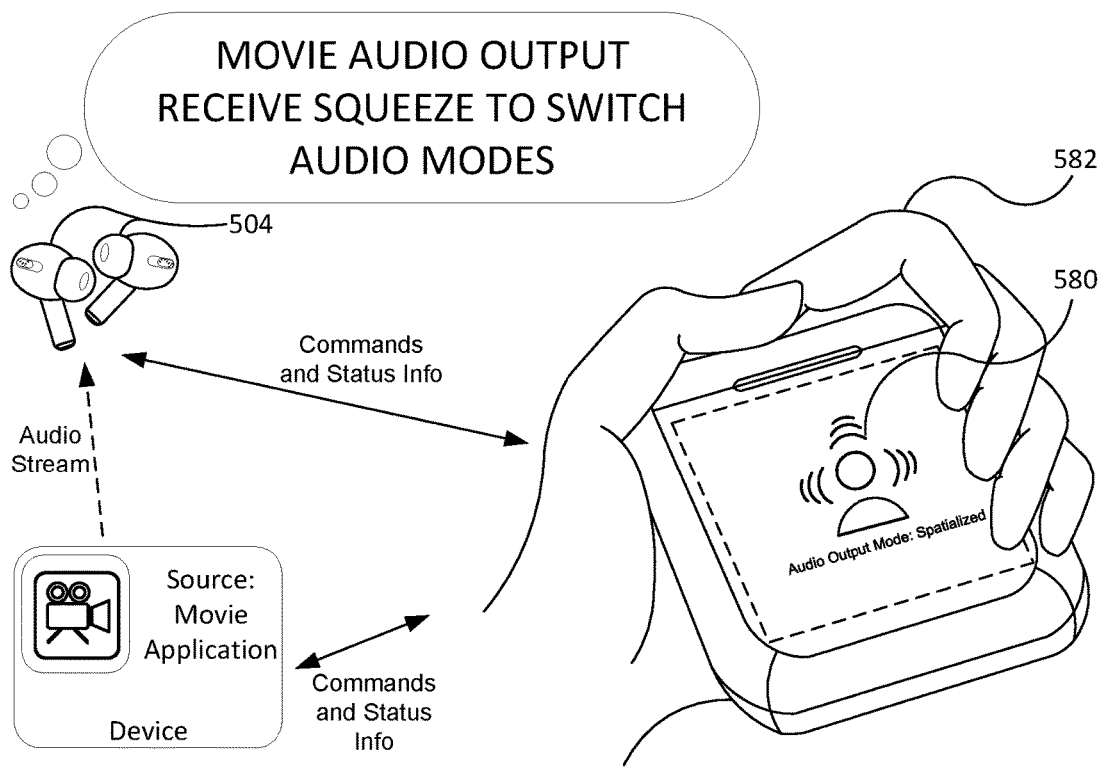
Figure 5A:
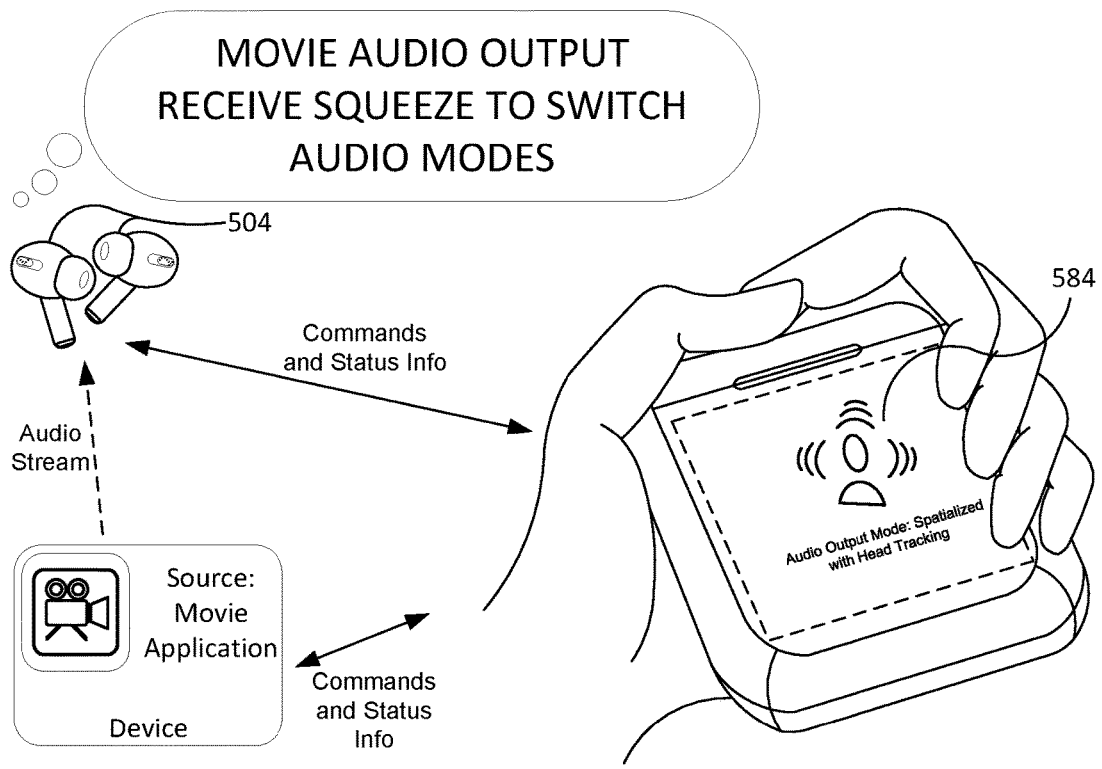
Figure 5A:
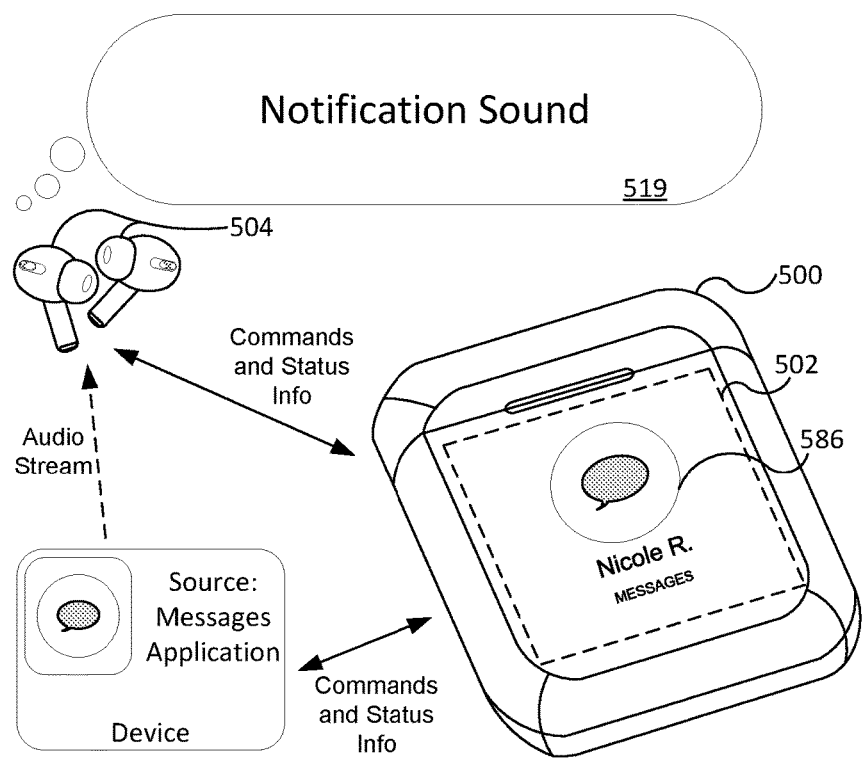
Figure 5A:
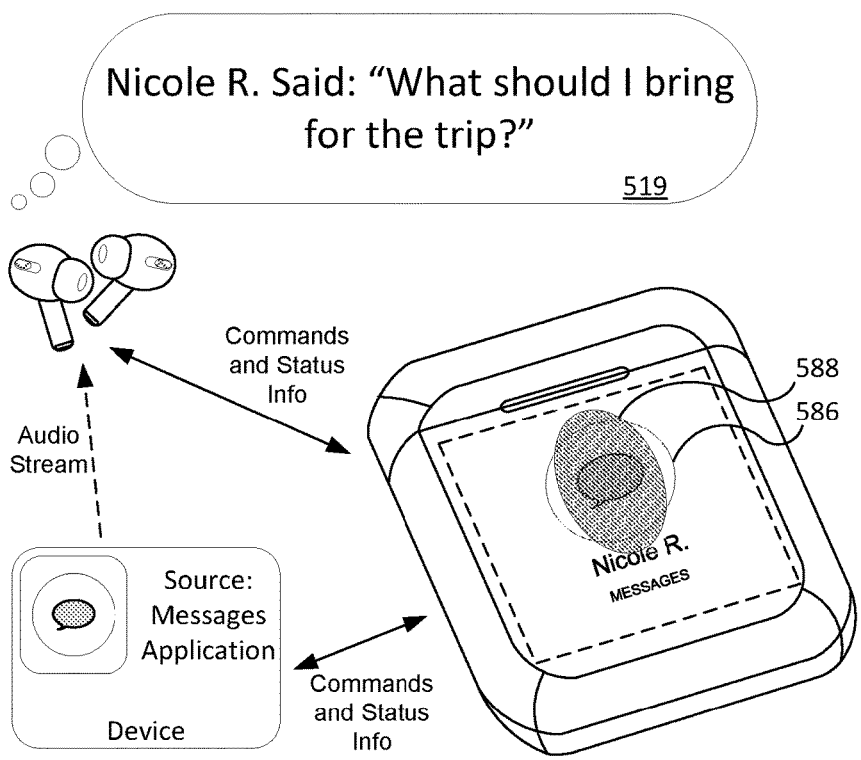
Figure 5A:
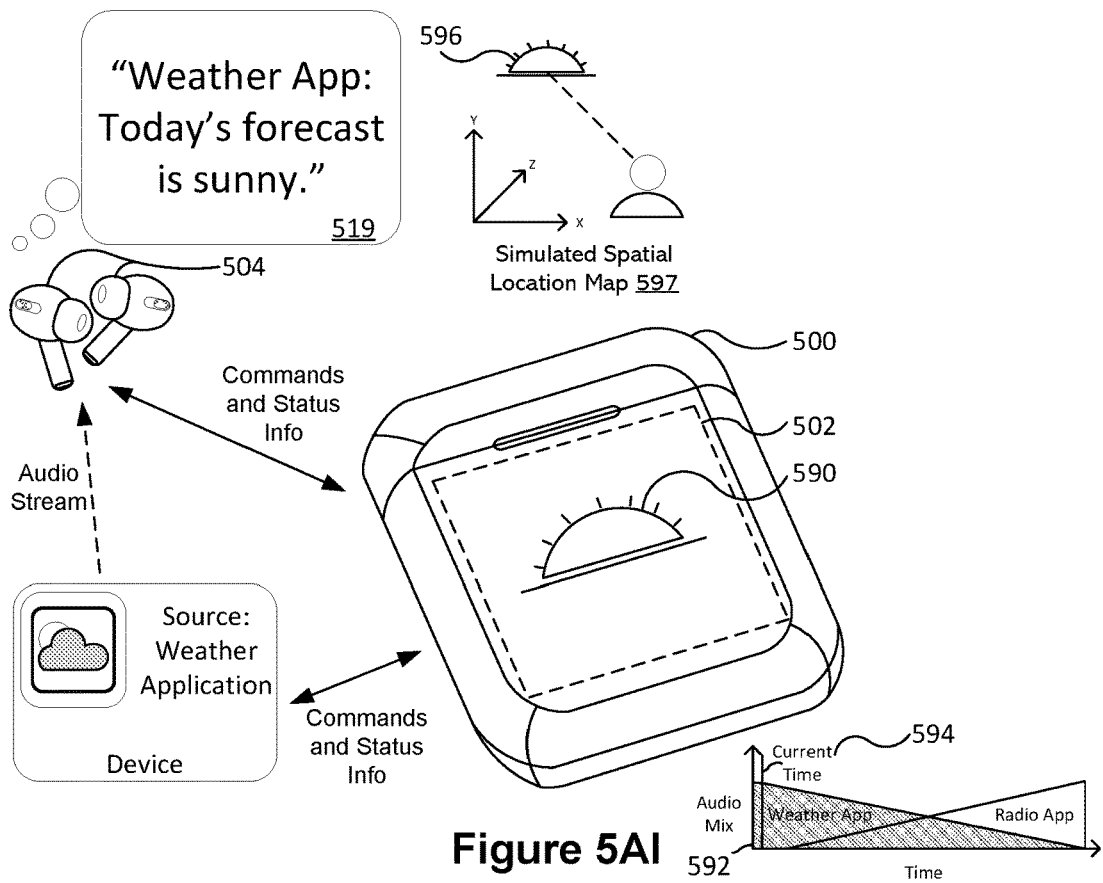
Figure 5A:
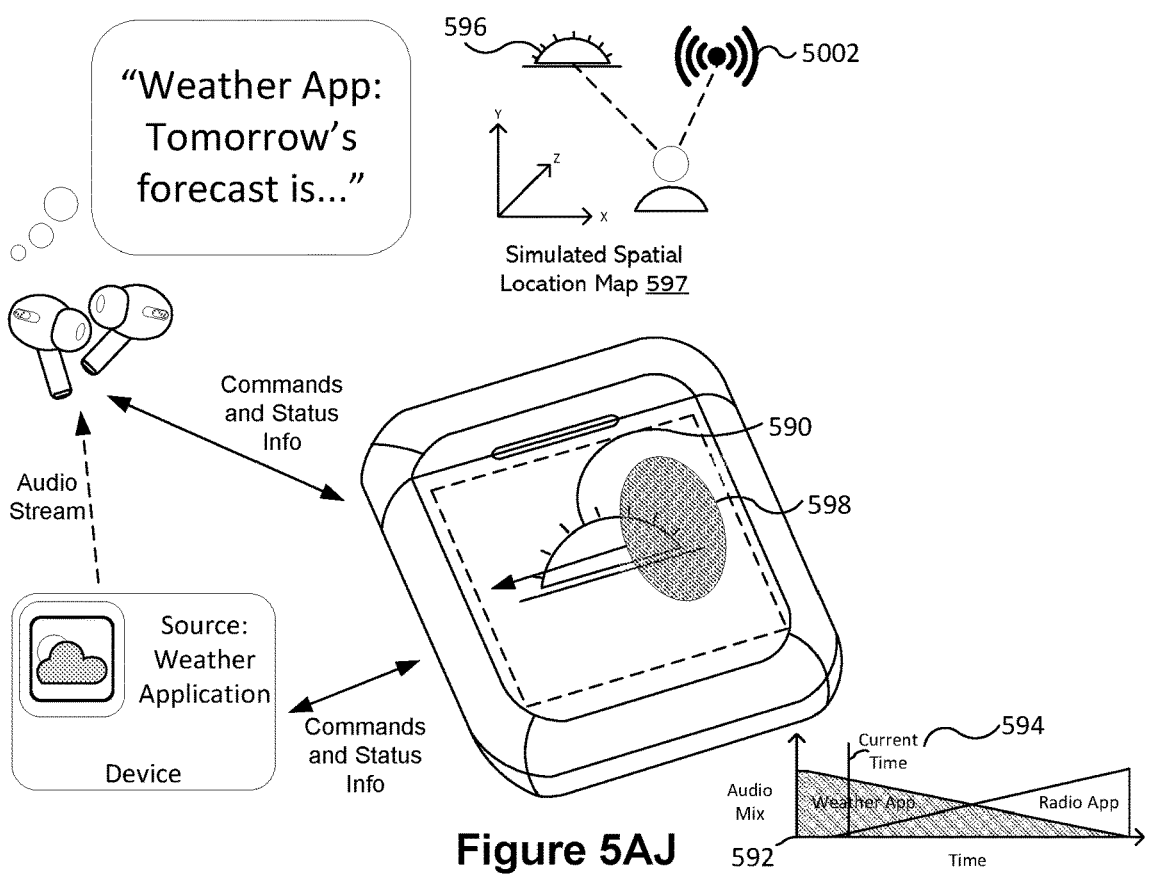
Figure 5A:
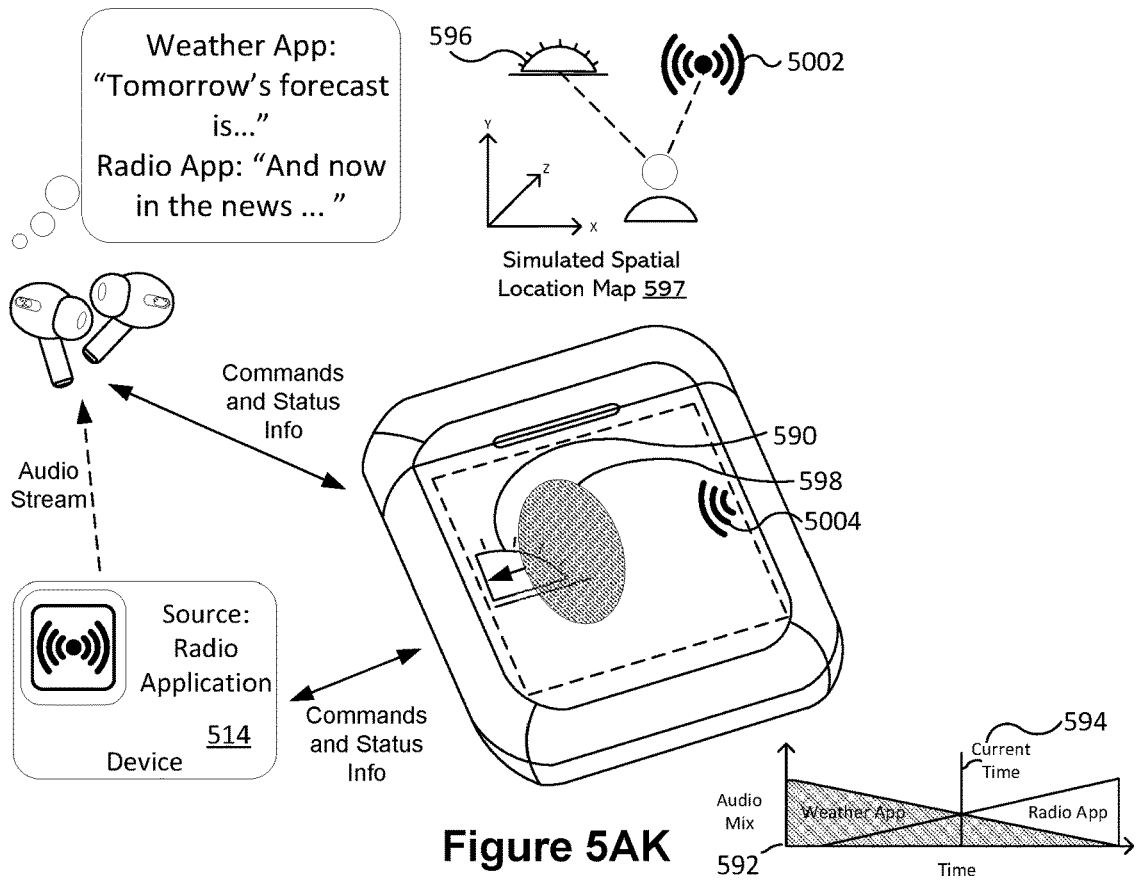
Figure 5A:
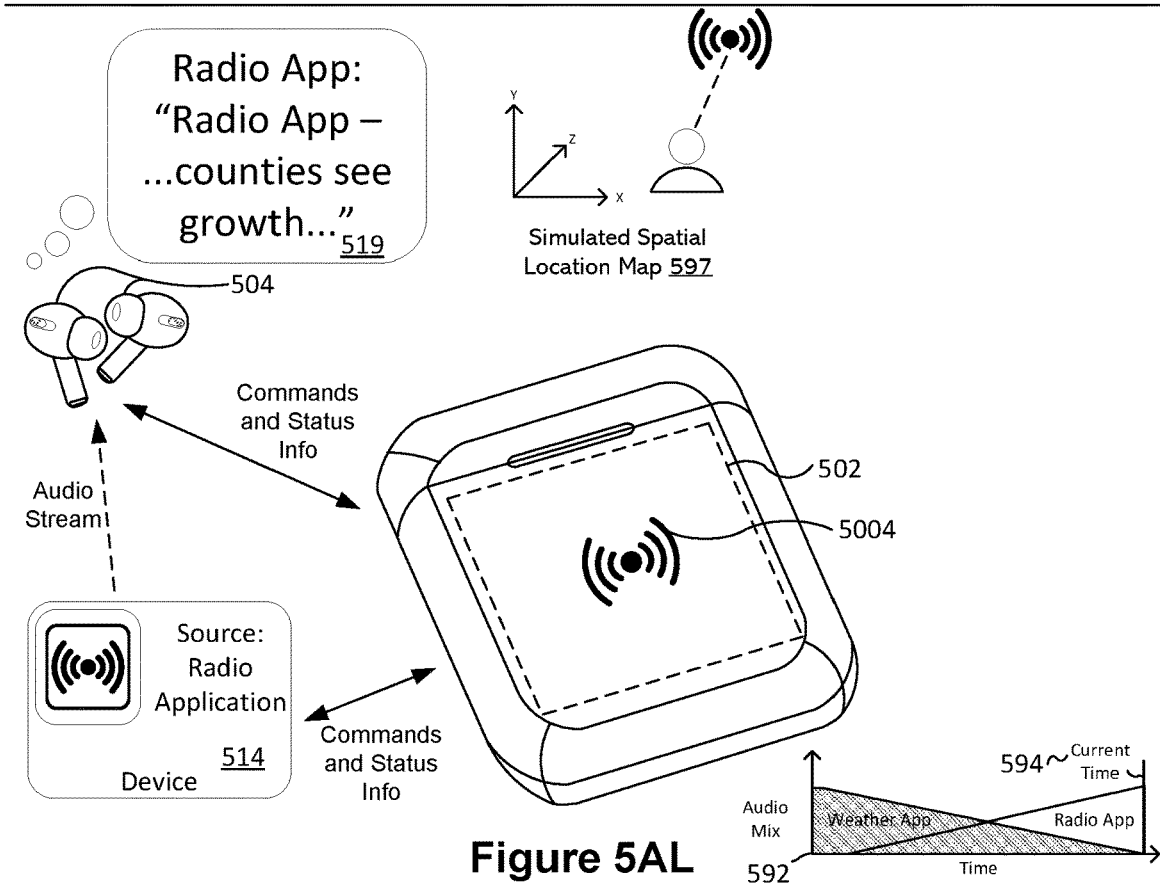
Figure 5A:
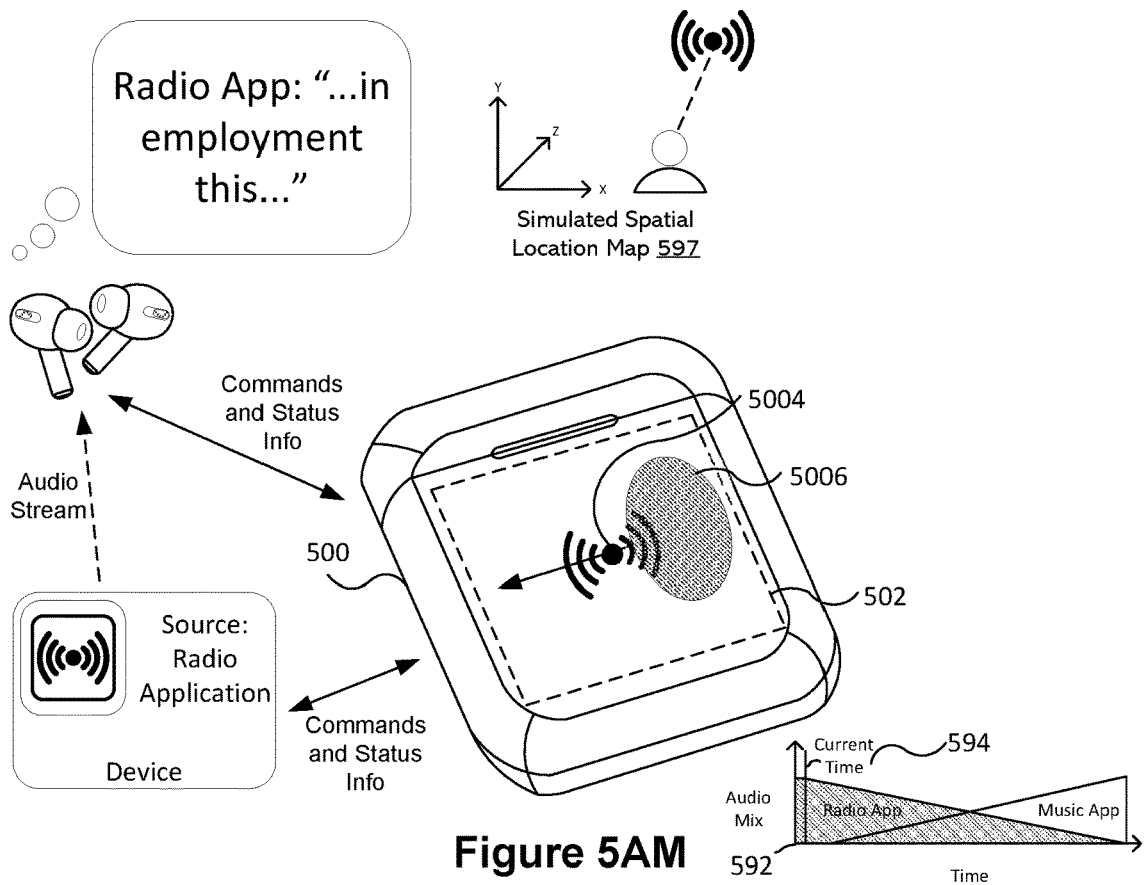
Figure 5A:
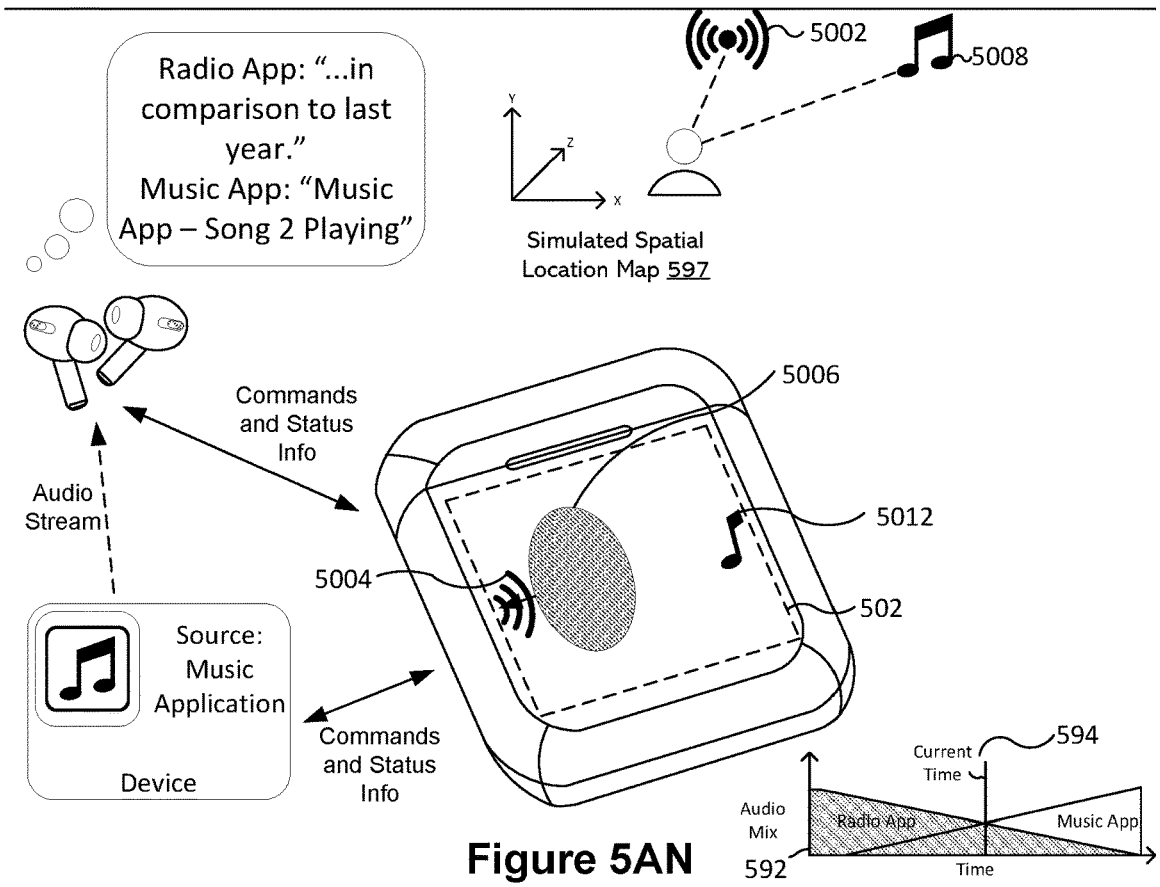
Figure 5A:
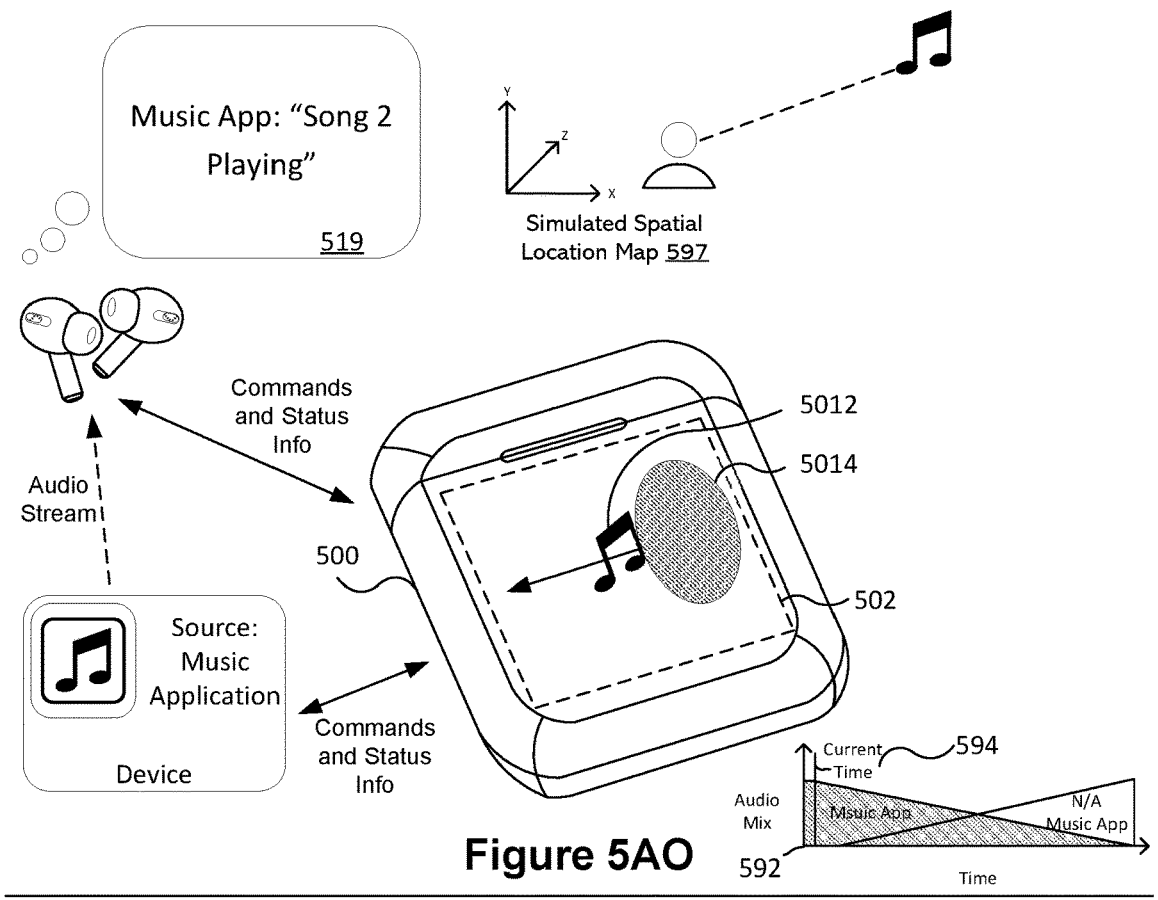
Figure 5A:
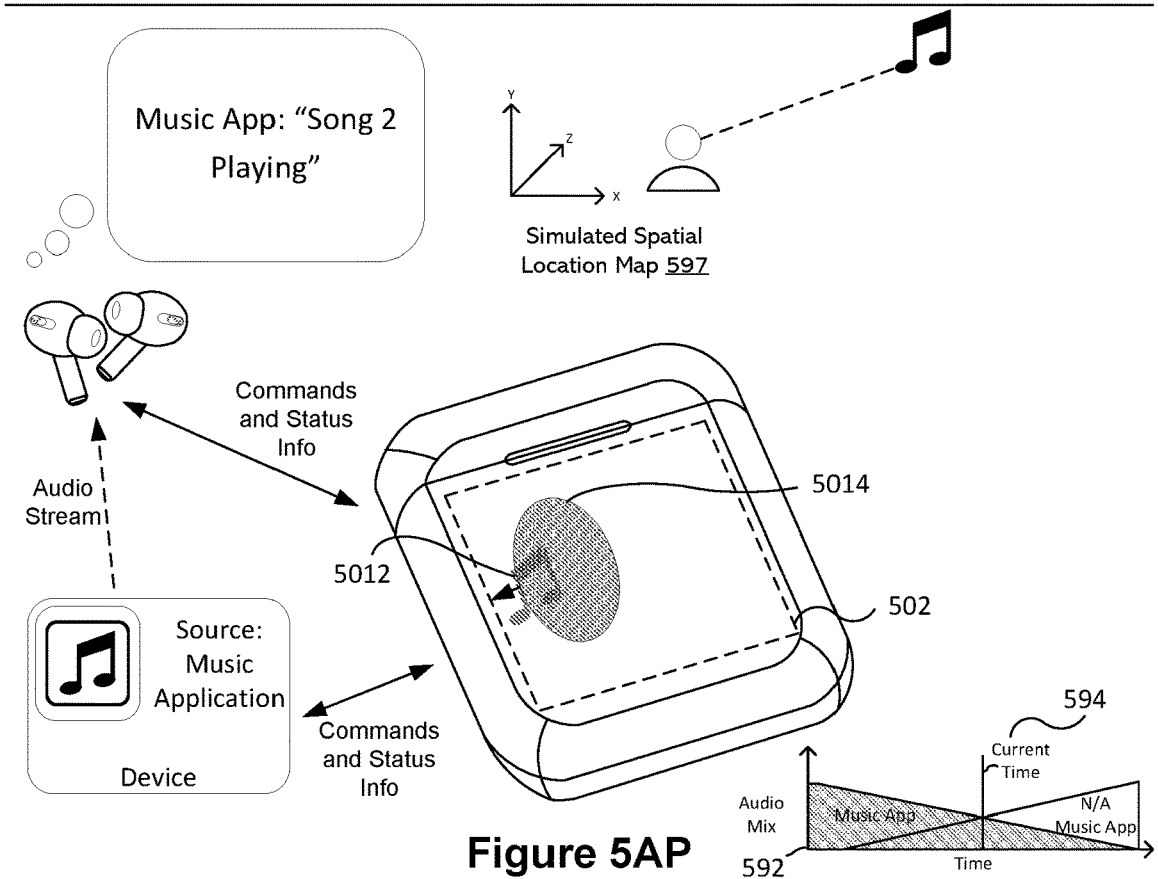
Figure 5A:
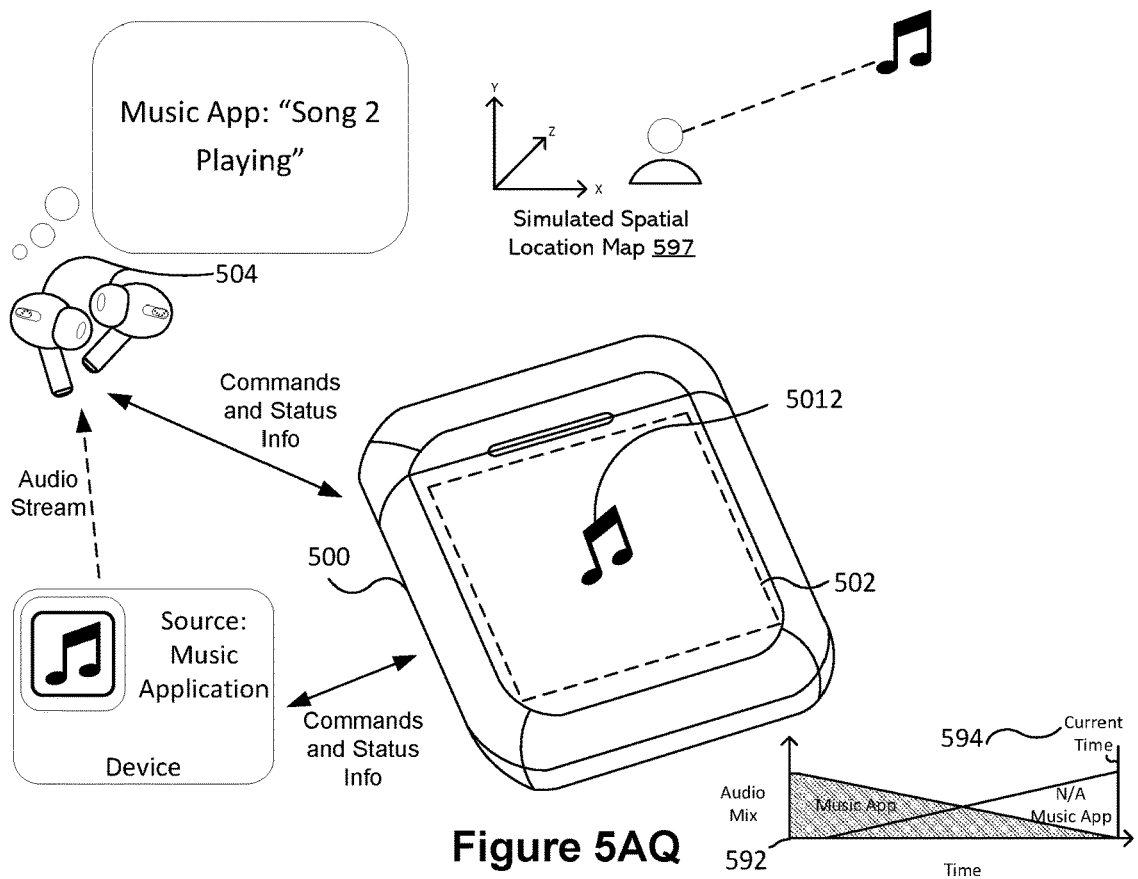
Figure 5A:
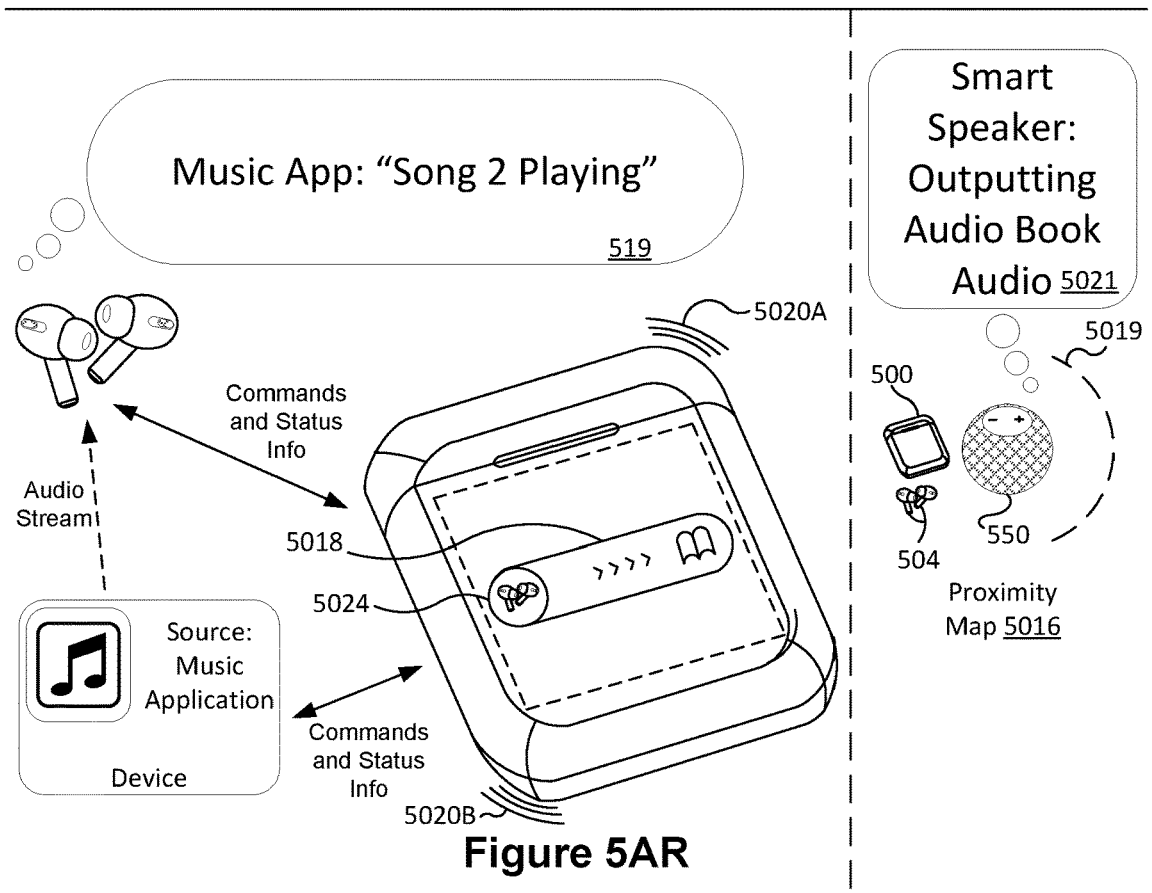
Figure 5A:
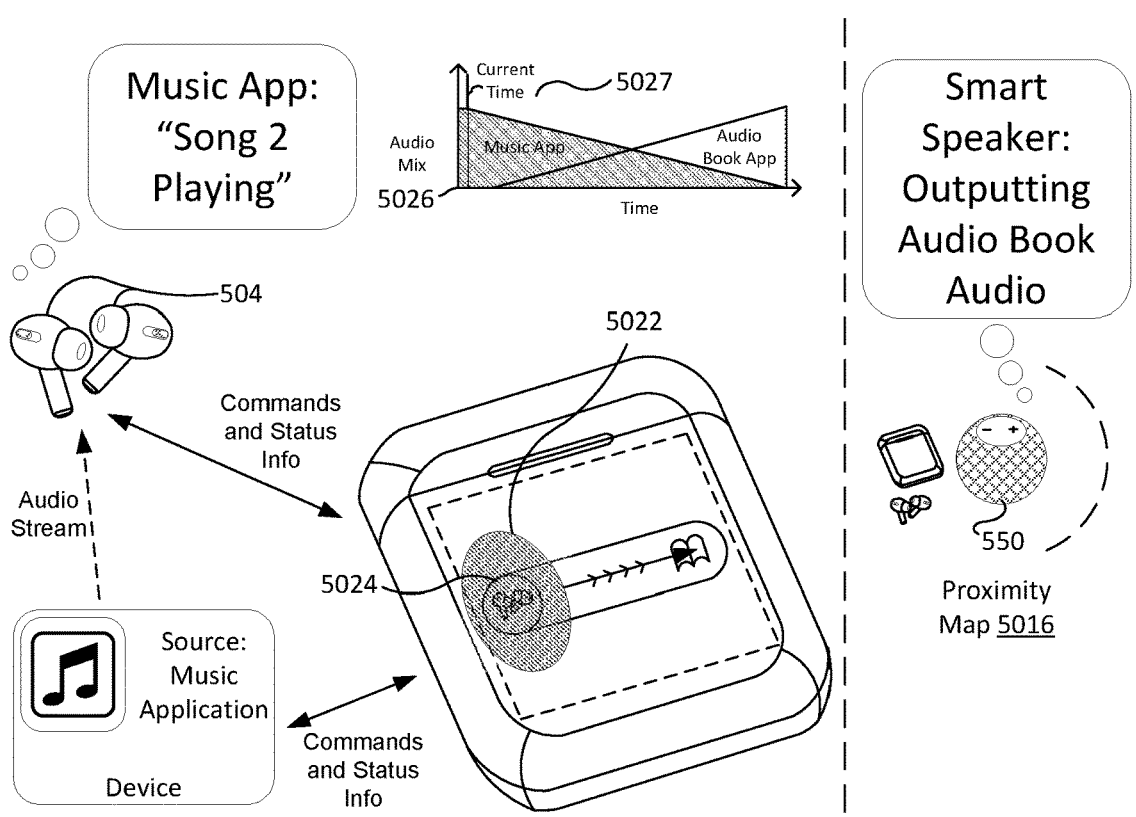
Figure 5A:
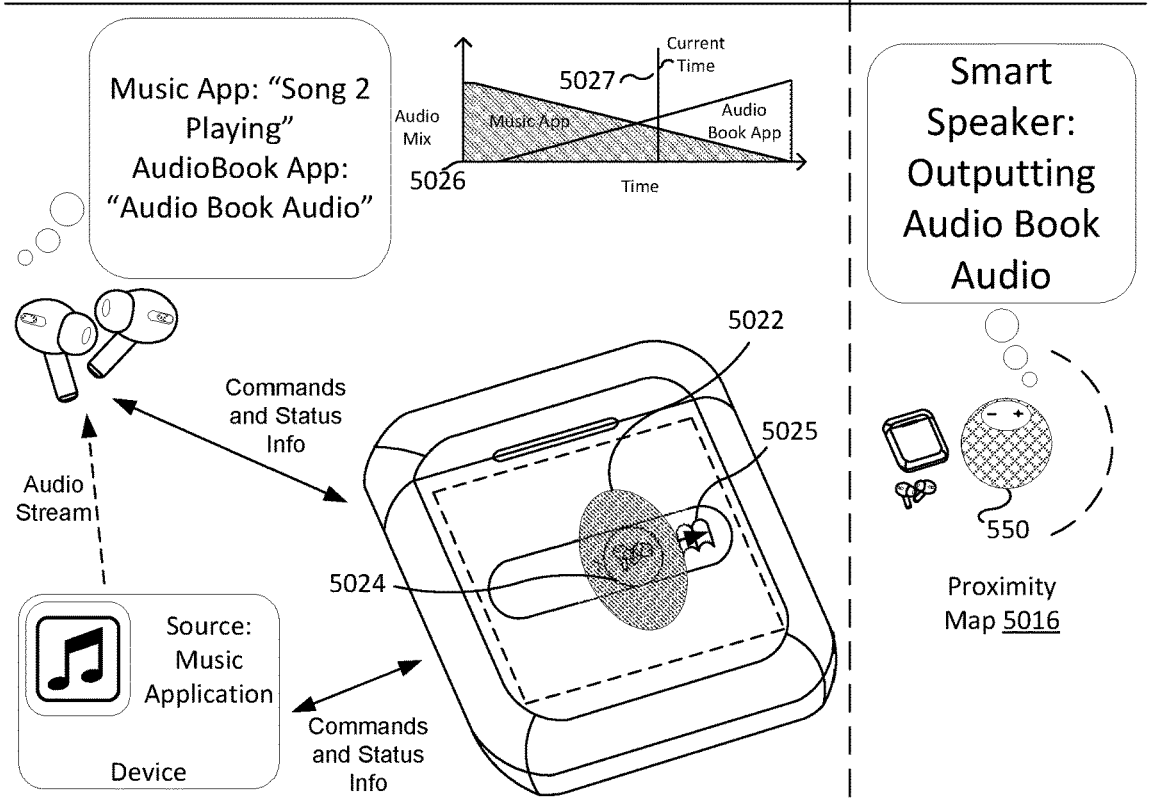
Figure 5A:
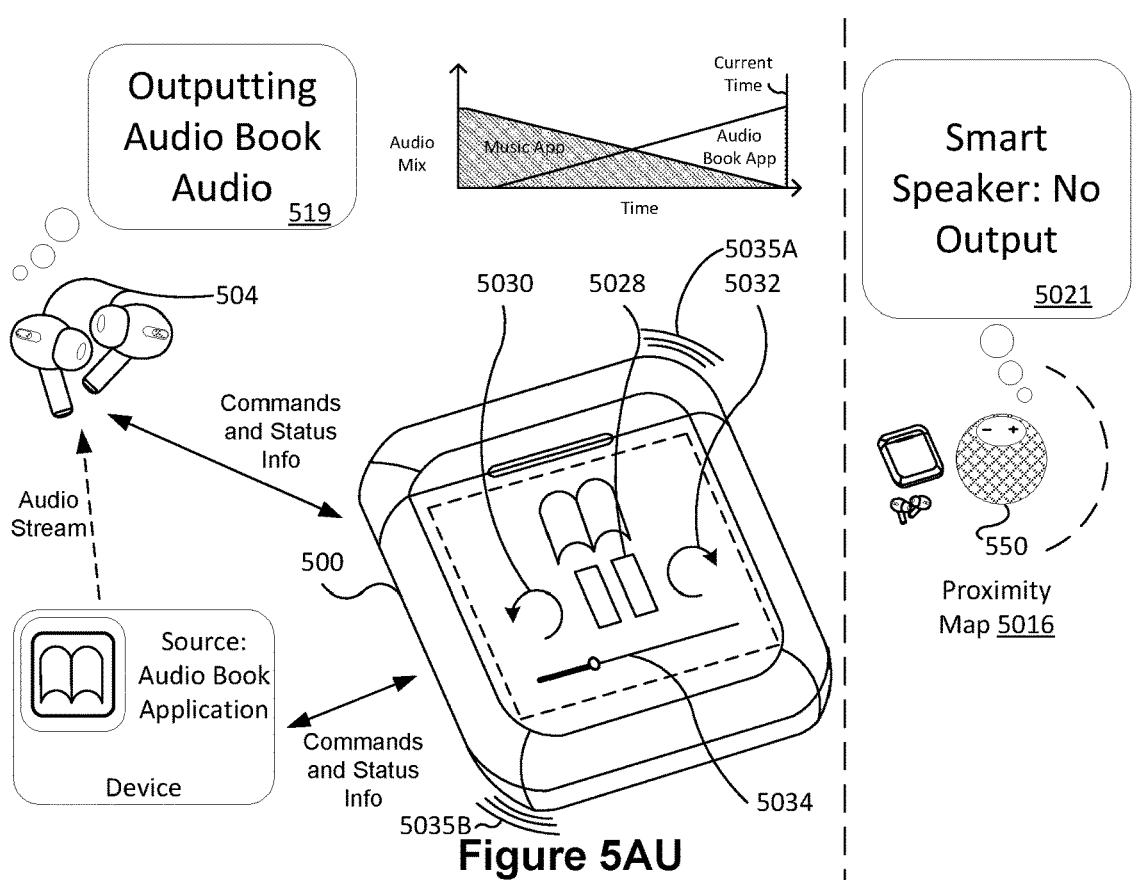
Figure 5A:
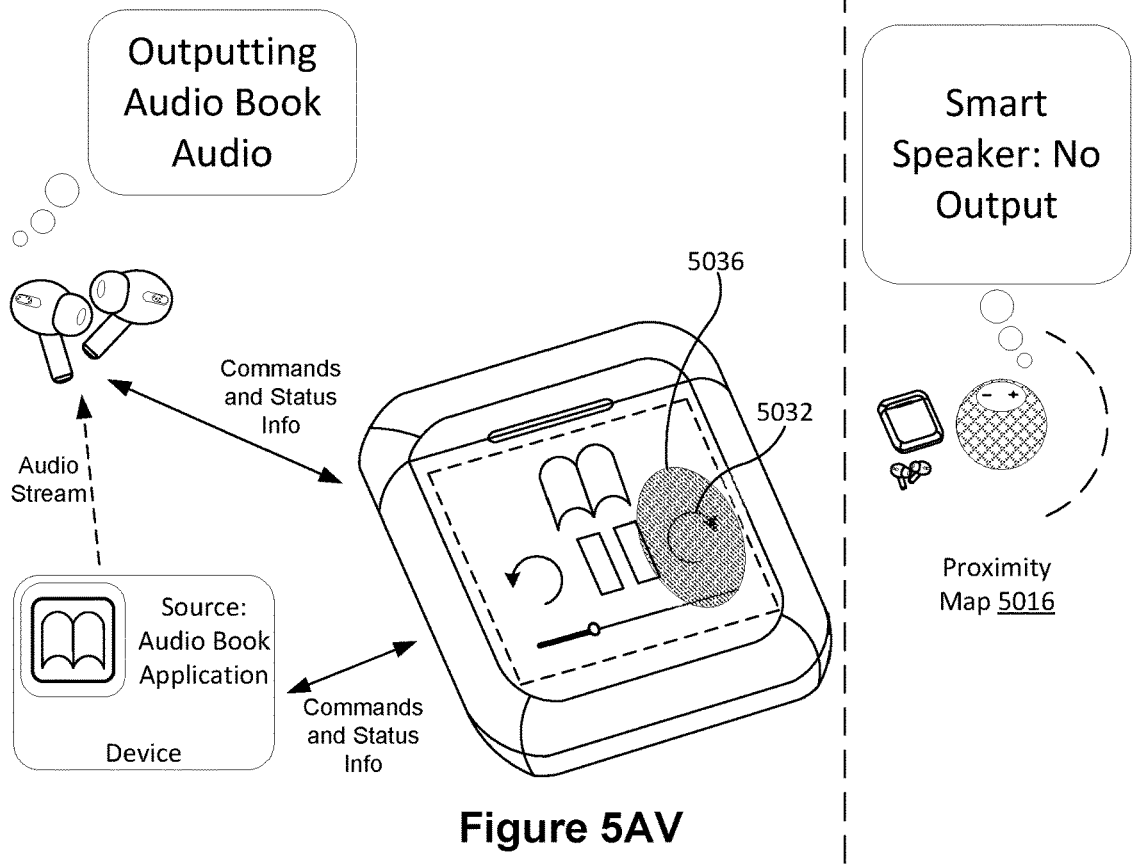
Figure 5A:
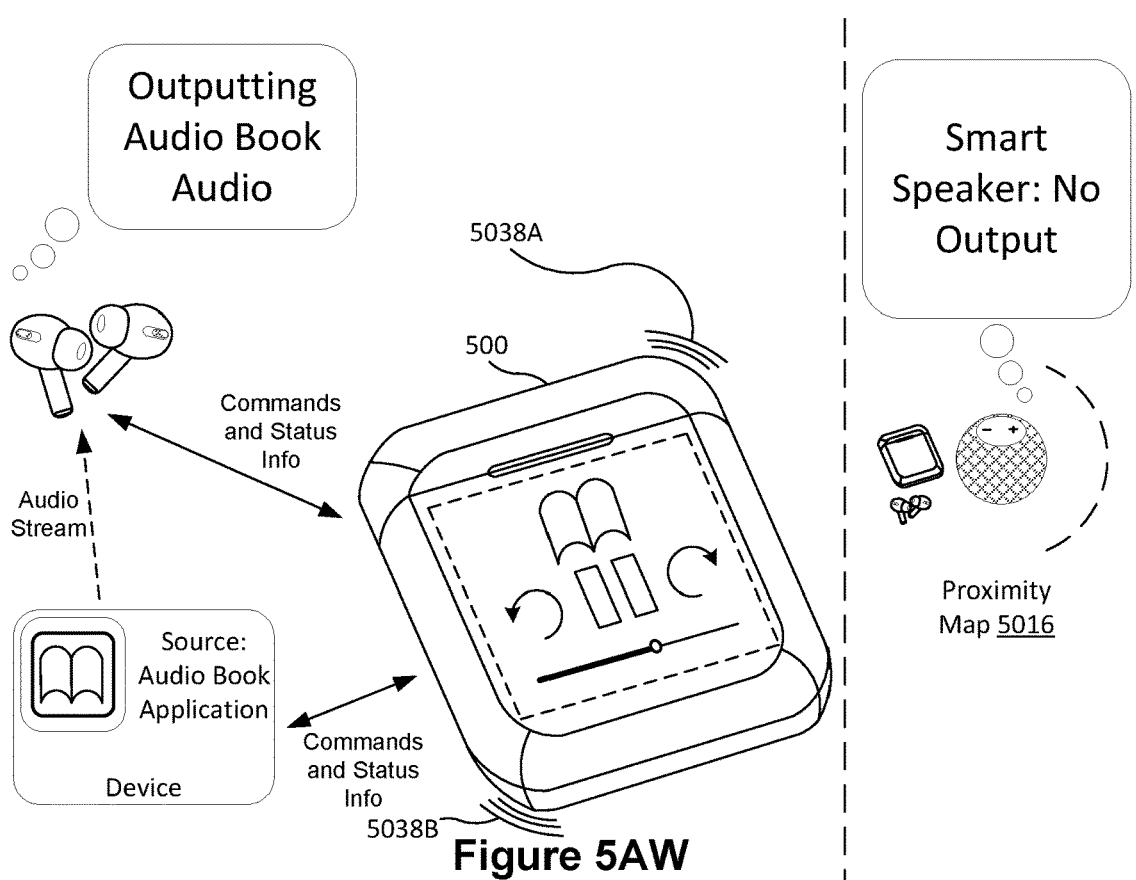
Figure 5A:
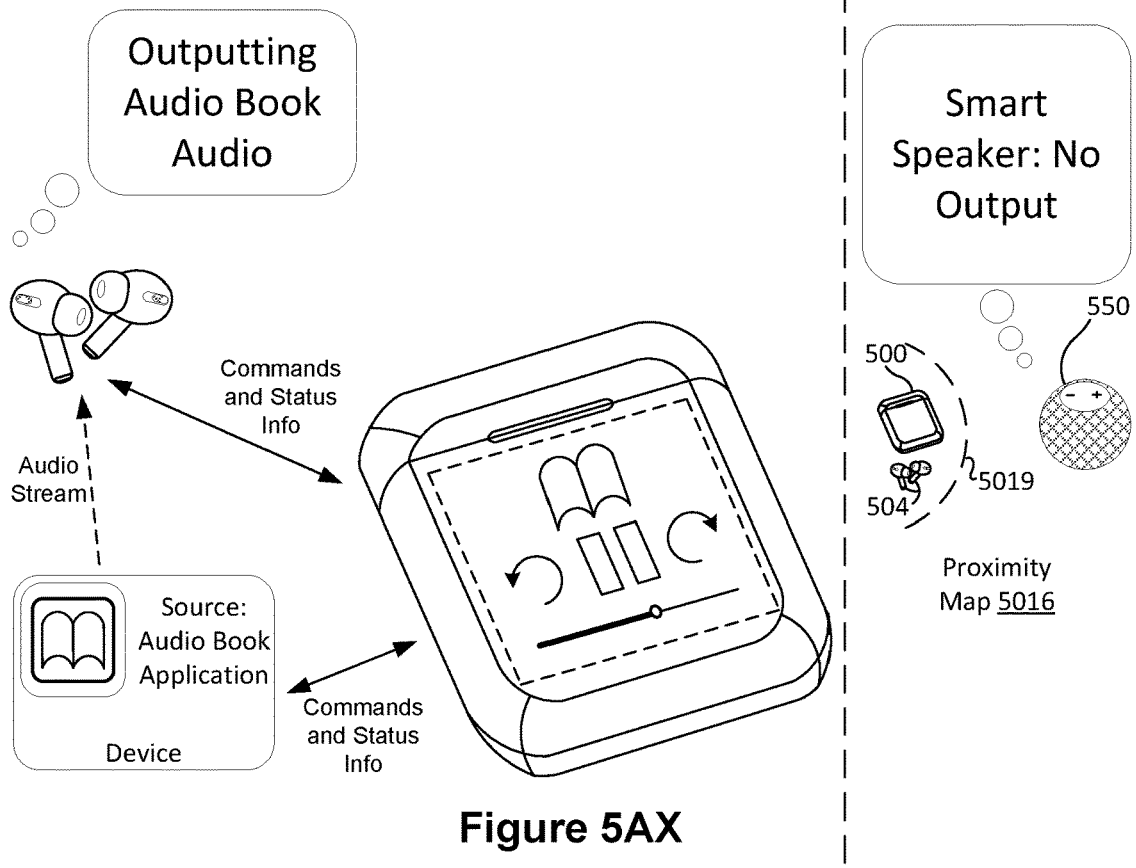
Figure 5A:
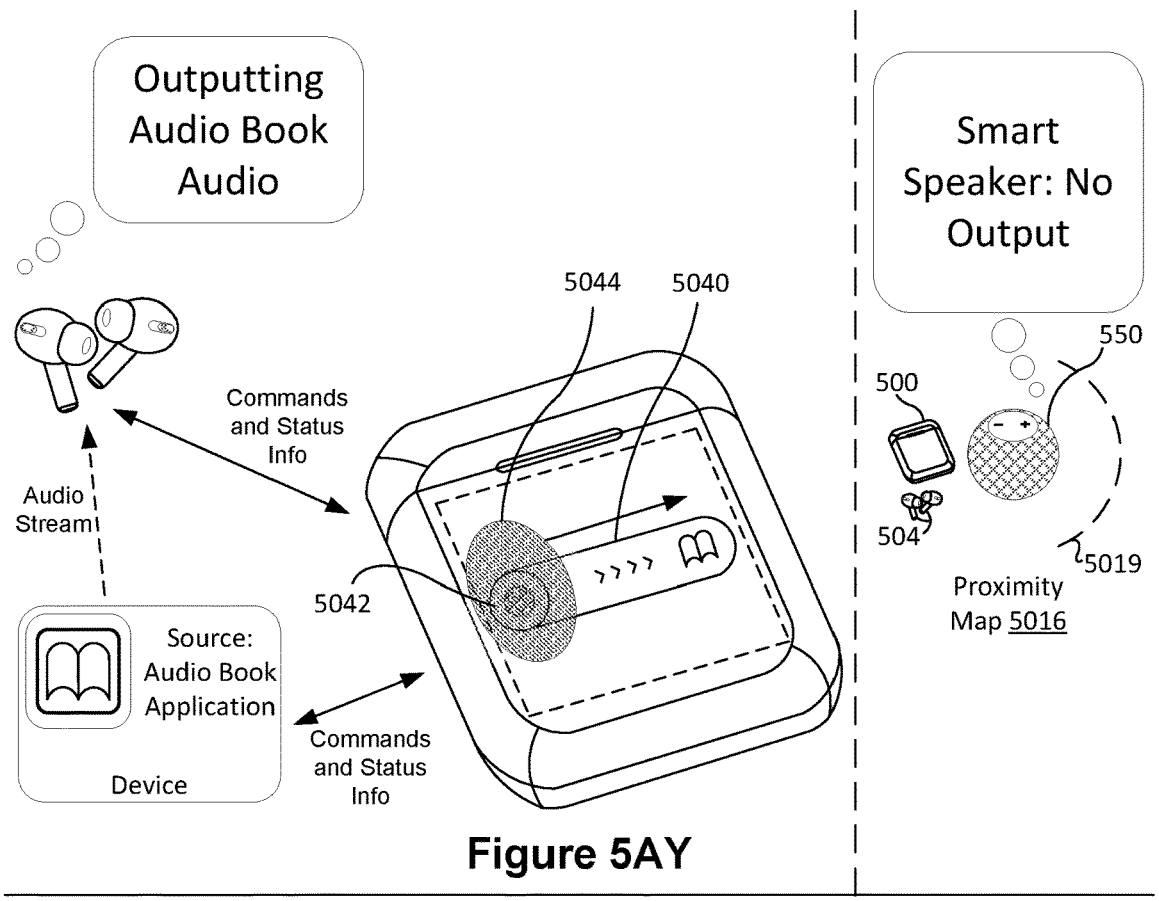
Figure 5A:
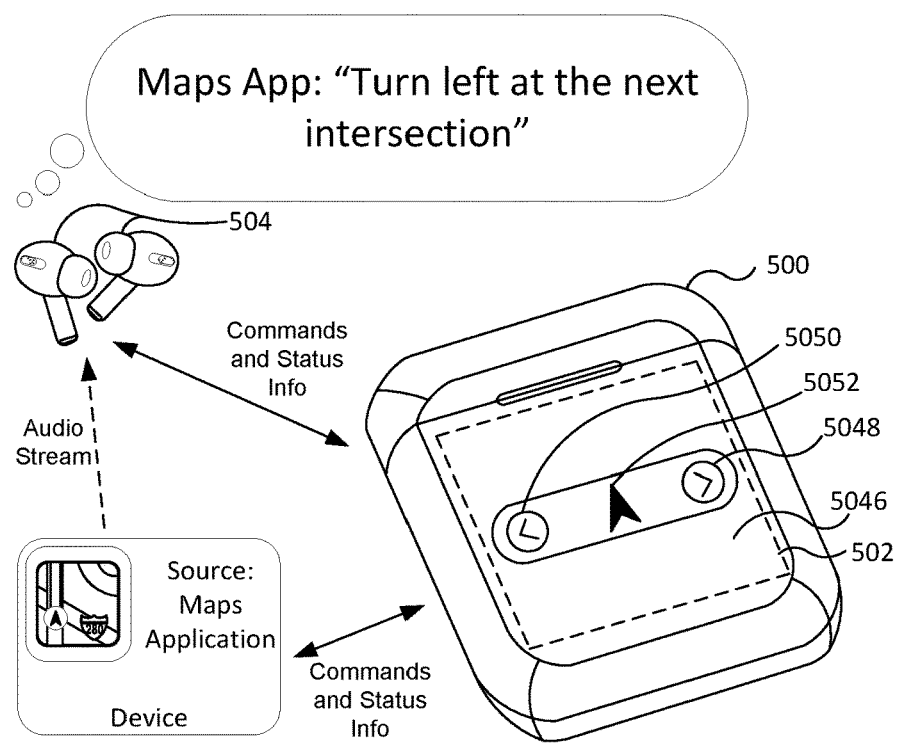
Figure 6A:
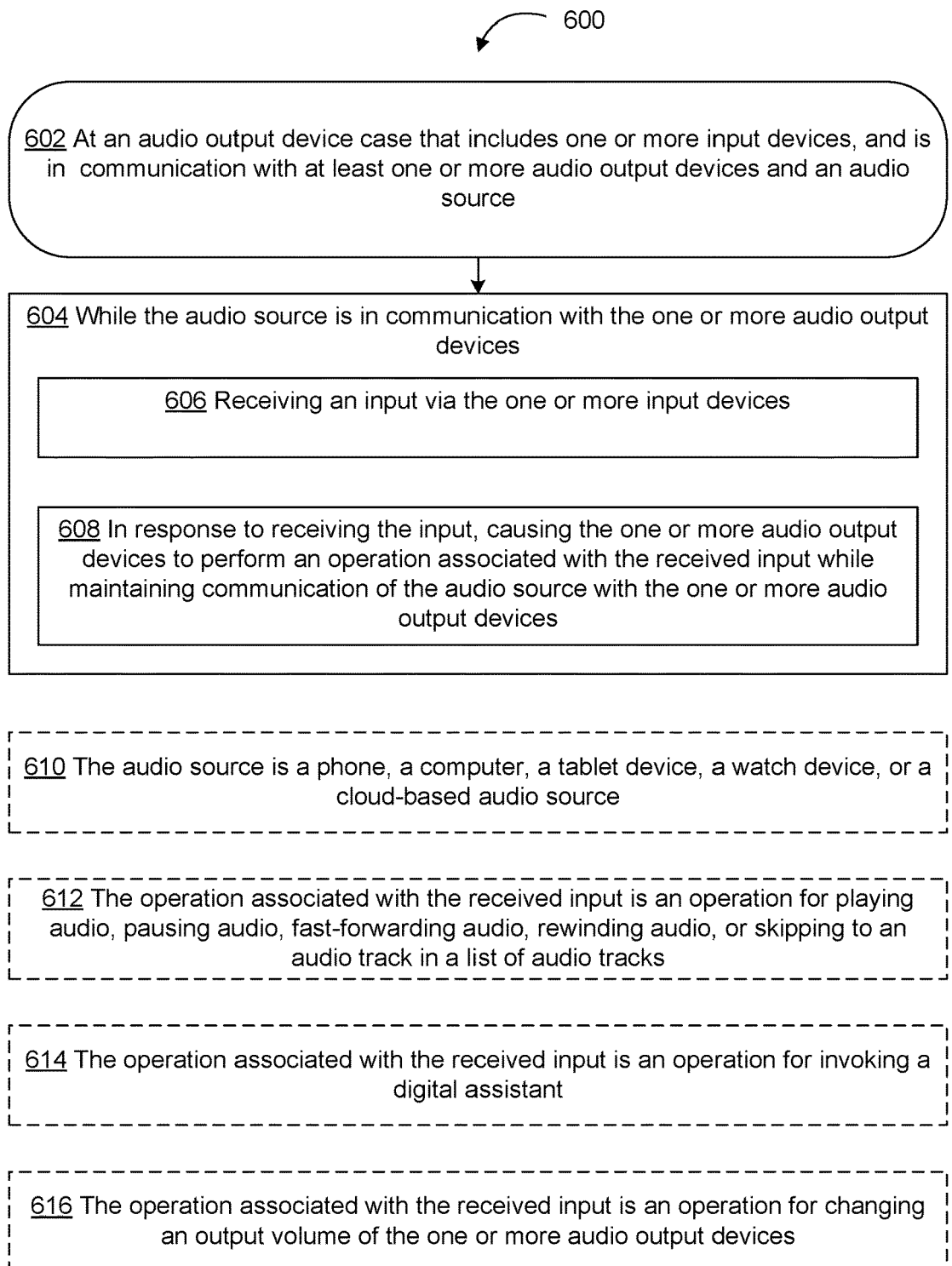
Figure 6F:
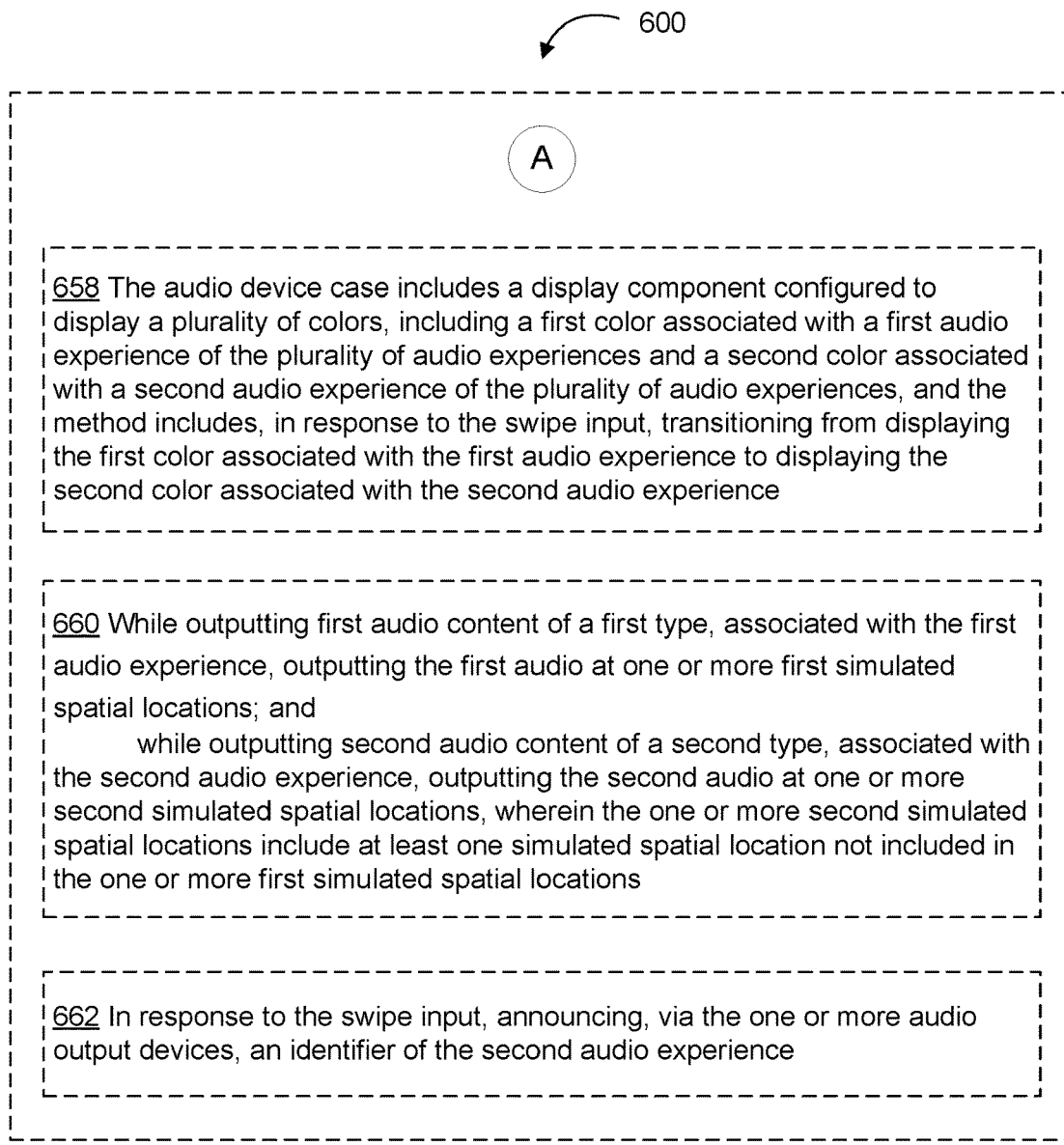

FIGS. 5X-5AA illustrate a substantially horizontal swipe gesture, received via the touch-sensitive display 502, that causes the headphone case 500 to provide an instruction to the source to either fast forward the audio track or rewind the audio track. FIG. 5X illustrates substantially horizontal swipe gesture 564 moving across touch-sensitive display 502 in a direction moving from left to right (e.g., a first direction). FIG. 5Y illustrates substantially horizontal swipe gesture 564 continuing across touch-sensitive display 502, and in response to horizontal swipe gesture 564 moving across the touch-sensitive display 502, the audio track is fast forwarded. This is, optionally, illustrated by description 566 that is displayed on touch-sensitive display 502, which indicates the song is being fast-forwarded. FIG. 5Z shows substantially horizontal swipe gesture 568 moving across touch-sensitive display 502 in a direction moving from right to left (e.g., a second direction). FIG. 5AA shows that in response to the horizontal swipe gesture 568 moving across the touch-sensitive display 502, the audio track is rewound. This is, optionally, illustrated by description 570 that is displayed on touch-sensitive display 502, which indicates the song is being rewound.

FIGS. 5AB-5AC illustrate ones or more forms of feedback occurring at the headphone case 500 in response to the audio source changing. FIG. 5AB illustrates a representation of the current audio source (e.g., music symbol 572) displayed on touch-sensitive display 502. FIG. 5AB also illustrates, in information bubble 519, that a request to switch from the music audio source (e.g., a first source) to a movie audio source (e.g., a second source) has been received. For example, the request may be received in the form of a touch input on a touch-sensitive display or touch-sensitive surface at device 514, or the request may be an oral command received by the headphones 504 and conveyed by the headphones 504 to device 514.

FIG. 5AC illustrates, in response to the request to switch audio sources, the headphone case outputting a haptic feedback via a haptic feedback generator integrated into the headphone case (e.g., as indicated by vibrational lines 574). FIG. 5AC also illustrates that the current audio source has changed, as indicated by movie icon 576 displayed on the touch-sensitive display 502 of the headphone case 500. In other words, in response to the request to switch audio sources, both a visual feedback is displayed, and haptic feedback is output. FIG. 5AC also illustrates, in information bubble 519 that movie audio is being output at the headphones 504.

FIGS. 5AD through 5AF illustrate switching between audio output modes of the headphones 504 (e.g., ambient noise controls (e.g., a noise cancelling mode, a pass-through mode (e.g., playing ambient sound in headphones), an off mode (e.g., no ambient sound manipulation)), or spatial audio controls (e.g., spatial audio off, spatial audio on (e.g., the audio is perceived as being played back from simulated spatial locations in space), spatial audio on with head tracking (e.g., the audio is perceived as being played back from simulated spatial locations in space, and the simulates spatial locations are fixed to the frame of reference of an external device), stereo audio, mono audio)). FIGS. 5AD-5AF illustrate that in response to a series of squeeze gestures occurring at the headphone case 500, a set of predefined audio output modes are cycled through. FIG. 5AD shows headphones 504 currently in an "off" mode 577, meaning no noise cancellation or amplification of ambient noise is occurring (i.e., no sound augmentation). FIG. 5AD also illustrates a squeezing input 578 at headphone case 500, and FIG. 5AE illustrates that in response to the squeezing input 578 the audio output mode is switched from an "off" mode (e.g., illustrated by user interface icon 577) to a spatialized audio output mode (e.g., illustrated by user interface icon 580). FIG. 5AE illustrates another squeezing input 582 at headphone case 500, and FIG. 5AF illustrates that in response to the squeezing input 582 the audio output mode is switched from a spatialized audio output mode to a spatialized audio output with head tracking mode (e.g., illustrated by user interface icon 584). In this example, if a further input is received, the audio mode will cycle back to the "off" mode.

FIGS. 5AG-5AH illustrate an interaction where a message is sent to and received by a user of the headphone case 500. FIG. 5AG illustrates that touch-sensitive display 502 is displaying a user interface element 586 (e.g., a message graphic and associated identifying text) indicating that an electronic message has been received. Additionally, FIG. 5AG in information bubble 519 indicates that a notification sound is output via the headphones 504. FIG. 5AH illustrates that in response to an input 588 (e.g., a tap input or a press and hold input) occurring over/at the user interface element 586, the headphones 504 begin to output the contents of the received electronic message. This is indicated by the information bubble 519, in FIG. 5AH, stating the contents of the message (e.g., "Nicole R. said: 'What should I bring for the trip?'"). In some embodiments, the message is paused upon release of the input 588 and resumed once input 588 is resumed.

FIGS. 5AI through 5AQ illustrate switching between different audio experiences (e.g., different applications (e.g., either installed on the headphone case 500 and/or installed on the device 514)). FIG. 5AI illustrates a first audio experience (e.g., a weather application) currently playing audio through the headphones 504 (e.g., as indicated by information bubble 519 stating that the headphones are outputting audio that states "Weather App: Today's forecast is sunny". In addition, FIG. 5AI also illustrates that an icon (e.g., weather icon 590) corresponding to the first audio experience is displayed on touch-sensitive display 502. FIG. 5AI further illustrates an audio mix chart 592, which presently shows, via current time marker 594, that the audio output is entirely audio from the weather application. Audio mix chart 592 on the vertical axis shows the percentage of an audio mix provided by each application (e.g., corresponding to the volume of each application in the audio output by the headphones 504), and the horizontal axis indicates a time interval. Lastly, FIG. 5AI also illustrates that audio output by the weather application has a first simulated spatial location 596 in a three-dimensional space surrounding the user or the user's headphones 504, as shown in simulated spatial location map 597.

FIG. 5AJ illustrates a substantially horizontal swipe gesture 598 (e.g., moving from either left-to-right or right-to-left) occurring over weather icon 590. In response to substantially horizontal swipe gesture 598, the headphones begin switching from the first audio experience (e.g., the weather application) to a next audio experience in a list of audio experiences, e.g., as indicated by a radio icon 5002 appearing in the simulated spatial location map 597. Simulated spatial location map 597 also illustrates that the audio output by the radio application (e.g., as illustrated by second simulated spatial location 5002) is in a different simulated spatial location than audio output by the weather application (e.g., as illustrated by first simulated spatial location 596). FIG. 5AJ also illustrates an audio mix chart 592, which presently shows, via current time marker 594, that the audio output from the weather application is beginning to fade out while the audio from the radio application is beginning to fade in.

FIG. 5AK illustrates the substantially horizontal swipe gesture 598 (e.g., moving from either left-to-right or right-to-left) continuing over weather icon 590. In response to the substantially horizontal swipe gesture 598, the transition from the first audio experience (e.g., the weather application) to the next audio experience (e.g., a radio application) continues to advance. As in FIG. 5AJ, audio from the radio application is output at the second simulated spatial location 5002, as shown in the simulated spatial location map 597. Audio mix chart 592 in FIG. 5AK also illustrates, via current time marker 594, that the audio output from the weather application is being faded-out while the audio from the radio application is fading-in. For example, information bubble 519 in FIG. 5AK illustrates that audio from the weather application and the radio application are crossing over (e.g., crossfading)).

As shown in FIG. 5AL, upon completion of the horizontal swipe gesture, the radio application is now the selected audio experience (e.g., as illustrated by radio icon 5004). Weather icon 590 is no longer displayed on the touch-sensitive display 502 and instead radio icon 5004 is displayed on the touch-sensitive display 502. In some embodiments, the weather icon 590 is visually faded-out and radio icon 5004 is visually faded-in as the horizontal swipe gesture progresses or completes. FIG. 5AL also shows that the current time marker 594 in audio mix chart 592 indicates that audio only from the radio application is currently being output by the headphones 504 (e.g., as also indicated by information bubble 519).

FIG. 5AM illustrates a second substantially horizontal swipe gesture 5006 (e.g., moving from either left-to-right or right-to-left) occurring over radio icon 5004. FIG. 5AN illustrates that in response to the substantially horizontal swipe gesture 5006, the headphones begin switching from the second audio experience (e.g., the radio application) to a next audio experience (e.g., a music application) in the list of audio experiences. FIG. 5AN also illustrates an audio mix chart 592, which presently shows, via current time marker 594, that the audio output from the radio application is beginning to fade-out while the audio from the music application is beginning to fade-in. Simulated spatial location map 597 also illustrates that the radio application (e.g., as illustrated by second simulated spatial location 5002) is in a different simulated spatial location than the music application (e.g., as illustrated by third simulated spatial location 5008). FIG. 5AN also shows that radio icon 5004 scrolling or moving off the touch-sensitive display 502 and music icon 5012 scrolling or moving onto the touch-sensitive display 502 in response to the substantially horizontal swipe gesture 5006. In some embodiments, the radio icon 5004 is visually faded-out (e.g., as it moves off the touch-sensitive display 502), and music icon 5012 is visually faded-in (e.g., as it moves onto the touch-sensitive display 502) as the substantially horizontal swipe gesture 5006 progresses or reaches a threshold position.

FIG. 5AO shows that in response to the second substantially horizontal swipe gesture 5006 completing, the music application is now the selected audio experience (e.g., as illustrated by music icon 5012). FIG. 5AO also shows that the current time marker 594 in audio mix chart 592 indicates that audio only from the music application is currently being output by the headphones 504 (e.g., as also indicated by information bubble 519). FIG. 5AO also illustrates a third substantially horizontal swipe gesture 5014 (e.g., moving from either left-to-right or right-to-left) occurring over music icon 5012.

FIG. 5AP illustrates a response to continuation of the substantially horizontal swipe gesture 5014. In this example, music application is the last application in the list of applications, and as a result, the headphones do not transition from the music application to another audio experience in response to the substantially horizontal swipe gesture 5014. Optionally, in response to the substantially horizontal swipe gesture 5014, the music application audio is faded-out, and music icon 5012 is visually faded-out as it begins to move off the touch-sensitive display 502. FIG. 5AP also illustrates an audio mix chart 592, which presently shows, via current time marker 594, that the audio output from the music application is partially faded-out.

FIG. 5AQ illustrates that in response to substantially horizontal swipe gesture 5014 completing, the music application continues to be the currently selected audio experience for the headphones 504. This is indicated by music icon 5012 being displayed (e.g., visually faded back in) on the touch-sensitive display 502. FIG. 5AQ also illustrates that in response to substantially horizontal swipe gesture 598, audio mix chart 592, which presently shows, via current time marker 594, that the audio output from the music application is faded back-in.

FIGS. 5AR-5AY illustrate transferring audio to and from an external device 550 to the headphones 504. FIG. 5AR illustrates a proximity map 5016, which indicates whether headphone case 500 and the headphones 504 are in-range or out-of-range of an external device 550 (e.g., a smart speaker) or at a distance closer to or further than a threshold distance. In some embodiments, external device 550 is source 514. Proximity map 5016 illustrates in FIG. 5AR that the headphone case 500 and the headphones 504 are in-range (e.g., illustrated by dashed line 5019) of the external device 550. FIG. 5AR also illustrates that the external device 550 is currently outputting audio from an audio book application at the device 550 (e.g., as indicated by information bubble 5021). FIG. 5AR also illustrates, via information bubble 519, that the headphones 504 are currently outputting audio associated with the music application. While the headphone case 500 and headphones 504 are in range and/or in communication with the external device 550, the headphone case 500 dynamically displays a sliding control 5018 for transferring audio of the external device 550 to the headphones 504. In this example, sliding control 5018 includes a draggable icon 5024 that visually represents transferring audio from the external device 550 to the headphones 504. Additionally, upon the headphone case 500 and headphones 504 being detected as in-range and/or in communication with the external device 550, the headphone case 500 provides a haptic feedback via a haptic feedback generator (e.g., as indicated by vibrational lines 5020A and 5020B).

FIGS. 5AS-5AT show a dragging gesture 5022 that when completed causes the audio that was previously being played on the external device 550 to be output on the headphones 504. FIG. 5AS shows substantially horizontal dragging (e.g., swipe) gesture 5022 beginning on draggable icon 5024. FIG. 5AS also shows an audio mix chart 5026, which shows how the audio from the music application and audio from audio book application are crossfaded in accordance with movement of the substantially horizontal dragging gesture 5022. Current time marker 5027 in audio mix chart 5026 indicates that since the input hasn't moved yet, the audio is not mixed, and audio for the headphones 504 is entirely supplied by the music application.

FIG. 5AT shows the dragging gesture 5022 continuing to drag the draggable headphone icon 5024 towards an icon 5025 (e.g., an audiobook application icon). FIG. 5AT also shows an audio mix chart 5026, which shows how the audio from music application and audio from audio book application is crossfaded in accordance with the movement of substantially horizontal dragging gesture 5022. Current time marker 5027 in audio mix chart 5026 indicates that the audio is mixed, and audio is supplied to the headphones 504 by both the music application and the audio books application. FIG. 5AU illustrates that in response to substantially horizontal dragging gesture 5022 completing, the audio for the audio books application is transferred from the external device 550 to the headphones 504. The headphones 504 cease playing audio from the music application and instead play audio from the audio book application, sometimes called transferred audio (e.g., information box 519 indicates that the headphones 504 are now outputting audio book audio and information bubble 5021 indicates that the external device 550 is no longer outputting audio associated with the audio book). The user interface on the headphone case 500 is also updated to display one or more application specific controls for interacting with an audio book application (e.g., pause/play button 5028, rewind button 5030, fast-forward button 5032, and/or playback scrubber 5034). FIG. 5AU also illustrates that in response to audio output from the audio book application transferring to the headphones 504, a haptic feedback (e.g., haptic feedback 5035A and 5035B) is optionally output via the headphone case 500. Alternatively or in addition, audio feedback is outputted via the headphones 504 in response to audio output from the audio book application transferring to the headphones 504.

FIG. 5AV illustrates an input 5036 occurring at a fast-forward button 5032 to skip ahead in the audio book. FIG. 5AW illustrates that in response to input 5036, the audio book is fast forwarded (e.g., as shown by the advanced position of the scrub bar). In addition, FIG. 5AW illustrates that in response to input 5036, a haptic feedback (e.g., illustrated by lines 5038A and 5038B) is optionally output via a haptic feedback generator of the headphone case 500.

FIG. 5AX, in proximity map 5016, illustrates that the headphone case 500 and headphones 500 are no longer in range and/or in communication with the external device 550 (e.g., as illustrated by dashed line 5019). FIG. 5AY represents a transition from FIG. 5AX. In FIG. 5AY, proximity map 5016 indicates that the headphone case 500 and headphones 500 are in range and/or in communication with the external device 550 (e.g., as illustrated by dashed line 5019). In response to the headphone case 500 and headphones 500 being in, or coming into, range and/or in communication with the external device 550, the headphone case 500 dynamically displays a sliding control 5040 for transferring audio being output by the headphones 504 to external device 550. In this example, sliding control 5040 includes an external device draggable icon 5042, and movement of icon 5042 from one end of sliding control 5040 to the other end of sliding control 5040 visually represents transferring audio from the headphones 504 to external device 550. FIG. 5AY also illustrates a dragging gesture 5044 that when completed causes the audio that was previously being played on the headphones 504 to be output on the external device 550.

FIG. 5AZ illustrates a map application user interface 5046 being displayed by the touch-sensitive display 502 of headphone case 500. Map application user interface 5046 includes one or more controls (e.g., one or more controls for having a next or previous direction read aloud) for communicating instructions for outputting, via the headphones 504, audio associated with directions (e.g., turn-by-turn directions) from a maps application. For example, map application user interface 5046 includes a next direction button 5048, a previous direction button 5050, and a current direction button 5052. FIG. 5AZ also illustrates in information bubble 519 that the maps application announces, "Maps App: 'Turn left at the next intersection'" via the headphones 504. In some embodiments, prior to the direction being played, the application will announce the name of the application providing the notification. In some embodiments, ongoing audio (e.g., by a music application or other application) is paused or reduced in volume while audio (e.g., driving directions) from the maps notification is being output through the headphones 504.

FIG. 5AAA illustrates a user interface for showing an indication when an external device 5054 (e.g., a television) is nearby and is playing audio that can be transferred to the headphones. For example, user interface 5056 illustrates that audio from a television or TV box top can be transferred to the headphones 504. FIG. 5AAA also shows in proximity map 5016 that the external device 5054 is in-range and/or in communication with the headphones 504 and/or headphone case 500.

FIGS. 6A-6F are flow diagrams illustrating method 600 of interacting with an audio output device case to control one or more audio output devices, in accordance with some embodiments. Method 600 is performed (602) (at least in part) at an audio output device case (e.g., headphone case 500 in FIG. 4C) that includes one or more input devices (e.g., touch-sensitive display 502 in FIG. 4C), and is in (e.g., wireless) communication with at least one or more audio output devices (e.g., headphones 504 in FIG. 4C) and an audio source (e.g., an audio source device, such as device 514 in FIG. 5A). In some embodiments, the display component is a touch-screen display and the touch-sensitive surface is on or integrated with the display component. In some embodiments, the display component is separate from the touch-sensitive surface (e.g., the display component is on a first side of the audio output device case and the touch-sensitive surface is on an opposing side of the audio output device case). Some operations in method 600 are, optionally, combined and/or the order of some operations is, optionally, changed.

As described below, method 600 provides an intuitive way to interact with an audio output device case that is configured to perform operations associated with audio experiences delivered to a user via one or more audio output devices, charge the audio output devices, and the store audio output devices. Having an audio output device case that is configured to perform operations associated with audio experiences delivered to a user via one or more audio output devices allows for the user to not have to switch between multiple devices to control the one or more audio output devices. In other words, a user need not find their external device (e.g., a cellphone) to control the audio output devices. Instead, a user need only interact with the audio output device case and the audio output device. By allowing the user to interact with just audio output devices and the audio output device case, the number of devices required by the user to interact with is reduced, which subsequently reduces the overall number of inputs to perform the operation.

In some embodiments, while the audio source (e.g., an audio source device) is in communication with the one or more audio output devices (604), the audio output device case receives (606) an input via the one or more input devices (e.g., user input 528, FIG. 5B). In some embodiments, in response to receiving the input, the audio output device case causes the one or more audio output devices to perform an operation associated with the received input while maintaining communication of the audio source with the one or more audio output devices (e.g., in response to the input 528 in FIG. 5B, the headphones 504 in FIG. 5C play fast-forwarded song 1 (e.g., as described by information bubble 519)). In some embodiments, the audio output device case is configured to charge one or more batteries of/in the one or more audio output devices (e.g., when the one or more audio output devices are placed in the case). In some embodiments, the audio output device is a pair of earbuds (e.g., headphone 504), and an earbud case (e.g., headphone case 500) is configured for storing and charging the pair of earbuds, as discussed above with reference to FIGS. 3D and 5. In some embodiments, both earbuds are electrically connected to the case when placed inside the case, e.g., with the lid closed. In some embodiments, the headphone case includes an LED underneath the lid to indicate a battery status of the headphones and the headphone case. In some embodiments, one headphone may be placed in the headphone case for charging while the other headphone is in use. In some embodiments, the headphone case includes a storage element capable of powering functions of the audio output device case and/or charging one or more headphones. In some embodiments, the headphone case is configured to be charged from a DC current. In some embodiments, the headphone case stores enough energy to charge the headphones multiple times.

In some embodiments, the audio source is a phone (e.g., a smartphone or portable multifunction device) (e.g., device 514 in FIG. 5A), a computer (e.g., a laptop, desktop), a tablet device (e.g., a device with a built in touch-sensitive display), a watch device (e.g., an electronic device worn around a wrist of a user), or a cloud-based audio source (e.g., an audio streaming service) (610). The audio source is typically a distinct device or system from the audio output device case and the one or more audio output devices.

In some embodiments, the operation associated with the received input is an operation for playing (612) audio, pausing audio, fast-forwarding audio (e.g., scrubbing a song forward in playback time at rate higher than the default playback rate), rewinding audio (e.g., scrubbing a song backwards in playback time), or skipping to an audio track in a list of audio tracks (e.g., skipping a song or moving to the next song) (e.g., where the received input is an input on pause button 522A, fast-forward button 522B, or rewind button 522C, shown in FIG. 5A). Providing additional controls on the audio output device case allows a user to control the playback of audio tracks quickly and intuitively without the need for navigating through user interfaces on another device, which reduces the number of inputs to perform the operation and makes use and control of the one or more audio output devices more efficient.

In some embodiments, the operation associated with the received input is an operation for invoking (614) a digital assistant (e.g., a digital assistant is an assistant for performing operations on a device in response to audio or textual inputs). For example, FIG. 5G illustrates a digital assistant graphic/animation 537 graphic indicating that a digital assistant operation is in progress. Enabling a user to invoke a digital assistant from the audio output device case provides efficient access to digital assistant, which would otherwise need to be invoked from another device, e.g., the audio source, and reduces the number of user actions needed to perform an operation.

In some embodiments, the operation associated with the received (616) input is an operation for changing an output volume of the one or more audio output devices (e.g., FIGS. 5J-5L illustrate a clockwise swipe input that causes the output volume of headphones 504 to be increased). Providing additional controls on the audio output device case allows a user to quickly and intuitively control the volume of the one or more audio output devices without the need for interacting with another device (e.g., the audio source or the one or more audio output devices), which reduces the number of user actions needed to perform the operation.

In some embodiments, the audio output device case includes a display component. While the audio source (e.g., an audio source device) is in communication with the one or more audio output devices, the audio output device case dynamically displays (618) (e.g., selectively displaying certain information), via the display component, one or more available operations that are dynamically displayed based on contextual information associated with the audio output device case, the audio source, or (e.g., and/or) the one or more audio output devices. In an example, the contextual information is a current output mode or volume of the one or more audio output devices. In another example, the contextual information is current and available audio sources or current and available media for playback or connection (e.g., for streaming) to the one or more audio output devices. In another example, the contextual information includes information identifying audio output devices in usable range of the audio output device case. For example, FIGS. 5S-5T illustrate that when an external device 550 comes in proximity to (e.g., meets predefined proximity criteria with respect to) the headphones 504 and/or headphone case 500, a sliding control 554 for transferring audio of the external device to the headphones 504 is displayed by the display component 502 of the headphone case 500. Dynamically and contextually displaying controls on the display component of the audio output device case allows for a user to be informed as to what operations are available and for the user to efficiently invoke those operations without having to interact with another device, such as the audio source, which reduces the number of user actions needed to perform the operation and automatically provides actionable information to the user without the user having to request that information.

In some embodiments, the audio output device case includes a display component (e.g., display 502, FIG. 5A), and while the audio source (e.g., an audio source device) is in communication with the one or more audio output devices, the audio output device case displays (620) a plurality of controls, each at a different predefined control region, of a plurality of control regions, on the audio output device case. Optionally, the audio output device case includes respective input devices at locations corresponding to each of the predefined control regions, or includes one or more touch-sensitive surfaces overlapping the plurality of control regions, enabling the case to detect inputs at locations corresponding to each of the control regions. For example, pause button 522A, fast-forward button 522B, rewind button 522C, as shown in FIG. 5A are controls displayed at predefined control regions or locations on the audio output device case (headphone case 500). Displaying a plurality of controls, each at a predefined control region on the audio output device case, allows a user to efficiently select such controls, because the locations of the controls are consistently located at the predefined control regions, which reduces user mistakes, reduces the number of inputs needed to perform an operation, and thereby also reduces battery power usage by the audio output device case.

In some embodiments, in accordance with a determination (622) that the input is received for a first duration of time, a first operation associated with the received input (e.g., a long input that exceeds or meets a threshold amount of time (e.g., 0.25 second, 0.5 second, 0.75 second, 1 second, 2 seconds, or other predefined amount of time in the 0.25-2.5 second range) is performed (e.g., invoking a digital assistant). For example, FIGS. 5F-5G show that in response to a long-press input 534 being received via the touch-sensitive display 502, a digital assistant is invoked. In some embodiments, the first operation associated with the received input is performed by another device, such as the audio source. Furthermore, in accordance with a determination that the input is received for a second duration of time, a second operation associated with the received input (e.g., a short input, such as a tap input, that does not meet or exceed the aforementioned threshold amount of time) a second operation associated with the received input is performed (e.g., the second operation is playing or pausing of audio content). In some embodiments, the first operation associated with the received input is performed by another device, such as the audio source. From another perspective, in accordance a determination that the input satisfies first duration criteria (e.g., long press criteria), a first operation associated with the received input is performed, and in accordance a determination that the input satisfies second duration criteria (e.g., short press criteria), a second operation associated with the received input is performed. For example, FIGS. 5H-5I show that in response to a short-press input 538 being received via the touch-sensitive display 502, audio playback resumes. Performing different operations based on the duration of the input reduces the number of controls that need to be displayed and provides additional control options without cluttering the user interface with additional (e.g., displayed) controls.

In some embodiments, the one or more input devices are configured to receive inputs at a plurality of locations on the audio output device case. In accordance with a determination that the input is received at a first location (e.g., at a first region of a touch sensitive surface on the case) of the plurality of locations on the audio output device case, the audio output device case performs (624) a first operation (e.g., sending a command to play audio, pause audio, fast forward audio, rewind audio, increase audio volume or decrease audio volume) associated with the received input. For example, pause button 522A, fast-forward button 522B, rewind button 522C, shown in FIG. 5A are all at predefined locations on headphone case 500. In accordance with a determination that the input is received at a second location (e.g., at a second region of a touch sensitive surface on the case, different from the first region) of the plurality of locations on the audio output device case, the audio output device case performs a second operation associated with the received input (e.g., sending a command to play audio, pause audio, fast forward audio, rewind audio, increase audio volume or decrease audio volume), wherein the second operation is different from the first operation. For example, pause button 522A, fast-forward button 522B, rewind button 522C, as shown in FIG. 5A are all at predefined locations on headphone case 500. Performing different operations based on the location of the input simplifies user access to those operations, providing an efficient user interface, and furthermore enables the user to efficiently invoke those operations without having to interact with another device, such as the audio source, which reduces the number of user actions needed to perform the operation.

In some embodiments, the one or more input devices are configured to receive different types of inputs, and in accordance with a determination that the input is of a first type (e.g., an input of a first duration, a first pressure, a first number of inputs (e.g., a single tap or multiple taps)), a first operation (e.g., playing audio, pausing audio, fast forwarding audio, rewinding audio, increasing audio volume or decreasing audio volume) associated with the received input of the first type is performed (626). For example, FIGS. 5J-5L illustrate a clockwise swipe input that causes audio output volume at headphones 504 to be increased. Further, in accordance with a determination that the input is of a second type (e.g., an input of a second duration, a second pressure, a second number of inputs (e.g., a single tap or multiple taps)) distinct from the first type, a second operation (e.g., playing audio, pausing audio, fast forwarding audio, rewinding audio, increasing audio volume or decreasing audio volume) associated with the received input of the second type is performed, wherein the second operation is different from the first operation. For example, FIGS. 5M-5O illustrates a substantially horizontal swipe gesture 542 causing the next song in a list of sounds to be selected, and FIGS. 5P-5R illustrate a substantially vertical swipe gesture causing a song to be liked or disliked. Providing multiple ways to interact with the audio output device case allows additional functionality to be provided without increasing a size of the audio output device case and without increasing complexity of a displayed user interface, which provides additional control options without cluttering the user interface with additional (e.g., displayed) controls.

In some embodiments, the one or more input devices (e.g., a touch-sensitive display) are configured to detect directionality of inputs, and in accordance with a determination that the input includes movement in a first direction (e.g., substantially vertical (e.g., within a predefined margin of vertical, such as +/−10 degrees of vertical) or substantially horizontal (e.g., within a predefined margin of horizontal, such as +/−10 degrees of horizontal)), the audio output device case performs (628) a first operation (e.g., sending instructions, for example to the audio source, for playing audio, pausing audio, fast forwarding audio, rewinding audio, increasing audio volume or decreasing audio volume) associated with the received input in the first direction. For example, as described herein with respect to FIGS. 5X-5Y, in response to a horizontal swipe gesture 564 moving across the touch-sensitive display 502 from left to right, an audio track is fast forwarded. Further, in accordance with a determination that the input includes movement in a second direction (e.g., substantially vertical (e.g., within a predefined margin of vertical, such as +/−10 degrees of vertical) or substantially horizontal (e.g., within a predefined margin of horizontal, such as +/−10 degrees of horizontal)) distinct from the first direction (e.g., perpendicular to, or in an opposite direction from, the first direction), the audio output device case performs a second operation (e.g., sending instructions, for example to the audio source, for playing audio, pausing audio, fast forwarding audio, rewinding audio, increasing audio volume or decreasing audio volume) associated with the received input in the second direction, wherein the second operation is different from the first operation. For example, as described herein with respect to FIGS. 5Z-5AAA, in response to a horizontal swipe gesture 568 moving across the touch-sensitive display 502 from right to left, an audio track is rewound. Performing different operations based on the directionality of an input reduces the number of controls that need to be displayed and provides additional control options without cluttering the user interface with additional (e.g., displayed) controls, making the user interface more efficient.

In some embodiments, the audio output device case includes a tactile output generator (e.g., a vibrational motor), and in accordance with a determination that a state of the audio source changes, the audio output device case provides (630) a tactile output via the tactile output generator that corresponds to the change in state of the audio source. For example, as discussed herein with respect to FIGS. 5AB-5AC, haptic feedback is provided at the headphone case 500 in response to a change from a first audio source to a second audio source (e.g., from a first application to a second application), or alternatively a change in the application or audio experience at the audio source 514 that provides audio to the headphones 504. Providing a haptic feedback when a state of the audio source changes provides feedback to a user, so that the user does not need to look at the audio output device case to know that the state of the audio source has changed, which provides improved feedback and makes the user interface more efficient.

In some embodiments, the audio output device case includes a display component (e.g., a full display, a series of LEDs), and in accordance with a determination that a state of the audio source changes, the audio output device case provides (632) corresponding visual feedback (e.g., an animation, a color selection, a picture, and/or text, corresponding to the change in the state of the audio source) via the display component that corresponds to the change in the state of the audio source. In some embodiments, visual feedback is also provided in accordance with a change from one audio source to another audio source. For example, as discussed above with reference to FIGS. 5AB-5AC, music icon 572 in FIG. 5AB has a different visual appearance than movie icon 576 in FIG. 5AC. Providing a visual feedback when a state of the audio source changes provides feedback to a user, so that the user knows that a request to switch audio sources or to change a state of the audio source has received and the corresponding operation performed, which provides improved feedback and makes the user interface more efficient.

In some embodiments, the operation is invoking a digital assistant, and after causing the one or more audio output devices to perform the operation (invoking a digital assistant), the one or more audio output devices receives (634), via a microphone of the one or more audio output devices, a verbal request (e.g., a command), and receives at the one or more audio output devices a response from the digital assistant. For example, FIG. 5G illustrates a user interface displayed, including a digital assistant graphic/animation 537, when a digital assistant is invoked and awaiting a verbal command. Enabling a user to invoke a digital assistant from an audio output device case, and then receive at the one or more audio output devices a verbal request to perform an operation, integrates the operation of the audio output device case and one or more audio output devices so as to provide a more efficient user interface, reducing the number of tactile user inputs by the user that are needed to perform an operation.

In some embodiments, the audio source is a media source for playing media (636). For example, FIG. 5A illustrates that the audio source is, or includes, a music application (e.g., a media application). Enabling a user to provide commands to a media source via an audio output device case (e.g., headphone case 500), reduces the number of devices required by the user to interact with in order to provide commands to a media source for playing media, which subsequently reduces the overall number of inputs to perform the operation.

In some embodiments, the input is a tap input (e.g., on an input device, such as touch-sensitive display 502 of headphone case 500) and the operation associated with the tap input is an operation for playing or pausing the media (638). For example, as discussed herein with respect to FIG. 5D-5F, that in response input 530, which may be a tap input, at/over pause button 522B, playback of a song is paused. Providing, at an audio output device case, simple to use controls for controlling playback of media allows the user to quickly perform these commonly used operations, and reduces the number of devices required by the user to interact with in order to provide commands to a media source for playing media, which subsequently reduces the overall number of inputs to perform the operation.

In some embodiments, the input is a swipe input (e.g., a swipe input in a horizontal direction, for example on a touch-sensitive surface of the audio output device case) and the operation associated with the swipe input is an operation for skipping to a track (e.g., an audio track, video track) in a list of tracks of the media (640) (e.g., skipping a song or moving to a next song). For example, as discussed herein with respect to FIGS. 5M-5O, a substantially horizontal swipe gesture received via the touch-sensitive display 502, causes the headphone case 500 to provide an instruction to the audio source to play a next song/track of the media being received from the audio source. Providing simple to use controls for controlling the playback of media allows the user to quickly perform these commonly used operations, and reduces the number of devices required by the user to interact with in order to provide commands to a media source for playing media, which subsequently reduces the overall number of inputs to perform the operation.

In some embodiments, the input is a rotational input (e.g., the input moves in a clockwise or counter clockwise direction along a substantially circular or elliptical path) and the operation associated with the received input is changing (642) audio volume of the media in accordance with the rotational input. For example, a clockwise input increases volume of the media and a counterclockwise input decreases volume or mutes volume of the media; e.g., the amount of volume change corresponds to the amount of rotation of the input and the rotational direction of the input. In some embodiments, in response to a rotational input, the audio output device case sends one or more commands to the audio source to increase or decrease the volume of the audio being sent to the one or more audio output devices, in accordance with direction and amount of the rotational input. For example, as described herein with respect to FIGS. 5J-5L, a clockwise swipe input causes output volume of headphones 504 to be increased. Providing simple to use controls for controlling the audio output volume, e.g., for playback of media, allows the user to quickly perform this commonly used operation, and reduces the number of devices the user is required to interact with in order to provide commands to a media source for playing media, which subsequently reduces the overall number of inputs to perform the operation.

In some embodiments, the input is a swipe input (e.g., a vertical swipe, or a swipe with a predefined orientation to the audio output device case). In some embodiments, in accordance with a determination that the swipe input is in a first direction (e.g., relative to the case), the audio output device case transmits (644) to the audio source information indicating that the media currently playing is preferred (e.g., "liked"). For example, FIGS. 5P-5R illustrate a substantially vertical swipe gesture being received via the touch-sensitive display 502, which causes the currently playing audio to be liked/favorited. In some embodiments, in accordance with a determination that the swipe input is in a second direction (e.g., relative to the case) distinct (e.g., opposite) from the first direction, the audio output device case transmits to the audio source information indicating that the media currently playing is not preferred (e.g., disliked). Providing simple to use controls for interacting with a media currently playing allows the user to quickly tailor their experience to their specific needs without needed to navigate user multiple user interfaces, which reduces the number of inputs needed to perform an operation.

In some embodiments, the operation associated with the received input is an operation for switching between modes (e.g., two or more modes of the following modes: a noise cancellation mode, a transparency mode that plays surrounding ambient noise received at a microphone of the one or more audio output devices, an enhanced hearing mode which amplifies surrounding voices and optionally suppresses ambient noises, and/or an off mode) of the one or more audio output devices (646). For example, as discussed herein with respect to FIGS. 5AD-5AF, in response to a user input received by a headphone case 500, headphones 504 switch between audio output modes. In some embodiments, in response to the received input (e.g., an input meeting predefined audio mode switching criteria) the audio output device case transmits to the audio source, or to the one or more audio output devices, one or more commands to change an audio output mode of the one or more audio output devices. Allowing a user to conveniently switch between audio modes without needing to navigate multiple user interfaces allows the user to quickly control playback of media, reduces the number of devices required by the user to interact with in order to provide commands for switching between audio output modes and reduces the number of inputs needed to perform an operation.

In some embodiments, the audio output device case includes a display component, the input is a press and hold input, and the audio output device case displays (648) an indication of a notification via the display component. While receiving the press and hold input via the one or more input devices, the audio output device case causes (e.g., by sending one or more commands or instructions to an audio source associated with the notification) the one or more audio output devices to play an audio notification corresponding to the indication via the display component. In some embodiments, when the press and hold is released the audio notification corresponding to the indication via the display component is paused. In some embodiments, if the press and hold is received again and the notification was previously not finished with its playback, the audio notification will resume from its paused time position. Alternatively, in some embodiments, once the input has duration that meets a threshold, the notification continues to be played, even if the input is released, but is paused or stop if a subsequent predefined input (e.g., a tap) is received. For example, as discussed herein with respect to an example shown in FIGS. 5AG-5AH, in response to a press and hold input 588, an audio notification is played back, as indicated by information bubble 519 in FIG. 5AH. Providing on a display of the audio output device case information regarding a notification further enhances the utility of the audio output device case, and reduces the number of user actions needed to access information concerning a received notification.

In some embodiments, the input is a swipe input and the operation associated with the swipe input is an operation for switching (650) (e.g., transitioning) from a first audio experience to a second audio experience of a plurality of audio experiences, wherein the second audio experience is different from the first audio experience (e.g., switching between different audio feeds, switching between different radio stations, or switching between different applications (e.g., media playing applications). As discussed herein with respect to examples shown in FIGS. 5AI through 5AQ, in response to swipe inputs on a touch-sensitive display 502 of a headphone case 500, the operation performed is switching between different audio experiences. For example, in response to the swipe input, the audio output device case sends one or more commands to the audio source so as to switch from a first audio experience to a second audio experience of a plurality of audio experiences. Providing simple to use controls, at the audio output device case, for switching between audio experiences allows the user to quickly perform these commonly used operations, reduces the number of devices required by the user to interact with in order to provide commands for switching between audio experiences, and reduces the number of inputs needed to perform an operation.

In some embodiments, switching from the first audio experience to the second audio experience includes crossfading (652) from the first audio experience to the second audio experience, the crossfading including transitioning from outputting the first audio experience at a first simulated spatial location to outputting the first audio experience at a second simulated spatial location and transitioning from outputting the second audio experience at a third simulated spatial location to outputting the second audio experience at a fourth simulated spatial location. Optionally, the fourth simulated spatial location may be the same as the first simulated spatial location, or a path from the first simulated spatial location to the second simulated spatial location may overlap with a path from the third simulated spatial location to the fourth simulated spatial location. In some embodiments, at an end of the crossfading, output audio associated with the first audio experience ceases and (e.g., only) audio associated with the second audio experience is output. In some embodiments, transitioning between audio experiences occurs gradually (e.g., the crossfading occurs over a period of time) and the rate of transition is driven by (e.g., corresponds to) a speed and/or magnitude of the swipe input. For example, audio mix chart 592 in FIGS. 5AI-5AQ illustrate crossfading between different audio sources. Crossfading provides a non-abrupt, e.g., smooth or graceful, transition between audio experiences, gives the user control, or a sense of control, over the transition, thereby providing an improved user interface and audio experience.

In some embodiments, the audio output device case includes a display component, and each audio experience of the plurality of audio experiences is associated with an indication (e.g., a content type indicator, or an application icon (e.g., weather, mail, music, health, or phone)) that is (or can be) displayed via the display component (654). In some embodiments, the method includes displaying a first (content type) indicator while audio content from the first audio experience is output via the one or more audio output devices, and displaying a second (content type) indicator, different from the first (content type) indicator, while audio content from the second audio experience is output via the one or more audio output devices. In some embodiments, when transitioning between audio experiences, the displayed indication changes from a first (content type) indicator to a second (content type) indicator. For example, FIG. 5AI illustrates a weather icon 590 to indicate that a weather audio experience is being output on the headphones 504, and FIG. 5AL illustrates a radio icon 5004 to indicate that a radio audio experience is being output on the headphones 504. Providing a visual indication on the audio output device case as to which audio experience is being output allows the user of the device to quickly understand which audio experience is being output, which provides an improved user interface, and also provides improved feedback when switching between audio experiences in response to a user input.

In some embodiments, the audio output device case includes a display component configured to display a distinct graphic for each audio experience of the plurality of audio experiences. In some embodiments, in response to the swipe input, comprising a first swipe input, the audio output device case transitions (656) (e.g., fading out) from displaying a first graphic for the first audio experience of the plurality of audio experiences to displaying (e.g., fading in) a second graphic for the second audio experience. In some embodiments, in response to a second swipe input via the one or more input devices (e.g., when the current audio experience is the last audio experience in a list or predefined set of audio experiences), the audio output device case fades out a graphic for a current audio experience (an audio experience at an end of a list of audio experiences) of the plurality of audio experiences, and then, in response to detecting an end of the second swipe input, the audio output device case fades in (e.g., fades back in) the graphic associated with the current audio experience of the plurality of audio experiences. FIGS. 5AO-5AQ illustrate that in response to a substantially horizontal swipe gesture 5014, the music application attempts to switch to the next audio experience in the list of audio experiences, but since the music application is the last application in the list of applications, the music application is not switched out. FIG. 5AP, in particular shows that music icon 5012 is at least partially faded out in response to the swipe gesture 5014, and FIG. 5AP shows the music icon 5012 faded back in once the swipe gesture 5014 ends (e.g., the input is released). Providing visual feedback to the user as they switch to another audio experience, and providing different visual feedback when the user attempts to go beyond of a list of audio experiences, allows the user to more efficiently transition to a different audio experience from a current audio experience, and to know when an end of a list of audio experiences has been reached, which helps keep the user informed with respect to available audio experiences and informed as to whether a swipe input has accomplished a transition from one audio experience to another, which makes the user interface efficient and reduces the number of inputs needed to perform an operation.

In some embodiments, the audio output device case includes a display component configured to display a plurality of colors, including a first color associated with a first audio experience of the plurality of audio experiences and a second color associated with a second audio experience of the plurality of audio experiences, and the method includes, in response to the swipe input, the audio output device case transitioning (658) from displaying the first color associated with the first audio experience to displaying the second color associated with the second audio experience. For example, FIG. 5AI illustrates a weather icon 590, which may be displayed with a first color to indicate that the weather audio experience is being outputted on the headphones 504, and FIG. 5AL illustrates a radio icon 5004, which may be displayed with a second color to indicate that the radio audio experience is being outputted on the headphones 504. Associating different colors different audio experiences allows the user of the device to quickly understand which audio experience is being output, without having to carefully view a graphic or icon in order to identify the currently selected audio experience, which provides improved feedback, makes the user interface efficient, and reduces the number of inputs needed to perform an operation.

In some embodiments, while outputting first audio content of a first type, associated with the first audio experience (e.g., in accordance with a determination that a current audio experience is the first audio experience), the one or more audio output devices output (660) the first audio at one or more first simulated spatial locations. In some embodiments, while outputting second audio content of a second type, associated with the second audio experience (e.g., in accordance with a determination that a current audio experience is the second audio experience), the one or more audio output devices output the second audio at one or more second simulated spatial locations, wherein the one or more second simulated spatial locations include at least one simulated spatial location not included in the one or more first simulated spatial locations. For example, FIG. 5AI illustrates that the weather application has a first simulated spatial location 596 in simulated spatial location map 597, while FIG. 5AJ illustrates that the radio application has a second simulated spatial location 5002 in simulated spatial location map 597. In some embodiments, the first audio experience and/or first content type is associated with a first predefined set of simulated audio spatial locations, and the second audio experience and/or second content type is associated with a second predefined set of simulated audio spatial locations that are at least partially different from the first predefined set of simulated audio spatial locations. For example, simulated spatial location map 597 also illustrates that the radio application (e.g., as illustrated in FIG. 5AJ by second simulated spatial location 5002) is in a different simulated spatial location than the weather application (e.g., as illustrated by first simulated spatial location 596). In some embodiments, processing of the audio being output at the one or more audio output devices so as to have the aforementioned spatial audio properties is performed by the audio source and/or the one or more audio output devices, while the user input to select an audio experience or transition from one audio experience to another is received at the audio output device case. Using spatial audio, with different types of audio content being output at different simulated spatial locations, provides improved feedback to the user, helping the user to intuitively understand the type or source of the audio content being heard, and avoids confusion as to whether the audio being heard is associated with a first audio experience or a second audio experience.

In some embodiments, in response to the swipe input, the one or more audio output devices announces (662) an identifier of the second audio experience (e.g., an identifier associated with a next selected audio experience of the plurality of audio experiences). For example, FIGS. 5AI, 5AJ and 5AL each indicate in their respective information bubbles 519 that the name of the currently selected audio experience or application (e.g., weather app, or radio app) is stated prior to providing the audio experience. Providing an audio description of which audio experience is being output allows the user of the device to quickly understand which audio experience is being output, without the user having to look at displayed information on the audio output device case or on the audio source, which provides improved feedback, makes the user interface efficient, and reduces the number of inputs needed to perform an operation.

It should be understood that the particular order in which the operations in FIGS. 6A-6F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 600 described above with respect to FIGS. 6A-6F. For example, the contacts, gestures, user interface objects, tactile outputs, animations and operations described above with reference to method 600 optionally have one or more of the characteristics of the contacts, gestures, user interface objects, tactile outputs, animations and operations described herein with reference to other methods described herein (e.g., method 700). For brevity, these details are not repeated here.

FIGS. 7A-7B are flow diagrams illustrating method 700 of interacting with an audio output device case to control one or more audio output devices, in accordance with some embodiments. Method 700 is performed (702) (at least in part) at an audio output device case (e.g., headphone case 500 in FIG. 4C) that includes one or more input devices (e.g., touch-sensitive display 502 in FIG. 4C), a display component (e.g., touch-sensitive display 502 in FIG. 4C), and is in wireless communication with at least one or more audio output devices and an audio source (e.g., an audio source device, such as source 514 in FIG. 5A). In some embodiments, the display component is a touch-screen display and the touch-sensitive surface and display component are integrated together. In some embodiments, the display component is separate from the touch-sensitive surface (e.g., the display component is on a first side of the audio output device case and the touch-sensitive surface is on opposing side of the audio output device case). Some operations in method 700 are, optionally, combined and/or the order of some operations is, optionally, changed.

As described below, method 700 provides an intuitive way to interact with an audio output device case that is configured to perform operations associated with audio experiences delivered to a user via one or more audio output devices, charge the audio output devices, and store the audio output devices. Having an audio output device case that is configured to perform operations associated with audio experiences delivered to a user via one or more audio output devices allows for the user to not have to switch between multiple devices to control the one or more audio output devices. Additionally, providing an audio output device case that is responsive to simple and intuitive inputs makes use of the audio output devices, and the corresponding user interface, more efficient than systems in which the audio output device case's sole functions are to store and charge the audio output devices, and reduces the number of devices that the user is required to interact in order to perform an operation.

In some embodiments, the audio output device case displays (704), via the display component, information corresponding to a functionality associated with outputting audio at the one or more audio output devices (e.g., displays an audio mode setting, or displays one or more virtual buttons or affordances for selecting media or controlling playback of media). For example, FIG. 5A illustrates an example user interface 520 for displaying information and playback control affordances corresponding to a song being output by the headphones 504. In some embodiments, while displaying the information via the display component, the audio output device case receives (706), via the one or more input devices, an input. In some embodiments, in response to receiving the input (e.g., input 528 in FIG. 5B), the audio output device case communicates (708) instructions for outputting, via the one or more audio output devices, audio associated with the functionality. For example, in response to the input 529 in FIG. 5B, the headphones 504 in FIG. 5C play fast-forwarded song 1 (e.g., as described information bubble 519).

In some embodiments, the input is a swipe gesture (e.g., a swipe gesture occurring in either a vertical or horizontal direction), and in response to receiving the input, the audio output device case communicates (710) instructions for transferring playback of audio from another device to the one or more audio output devices (or for transferring playback of audio from the one or more audio output devices to another device). In some embodiments, the swipe gesture includes movement, and in accordance with a determination that the input meets input criteria (e.g., input criteria can include direction, speed, and/or magnitude criteria), the audio output device case communicates instructions for transferring playback of audio from another device to the one or more audio output devices, and in accordance with a determination that the input does not meet the input criteria, forgoes communicating the instructions for transferring playback of audio from another device to the one or more audio output devices. For example, as described herein with respect to FIGS. 5AR-5AU and 5AY, FIGS. 5AR-5AU illustrate transferring audio from a nearby device 550 to headphones 504 in response to a first swipe gesture, and FIG. 5AY illustrate transferring audio from headphones 504 to the nearby device 550 in response to a second swipe gesture. Having an intuitive gesture such as a swipe gesture cause transfer of playback of audio from another device to the one or more audio output devices, reduces user interface complexity, providing additional control options without cluttering the user interface with additional displayed controls, which makes the user interface more efficient.

In some embodiments, before displaying the information corresponding to a functionality associated with outputting audio at the one or more audio output devices, a nearby device performs (712) an operation (e.g., playback of an audio book or music or other media) corresponding to the functionality. For example, as discussed herein with respect to FIGS. 5AR-5AU, FIG. 5AR illustrates that a nearby device 550 is outputting audio from an audio book application (e.g., as indicated by information bubble 5021). Subsequently, the headphone case 500 displays a siding control (e.g., information corresponding to a functionality associated with outputting audio at the one or more audio output devices) for transitioning the audio output to headphones 504. Dynamically displaying information corresponding to a functionality associated with outputting audio at the one or more audio output devices, after an operation corresponding to that functionality is performed on a nearby device, allows the user to receive from the audio output device case information tailored to the available functionality, which reduces complexity of the user interface, reduces the number of inputs needed to perform the operation, and enables one or more operations to be performed automatically.

In some embodiments, the audio output device case includes a haptic feedback generator, and in response to the audio output device case satisfying proximity criteria (e.g., being close enough to wireless communicate with the audio source) with respect to the audio source, the audio output device case provides (714) a tactile output using the haptic feedback generator or (e.g., and/or) an audio output via the one or more audio output devices. For example, as discussed herein with respect to FIG. 5AR, FIG. 5AR illustrates that upon the headphone case 500 and headphones 504 being in range and/or in communication with the external device 550, the headphone case 500 provides a haptic feedback via a haptic feedback generator (e.g., as indicated by vibrational lines 5020A and 5020B). Dynamically providing haptic feedback when the audio output device case satisfies proximity criteria with respect to an audio source informs the user of convenient available functionalities of the headphone case, which reduces the number of inputs needed to perform the operation and enables one or more operations to be performed automatically.

In some embodiments, the audio output device case includes a haptic feedback generator, and in accordance with a determination that the audio associated with the functionality is (e.g., has been) transferred from another device (e.g., an interne connected speaker (e.g., a smart speaker), a laptop, a desktop, or a mobile device) to the one or more audio output devices, the audio output device case provides (716) a tactile output via the haptic feedback generator or (e.g., and/or) provides an audio output via the one or more audio output devices. In some embodiments, the determination is made by the audio source, or the other device from which the audio was transferred, or the audio output device case. As discussed herein with reference to FIG. 5AU, FIG. 5AU illustrates that in response to the audiobook audio being transferred to headphones 504, haptic feedback (e.g., haptic feedback 5035A and 5035B) is output via the headphone case 500. Automatically providing haptic feedback in conjunction with a transfer of functionality from another device to the one or more audio output devices notifies the user of a successful transfer, without requiring the user to navigate to a settings menu to confirm the transfer, which provides improved feedback and makes the user interface more efficient.

In some embodiments, in accordance with a determination that the audio associated with the functionality is transferred from another device to one or more audio output devices, the audio output device case provides (718) visual feedback (e.g., a combination of any one of an animation, a change in color, textual description, etc.) via the display component. In some embodiments, the determination is made by the audio source, or the other device from which the audio was transferred, or the audio output device case. For example, as discussed herein with reference to FIG. 5AU, FIG. 5AU indicates, in response to audiobook audio being transferred, the user interface on the headphone case is updated to display one or more application specific controls for interacting with an audio book application (e.g., pause/play button 5028, rewind 5030, fast-forward 5032, playback scrubber 5034). Automatically providing visual feedback in conjunction with a transfer of functionality from another device to the one or more audio output devices notifies the user of a successful transfer, and does not require the user to navigate to a settings menu to confirm the transfer, without requiring the user to navigate to a settings menu to confirm the transfer, which provides improved feedback and makes the user interface more efficient.

In some embodiments, after the functionality is transferred from another device to one or more audio output devices, the audio output device case receives (720), via the one or more input devices, another input (e.g., a tap input, such as input 5036 in FIG. 5AV on or at fast-forward button 5032), and in response to the other input, the audio output device case performs one or more additional operations associated with the other input (e.g., fast forwarding through an audiobook or other media, pausing playback, resulting playback, skipping to a next section, etc.). The one or more additional operations optionally are for managing audio output by the one or more audio output devices. For example, as discussed herein with respect to FIGS. 5AV-5AW, in response to input 5036 on fast-forward button 5032, the audio book is fast forwarded, as shown in FIG. 5AW. Dynamically allowing, after transferring functionality from another device to the one or more audio output devices, further user input at the audio output device case to control or invoke additional operations further extends the utility of the audio output device case for controlling audio functionality of the one or more audio output devices, reduces the number of devices the user is required to interact with in order to provide commands to perform such additional operations, and reduces the overall number of inputs required to perform the operation.

In some embodiments, in conjunction with performing the one or more additional operations, the audio output device case and/or the one or more audio output devices provides (722) haptic, audio, and/or visual feedback. For example, as shown in FIG. 5AW, in response to input 5036 which invokes a fast-forward operations, haptic feedback (e.g., illustrated by lines 5038A and 5038B) is output via a haptic feedback generator of the headphone case 500, as visual feedback is also provided by a scrub bar being advanced to a new position. Optionally, audio feedback is also provided, or provided instead, by the audio output device case (e.g., in embodiments in which the case includes a speaker or other audio output component) or the one or more audio output devices. Automatically providing visual, haptic and/or audio feedback in conjunction with performing one or more additional operations, provides improved feedback and makes the user interface more efficient.

In some embodiments, the information displayed via the display component is one or more controls (e.g., one or more controls for requesting that a next or previous navigation instruction be read aloud) for communicating (724) instructions for outputting, via the one or more audio output devices, audio associated with directions (e.g., turn-by-turn directions) from a maps application. For example, as discussed herein with reference to FIG. 5AZ, FIG. 5AZ illustrates display of one or more controls of a map application on a touch-sensitive display 502 of headphone case 500. Providing map application controls on the headphone case allows the user to control which directions from the map application are output as audio, which allows the user to interact with the audio output device case instead of an additional device (e.g., a cellphone) to control the audio output of such directions, further extends the utility of the audio output device case for controlling audio functionality of the one or more audio output devices, reduces the number of devices the user is required to interact with in order to provide commands to perform such additional operations, and reduces the overall number of inputs required to perform the operation.

In some embodiments, the information displayed via the display component is one or more controls for communicating (726) instructions to the audio source for causing, via the one or more audio output devices, playing or pausing playback of an audio book, fast forwarding playback (e.g., by a predefined amount of time, or increasing a speed of playback by a predefined amount or multiplicative factor) of the audio book, and rewinding playback (e.g., by a predefined amount of time) of the audio book (e.g., or decreasing a speed of playback by a predefined amount or multiplicative factor). For example, as discussed herein with reference to FIG. 5AU, FIG. 5AU illustrates an example of audiobook user interface (displayed on headphone case 500) that includes controls (e.g., pause/play button 5028, rewind 5030, fast-forward 5032, playback scrubber 5034) for an audio book application. Displaying audiobook controls on an audio output device case allows the user to control operation of an audiobook application using the audio output device case, further extending the utility of the audio output device case for controlling audio functionality of the one or more audio output devices, reduces the number of devices the user is required to interact with in order to provide commands to perform such operations, and reduces the overall number of inputs required to perform the operation.

In some embodiments, in response to receiving the input (e.g., input 538 shown in FIG. 5H, or swipe input 5022 shown in FIGS. 5AS-5AU), the audio output device case communicates (728) instructions for playing, at the one or more audio output devices, audio from another device (e.g., an audio source, such as a smart speaker, a smartphone, a laptop computer, a desktop computer, a mobile device, etc.). Numerous examples of inputs that result in audio from an audio source or device being output via headphones 504 are described above. Such inputs include, but are not limited to, inputs at the headphone case 500 that cause audio to be transferred from another device to headphones 5004. Being able to use an input at an audio output device case to cause transfer of playback (or to resume playback) of audio from another device to the one or more audio output devices, reduces user interface complexity, providing additional control options without cluttering the user interface with additional displayed controls, which makes the user interface more efficient.

In some embodiments, in accordance with a determination that the one or more audio output devices are playing a first audio (e.g., a song, an audiobook, a podcast, a movie, a TV show, etc.) before the audio output device case receives the input, the first audio is mixed (730) with second audio, which is audio from the other device. For example, the second audio is crossfaded with the first audio while the audio delivered to the one or more audio output devices transitions from the first audio to the second audio, as described herein with respect to FIGS. 5AS-5AU, which include an audio mix chart 5026, which shows how audio from a music application and audio from an audiobook application are crossfaded in accordance with the movement of a substantially horizontal dragging gesture 5022. Mixing audio provides a smoother transition between a first audio and a second audio, which is audibly less jarring for the user and provides improved feedback.

In some embodiments, in response to receiving an input (e.g., a swipe input), the audio output device case communicates (732) instructions (e.g., to the other device or audio source or the one or more audio output devices) for stopping playback of audio from the other device to the one or more audio output devices. For example, as discussed herein with reference to FIG. 5AY, a dragging gesture, such as the one shown in FIG. 5AY, can be used to cause audio being play on the one or more audio output devices to be transferred to another device. In another example, the received input can be a tap or touch on a pause or stop control, such as control 522B in FIG. 5A. Being able to use an input at an audio output device case to stop playback of audio from another device to the one or more audio output devices further extends the utility of the audio output device case for controlling audio functionality of the one or more audio output devices, reduces the number of devices the user is required to interact with in order to provide commands to perform such operations, and reduces the overall number of inputs required to perform the operation.

In some embodiments, the information that is displayed via the display component is (or includes) information indicating availability of the other device (734) (e.g., for playing audio from the other device via the one or more audio output devices, or availability of the other device as an alternative audio source). For example, FIG. 5AAA illustrates a user interface for showing information indicating availability of another device, such as a device (e.g., device 5054 in FIG. 5AAA) that is nearby the audio output devices and/or audio output device case, from which audio can be directed to the one or more audio output devices. Displaying (e.g., automatically) the availability of a nearby device for audio playback allows the user to know what devices the user can select as an audio source, without having to navigate to a settings or other menu to do so, further extends the utility of the audio output device case for controlling audio functionality of the one or more audio output devices, and also reduces the number of inputs needed to perform an operation.

In some embodiments, the information that is displayed via the display component includes information corresponding to the other device when predefined criteria are satisfied (736). For example, the predefined include may include proximity criteria (e.g., within local wireless communication range) and/or audio source criteria (e.g., that the other device can be an audio source for the one or more audio output devices). For example, FIG. 5AAA illustrates a user interface for showing an indication when a device is nearby and is playing audio that can be transferred to the headphones. Conditionally (e.g., and automatically) displaying information about the availability of a nearby device for audio playback when predefined criteria are satisfied allows the user to know what devices the user can select as an audio source, without having to navigate to a settings or other menu to do so, further extends the utility of the audio output device case for controlling audio functionality of the one or more audio output devices, and also reduces the number of inputs needed to perform an operation.

It should be understood that the particular order in which the operations in FIGS. 7A-7B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 700 described above with respect to FIGS. 7A-7B. For example, the contacts, gestures, user interface objects, tactile outputs, and animations described above with reference to method 700 optionally have one or more of the characteristics of the contacts, gestures, user interface objects, tactile outputs, and animations described herein with reference to other methods described herein (e.g., method 600). For brevity, these details are not repeated here.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:
1. A method, comprising:
at an audio output device case that includes one or more input devices and a display component, and is in communication with at least one or more audio output devices and an audio source:
while the audio source is in communication with the one or more audio output devices:
dynamically displaying, via the display component, one or more available operations based on contextual information associated with the audio output device case, the audio source, or the one or more audio output devices;
receiving an input via the one or more input devices of the audio output device case; and
in response to receiving the input, causing the one or more audio output devices to perform an operation associated with the received input while maintaining communication of the audio source with the one or more audio output devices, wherein the operation associated with the received input comprises a respective operation of the one or more available operations;
the method including:
while the audio source is a first audio source and the contextual information comprises first contextual information associated with the first audio source and a first application associated with the first audio source:
    displaying one or more user selectable controls associated with the first application;
    receiving a first input via the one or more input devices of the audio output device case that selects a respective control of one or more user selectable controls associated with the first application; and
    in response to receiving the first input, causing the one or more audio output devices to perform a first operation associated with the selected respective control of the one or more user selectable controls associated with the first application while maintaining communication of the audio source with the one or more audio output devices; and
while the audio source is a second audio source, different from the first audio source, and the contextual information comprises second contextual information associated with the second audio source and a second application associated with the second audio source, wherein the second application is different from the first application:
    displaying one or more user selectable controls associated with the second application, wherein at least one of the one or more user selectable controls associated with the second application is distinct from the one or more user selectable controls associated with the first application;
    receiving a second input via the one or more input devices of the audio output device case that selects a respective control of the one or more user selectable controls associated with the second application; and
    in response to receiving the second input, causing the one or more audio output devices to perform a second operation associated with the selected respective control of the one or more user selectable controls associated with the second application while maintaining communication of the audio source with the one or more audio output devices.

2. The method of claim 1, wherein the audio source, the first audio source or the second audio source is a phone, a computer, a tablet device, a watch device, or a cloud-based audio source.

3. The method of claim 1, including:
while the audio source is in communication with the one or more audio output devices:
    displaying a plurality of controls, each at a different predefined control region, of a plurality of control regions, on the audio output device case.

4. The method of claim 1, wherein:
in accordance with a determination that the input, the first input, or the second input is received for a first duration of time, performing a first operation associated with the received input; and
in accordance with a determination that the input, the first input, or the second input is received for a second duration of time, performing a second operation associated with the received input.

5. The method of claim 1, wherein the one or more input devices are configured to receive inputs at a plurality of locations on the audio output device case, and the method includes:
in accordance with a determination that the input, the first input, or the second input is received at a first location of the plurality of locations on the audio output device case, performing a first operation associated with the received input; and
in accordance with a determination that the input, the first input, or the second input is received at a second location of the plurality of locations on the audio output device case, performing a second operation associated with the received input, wherein the second operation is different from the first operation.

6. The method of claim 1, wherein the one or more input devices are configured to receive different types of inputs, and the method includes:
in accordance with a determination that the input, the first input, or the second input is of a first type, performing a first operation associated with the received input of the first type; and
in accordance with a determination that the input, the first input, or the second input is of a second type distinct from the first type, performing a second operation associated with the received input of the second type, wherein the second operation is different from the first operation.

7. The method of claim 1, wherein the one or more input devices are configured to detect directionality of inputs, and the method includes:
in accordance with a determination that the input, the first input, or the second input includes movement in a first direction, performing a first operation associated with the received input in the first direction; and
in accordance with a determination that the input, the first input, or the second input includes movement in a second direction distinct from the first direction, performing a second operation associated with the received input in the second direction, wherein the second operation is different from the first operation.

8. The method of claim 1, wherein the audio output device case includes a tactile output generator, and the method includes:
in accordance with a determination that a state of the audio source changes, providing a tactile output via the tactile output generator that corresponds to the change in state of the audio source.

9. The method of claim 1, including:
in accordance with a determination that a state of the audio source changes, providing corresponding visual feedback via the display component that corresponds to the change in the state of the audio source.

10. The method of claim 1, wherein the audio source, the first audio source, or the second audio source is a media source for playing media.

11. The method of claim 10, wherein the input, the first input, or the second input is a tap input and the operation associated with the tap input is an operation for playing or pausing the media.

12. The method of claim 10, wherein the input, the first input, or the second input is a swipe input and the operation associated with the swipe input is an operation for skipping to a track in a list of tracks of the media.

13. The method of claim 10, wherein the input, the first input, or the second input is a rotational input and the operation associated with the received input is changing audio volume of the media in accordance with the rotational input.

14. The method of claim 10, wherein the input, the first input, or the second input is a swipe input, and the method includes:

in accordance with a determination that the swipe input is in a first direction, transmitting to the audio source, the first audio source, or the second audio source information indicating that the media currently playing is preferred; and in accordance with a determination that the swipe input is in a second direction distinct from the first direction, transmitting to the audio source, the first audio source, or the second audio source information indicating that the media currently playing is not preferred.

15. The method of claim 1, wherein the input, the first input, or the second input is a press and hold input, and the method includes:

displaying an indication of a notification via the display component; and while receiving the press and hold input via the one or more input devices:

causing the one or more audio output devices to play an audio notification corresponding to the indication via the display component.

16. The method of claim 1, wherein the input, the first input, or the second input is a swipe input and the operation associated with the swipe input is an operation for switching from a first audio experience to a second audio experience of a plurality of audio experiences, wherein the second audio experience is different from the first audio experience.

17. The method of claim 16, wherein the method includes crossfading from the first audio experience to the second audio experience, the crossfading including transitioning from outputting the first audio experience at a first simulated spatial location to outputting the first audio experience at a second simulated spatial location and transitioning from outputting the second audio experience at a third simulated spatial location to outputting the second audio experience at a fourth simulated spatial location.

18. The method of claim 16, wherein each audio experience of the plurality of audio experiences is associated with an indication that is displayed via the display component.

19. The method of claim 16, wherein the display component is configured to display a distinct graphic for each audio experience of the plurality of audio experiences, and the method includes:

in response to the swipe input, comprising a first swipe input, transitioning from displaying a first graphic for the first audio experience of the plurality of audio experiences to displaying a second graphic for the second audio experience; and in response to a second swipe input via the one or more input devices, fading out a graphic for a current audio experience of the plurality of audio experiences, and then, in response to detecting an end of the second swipe input, fading in the graphic associated with the current audio experience of the plurality of audio experiences.

20. The method of claim 16, wherein the display component is configured to display a plurality of colors, including a first color associated with the first audio experience of the plurality of audio experiences and a second color associated with the second audio experience of the plurality of audio experiences, and the method includes, in response to the swipe input, transitioning from displaying the first color associated with the first audio experience to displaying the second color associated with the second audio experience.

21. The method of claim 16, including:

while outputting first audio content of a first type, associated with the first audio experience, outputting the first audio content at one or more first simulated spatial locations; and while outputting second audio content of a second type, associated with the second audio experience, outputting the second audio content at one or more second simulated spatial locations, wherein the one or more second simulated spatial locations include at least one simulated spatial location not included in the one or more first simulated spatial locations.

22. The method of claim 16, including:

in response to the swipe input, announcing, via the one or more audio output devices, an identifier of the second audio experience.

23. The method of claim 1, wherein the operation associated with the received input, the first input, or the second input is an operation for switching between modes of the one or more audio output devices.

24. The method of claim 1, wherein the operation associated with the received input, the first input, or the second input is an operation for playing audio, pausing audio, fast-forwarding audio, rewinding audio, or skipping to an audio track in a list of audio tracks.

25. The method of claim 1, wherein the operation associated with the received input, the first input, or the second input is an operation for changing an output volume of the one or more audio output devices.

26. The method of claim 1, wherein the operation associated with the received input, the first input, or the second input is an operation for invoking a digital assistant.

27. The method of claim 26, including:

after causing the one or more audio output devices to perform the operation, receiving, via a microphone of the one or more audio output devices, a verbal request, and receiving at the one or more audio output devices a response from the digital assistant.

28. An audio output device case, comprising:

one or more input devices;

a display component;

a communication component that is in communication with at least one or more audio output devices and an audio source;

one or more processors; and memory storing one or more programs, wherein the one or more programs are configured to be executed by the one or more processors, the one or more programs including instructions for:

while the audio source is in communication with the one or more audio output devices:

dynamically displaying, via the display component, one or more available operations based on contextual information associated with the audio output device case, the audio source, or the one or more audio output devices;

receiving an input via the one or more input devices of the audio output device case; and in response to receiving the input, causing the one or more audio output devices to perform an operation associated with the received input while maintaining communication of the audio source with the one or more audio output devices, wherein the operation associated with the received input comprises a respective operation of the one or more available operations;

the one or more programs include instructions for:
while the audio source is a first audio source and the contextual information comprises first contextual information associated with the first audio source and a first application associated with the first audio source:
displaying one or more user selectable controls associated with the first application;
receiving a first input via the one or more input devices of the audio output device case that selects a respective control of one or more user selectable controls associated with the first application; and
in response to receiving the first input, causing the one or more audio output devices to perform a first operation associated with the selected respective control of the one or more user selectable controls associated with the first application while maintaining communication of the audio source with the one or more audio output devices; and
while the audio source is a second audio source, different from the first audio source, and the contextual information comprises second contextual information associated with the second audio source and a second application associated with the second audio source, wherein the second application is different from the first application:
displaying one or more user selectable controls associated with the second application, wherein at least one of the one or more user selectable controls associated with the second application is distinct from the one or more user selectable controls associated with the first application;
receiving a second input via the one or more input devices of the audio output device case that selects a respective control of the one or more user selectable controls associated with the second application; and
in response to receiving the second input, causing the one or more audio output devices to perform a second operation associated with the selected respective control of the one or more user selectable controls associated with the second application while maintaining communication of the audio source with the one or more audio output devices.

29. The audio output device case of claim 28, wherein the one or more programs include instructions for:
while the audio source is in communication with the one or more audio output devices:
displaying a plurality of controls, each at a different predefined control region, of a plurality of control regions, on the audio output device case.

30. The audio output device case of claim 28, wherein the one or more input devices are configured to receive inputs at a plurality of locations on the audio output device case, and wherein the one or more programs include instructions for:
in accordance with a determination that the input, the first input, or the second input is received at a first location of the plurality of locations on the audio output device case, performing a first operation associated with the received input; and
in accordance with a determination that the input, the first input, or the second input is received at a second location of the plurality of locations on the audio output device case, performing a second operation associated with the received input, wherein the second operation is different from the first operation.

31. The audio output device case of claim 28, wherein the one or more input devices are configured to receive different types of inputs, and wherein the one or more programs include instructions for:
in accordance with a determination that the input, the first input, or the second input is of a first type, performing a first operation associated with the received input of the first type; and
in accordance with a determination that the input, the first input, or the second input is of a second type distinct from the first type, performing a second operation associated with the received input of the second type, wherein the second operation is different from the first operation.

32. The audio output device case of claim 28, wherein the one or more input devices are configured to detect directionality of inputs, and wherein the one or more programs include instructions for:
in accordance with a determination that the input, the first input, or the second input includes movement in a first direction, performing a first operation associated with the received input in the first direction; and
in accordance with a determination that the input, the first input, or the second input includes movement in a second direction distinct from the first direction, performing a second operation associated with the received input in the second direction, wherein the second operation is different from the first operation.

33. The audio output device case of claim 28, wherein the audio output device case includes a tactile output generator, and wherein the one or more programs include instructions for:
in accordance with a determination that a state of the audio source changes, providing a tactile output via the tactile output generator that corresponds to the change in state of the audio source.

34. The audio output device case of claim 28, wherein the one or more programs include instructions for:
in accordance with a determination that a state of the audio source changes, providing corresponding visual feedback via the display component that corresponds to the change in the state of the audio source.

35. The audio output device case of claim 28, wherein the input, the first input, or the second input is a press and hold input, and wherein the one or more programs include instructions for:
displaying an indication of a notification via the display component; and
while receiving the press and hold input via the one or more input devices:
causing the one or more audio output devices to play an audio notification corresponding to the indication via the display component.

36. The audio output device case of claim 28, wherein the input, the first input, or the second input is a swipe input and the operation associated with the swipe input is an operation for switching from a first audio experience to a second audio experience of a plurality of audio experiences, wherein the second audio experience is different from the first audio experience.

37. The audio output device case of claim 28, wherein the operation associated with the received input, the first input, or the second input is an operation for switching between modes of the one or more audio output devices.

38. The audio output device case of claim 28, wherein the operation associated with the received input, the first input, or the second input is an operation for playing audio, pausing audio, fast-forwarding audio, rewinding audio, or skipping to an audio track in a list of audio tracks.

39. The audio output device case of claim 28, wherein the operation associated with the received input, the first input, or the second input is an operation for changing an output volume of the one or more audio output devices.

40. The audio output device case of claim 28, wherein the operation associated with the received input, the first input, or the second input is an operation for invoking a digital assistant.

41. The audio output device case of claim 40, wherein the one or more programs include instructions for:
  after causing the one or more audio output devices to perform the operation, receiving, via a microphone of the one or more audio output devices, a verbal request, and receiving at the one or more audio output devices a response from the digital assistant.

42. A non-transitory computer readable storage medium storing one or more programs, the one or more programs comprising instructions, that, when executed by an audio output device case with one or more input devices, a display component, and a communication component that is in communication with at least one or more audio output devices and an audio source, cause the audio output device case to:
  while the audio source is in communication with the one or more audio output devices:
    dynamically display, via the display component, one or more available operations based on contextual information associated with the audio output device case, the audio source, or the one or more audio output devices;
    receive an input via the one or more input devices of the audio output device case; and
    in response to receiving the input, cause the one or more audio output devices to perform an operation associated with the received input while maintaining communication of the audio source with the one or more audio output devices;
  wherein the one or more programs include instructions that, when executed by the audio output device case, cause the audio output device case to:
    while the audio source is a first audio source and the contextual information comprises first contextual information associated with the first audio source and a first application associated with the first audio source:
      display one or more user selectable controls associated with the first application;
      receive a first input via the one or more input devices of the audio output device case that selects a respective control of one or more user selectable controls associated with the first application; and
      in response to receiving the first input, cause the one or more audio output devices to perform a first operation associated with the selected respective control of the one or more user selectable controls associated with the first application while maintaining communication of the audio source with the one or more audio output devices; and
    while the audio source is a second audio source, different from the first audio source, and the contextual information comprises second contextual information associated with the second audio source and a second application associated with the second audio source, wherein the second application is different from the first application:
      display one or more user selectable controls associated with the second application, wherein at least one of the one or more user selectable controls associated with the second application is distinct from the one or more user selectable controls associated with the first application;
      receive a second input via the one or more input devices of the audio output device case that selects a respective control of the one or more user selectable controls associated with the second application; and
      in response to receiving the second input, cause the one or more audio output devices to perform a second operation associated with the selected respective control of the one or more user selectable controls associated with the second application while maintaining communication of the audio source with the one or more audio output devices.

43. The non-transitory computer readable storage medium of claim 42, wherein the one or more programs include instructions that, when executed by the audio output device case, cause the audio output device case to:
  while the audio source is in communication with the one or more audio output devices:
    display a plurality of controls, each at a different predefined control region, of a plurality of control regions, on the audio output device case.

44. The non-transitory computer readable storage medium of claim 42, wherein the one or more input devices are configured to receive inputs at a plurality of locations on the audio output device case, and wherein the one or more programs include instructions that, when executed by the audio output device case, cause the audio output device case to:
  in accordance with a determination that the input, the first input, or the second input is received at a first location of the plurality of locations on the audio output device case, perform a first operation associated with the received input; and
  in accordance with a determination that the input, the first input, or the second input is received at a second location of the plurality of locations on the audio output device case, perform a second operation associated with the received input, wherein the second operation is different from the first operation.

45. The non-transitory computer readable storage medium of claim 42, wherein the one or more input devices are configured to receive different types of inputs, and wherein the one or more programs include instructions that, when executed by the audio output device case, cause the audio output device case to:
  in accordance with a determination that the input, the first input, or the second input is of a first type, perform a first operation associated with the received input of the first type; and
  in accordance with a determination that the input, the first input, or the second input is of a second type distinct from the first type, perform a second operation associated with the received input of the second type, wherein the second operation is different from the first operation.

46. The non-transitory computer readable storage medium of claim 42, wherein the one or more input devices are configured to detect directionality of inputs, and wherein the one or more programs include instructions that, when executed by the audio output device case, cause the audio output device case to:
- in accordance with a determination that the input, the first input, or the second input includes movement in a first direction, perform a first operation associated with the received input in the first direction; and
- in accordance with a determination that the input, the first input, or the second input includes movement in a second direction distinct from the first direction, perform a second operation associated with the received input in the second direction, wherein the second operation is different from the first operation.

47. The non-transitory computer readable storage medium of claim 42, wherein the audio output device case includes a tactile output generator, and wherein the one or more programs include instructions that, when executed by the audio output device case, cause the audio output device case to:
- in accordance with a determination that a state of the audio source changes, provide a tactile output via the tactile output generator that corresponds to the change in state of the audio source.

48. The non-transitory computer readable storage medium of claim 42, wherein the one or more programs include instructions that, when executed by the audio output device case, cause the audio output device case to:
- in accordance with a determination that a state of the audio source changes, provide corresponding visual feedback via the display component that corresponds to the change in the state of the audio source.

49. The non-transitory computer readable storage medium of claim 42, wherein the input, the first input, or the second input is a press and hold input, and wherein the one or more programs include instructions that, when executed by the audio output device case, cause the audio output device case to:
- display an indication of a notification via the display component; and
- while receive the press and hold input via the one or more input devices:
  - cause the one or more audio output devices to play an audio notification corresponding to the indication via the display component.

50. The non-transitory computer readable storage medium of claim 42, wherein the input, the first input, or the second input is a swipe input and the operation associated with the swipe input is an operation for switching from a first audio experience to a second audio experience of a plurality of audio experiences, wherein the second audio experience is different from the first audio experience.

51. The non-transitory computer readable storage medium of claim 42, wherein the operation associated with the received input, the first input, or the second input is an operation for switching between modes of the one or more audio output devices.

52. The non-transitory computer readable storage medium of claim 42, wherein the operation associated with the received input, the first input, or the second input is an operation for playing audio, pausing audio, fast-forwarding audio, rewinding audio, or skipping to an audio track in a list of audio tracks.

53. The non-transitory computer readable storage medium of claim 42, wherein the operation associated with the received input, the first input, or the second input is an operation for changing an output volume of the one or more audio output devices.

54. The non-transitory computer readable storage medium of claim 42, wherein the operation associated with the received input, the first input, or the second input is an operation for invoking a digital assistant.

55. The non-transitory computer readable storage medium of claim 54, wherein the one or more programs include instructions that, when executed by the audio output device case, cause the audio output device case to:
- after causing the one or more audio output devices to perform the operation, receive, via a microphone of the one or more audio output devices, a verbal request, and receive at the one or more audio output devices a response from the digital assistant.

* * * * *